June 26, 1951 W. W. CARPENTER ET AL 2,558,476
DISTRICT ASSEMBLER CIRCUIT
Filed Jan. 29, 1947 27 Sheets-Sheet 1

INVENTORS: W. W. CARPENTER
J. W. GOODERHAM
BY: R. Marino
ATTORNEY

INVENTORS: W. W. CARPENTER
J. W. GOODERHAM
BY: R. Mariner
ATTORNEY

DISTRICT ASSEMBLER CIRCUIT

Filed Jan. 29, 1947 27 Sheets-Sheet 3

INVENTORS: W. W. CARPENTER
J. W. GOODERHAM
BY: R. Marino
ATTORNEY

June 26, 1951 W. W. CARPENTER ET AL 2,558,476

DISTRICT ASSEMBLER CIRCUIT

Filed Jan. 29, 1947 27 Sheets-Sheet 4

INVENTORS: W. W. CARPENTER
J. W. GOODERHAM

BY R. Marino

ATTORNEY

DISTRICT ASSEMBLER CIRCUIT

Filed Jan. 29, 1947 27 Sheets-Sheet 5

INVENTORS: W. W. CARPENTER
J. W. GOODERHAM
BY: R. Marino
ATTORNEY

DISTRICT ASSEMBLER CIRCUIT

Filed Jan. 29, 1947 27 Sheets-Sheet 6

INVENTORS: W. W. CARPENTER
J. W. GOODERHAM
BY: R. Mauro
ATTORNEY

INVENTORS: W. W. CARPENTER
J. W. GOODERHAM
BY: R. Mariano
ATTORNEY

June 26, 1951 W. W. CARPENTER ET AL 2,558,476

DISTRICT ASSEMBLER CIRCUIT

Filed Jan. 29, 1947 27 Sheets-Sheet 8

INVENTORS: W. W. CARPENTER
J. W. GOODERHAM
BY: R. Marino
ATTORNEY

June 26, 1951 W. W. CARPENTER ET AL 2,558,476

DISTRICT ASSEMBLER CIRCUIT

Filed Jan. 29, 1947 27 Sheets-Sheet 9

INVENTORS: W. W. CARPENTER
J. W. GOODERHAM

BY: R. Marino

ATTORNEY.

INVENTORS: W. W. CARPENTER
J. W. GOODERHAM
BY: R. Marino
ATTORNEY

June 26, 1951 W. W. CARPENTER ET AL 2,558,476

DISTRICT ASSEMBLER CIRCUIT

Filed Jan. 29, 1947 27 Sheets-Sheet 11

INVENTORS: W. W. CARPENTER
J. W. GOODERHAM

BY: R. Mario
ATTORNEY

INVENTORS: W. W. CARPENTER
J. W. GOODERHAM
BY: [signature]
ATTORNEY

DISTRICT ASSEMBLER CIRCUIT

Filed Jan. 29, 1947

INVENTORS W. W. CARPENTER
J. W. GOODERHAM
BY R. Mauro
ATTORNEY

June 26, 1951 W. W. CARPENTER ET AL 2,558,476

DISTRICT ASSEMBLER CIRCUIT

Filed Jan. 29, 1947 27 Sheets-Sheet 14

INVENTORS: W. W. CARPENTER
J. W. GOODERHAM
BY: R. Mauro
ATTORNEY

INVENTORS: W. W. CARPENTER
J. W. GOODERHAM
BY: R. Marino
ATTORNEY

June 26, 1951 W. W. CARPENTER ET AL 2,558,476

DISTRICT ASSEMBLER CIRCUIT

Filed Jan. 29, 1947 27 Sheets-Sheet 16

INVENTORS: W. W. CARPENTER
J. W. GOODERHAM
BY: R. Marino
ATTORNEY

June 26, 1951 W. W. CARPENTER ET AL 2,558,476

DISTRICT ASSEMBLER CIRCUIT

Filed Jan. 29, 1947 27 Sheets-Sheet 17

INVENTORS: W. W. CARPENTER
J. W. GOODERHAM
BY: R. [signature]
ATTORNEY

INVENTORS: W. W. CARPENTER
J. W. GOODERHAM
BY: R. Marino
ATTORNEY

June 26, 1951 W. W. CARPENTER ET AL 2,558,476

DISTRICT ASSEMBLER CIRCUIT

Filed Jan. 29, 1947 27 Sheets-Sheet 19

INVENTORS: W. W. CARPENTER
J. W. GOODERHAM

BY: R. Marino

ATTORNEY

INVENTORS: W. W. CARPENTER
J. W. GOODERHAM
BY: R. Marino
ATTORNEY

INVENTORS: W. W. CARPENTER
J. W. GOODERHAM
BY: R. Marino
ATTORNEY

INVENTORS: W. W. CARPENTER
J. W. GOODERHAM
BY R. Marino
ATTORNEY

June 26, 1951 W. W. CARPENTER ET AL 2,558,476

DISTRICT ASSEMBLER CIRCUIT

Filed Jan. 29, 1947 27 Sheets-Sheet 23

FIG. 24A RECORD PUNCH POSITIONS

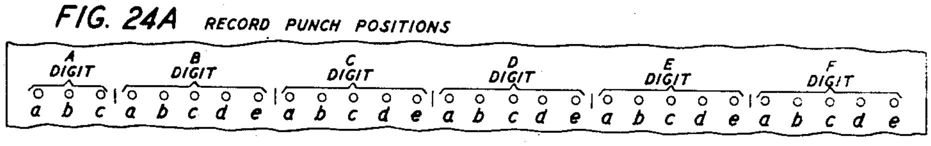

FIG. 24B ANSWER OR DISCONNECT ENTRY

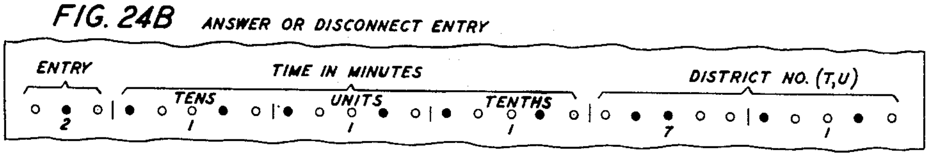

FIG. 24C INITIAL TWO LINE ENTRY (BULK-BILLED CALL—NO DETAILS SUPPLIED SUBSCRIBER)

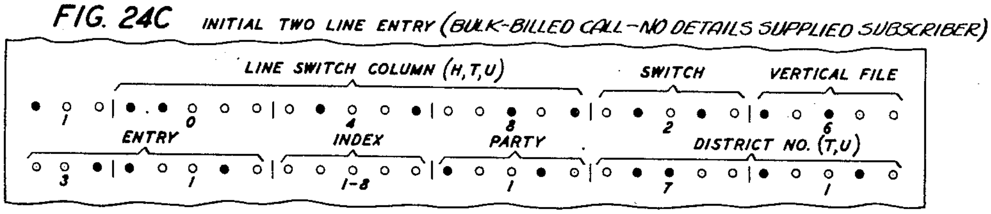

FIG. 24D INITIAL FOUR LINE ENTRY (TOLL CALL-DETAILS SUPPLIED SUBSCRIBER)

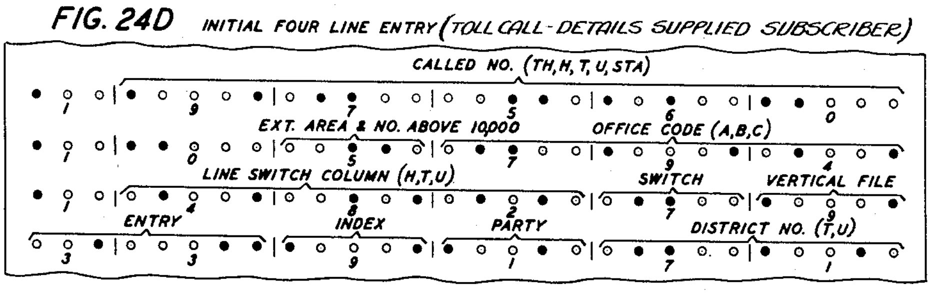

FIG. 24E REGULAR HOUR ENTRY

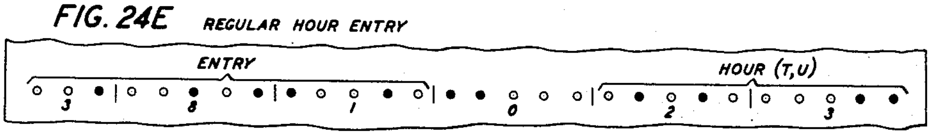

FIG. 24F DISTRICT TROUBLE ENTRY (FOLLOWING THE ENTRY ON FIG. 25C OR 25D)

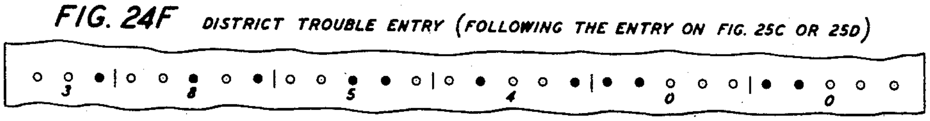

FIG. 24G INITIAL ENTRY CANCEL RECORD

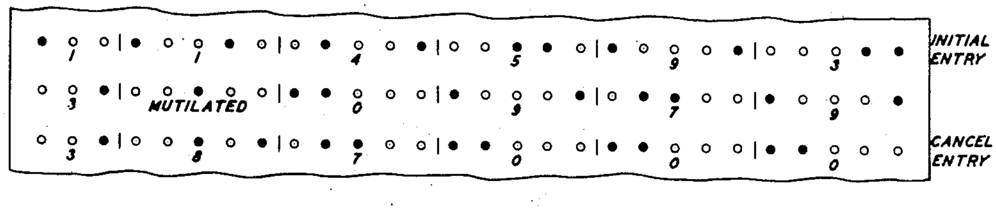

INVENTERS W. W. CARPENTER
J. W. GOODERHAM

BY R. Marino

ATTORNEY

June 26, 1951 W. W. CARPENTER ET AL 2,558,476

DISTRICT ASSEMBLER CIRCUIT

Filed Jan. 29, 1947 27 Sheets-Sheet 24

INVENTORS: W. W. CARPENTER
J. W. GOODERHAM

BY: R. Mariico

ATTORNEY

INVENTORS: W. W. CARPENTER
J. W. GOODERHAM
BY R. Marino
ATTORNEY

INVENTORS: W. W. CARPENTER
J. W. GOODERHAM

BY R. Marino

ATTORNEY

June 26, 1951 W. W. CARPENTER ET AL 2,558,476

DISTRICT ASSEMBLER CIRCUIT

Filed Jan. 29, 1947 27 Sheets-Sheet 27

INVENTORS: W. W. CARPENTER
J. W. GOODERHAM

R. Marino

ATTORNEY

Patented June 26, 1951 2,558,476

UNITED STATES PATENT OFFICE 2,558,476

DISTRICT ASSEMBLER CIRCUIT

Warren W. Carpenter, Garden City, and John W. Gooderham, New York, N. Y., assignors to Bell Telephone Laboratories, Incorporated, New York, N. Y., a corporation of New York Application January 29, 1947, Serial No. 724,992

20 Claims. (Cl. 164—115)

This invention relates to record-controlled apparatus and more particularly to an assembling device herein called an assembler for reproducing with or without change items of information on one or more records as determined by certain character or characters in each of the items.

One feature of the invention is an arrangement whereby the items of record information are reproduced on one record, or more than one record, as determined by one or more characters in each of the items. For example, there are certain items, or special "entries," on the main record to be analyzed by the assembler of the present invention which identify the source of all the record information thereon, and in order that a common analyzing apparatus subsequently processing the records derived from main records originating in different places, may identify the main records from which the derived records were made, such special entries appearing in each main record are reproduced by the assembler in each of the derived records. Or again, certain "trouble indicating" entries in the main record are placed immediately after certain other entries to indicate to the common analyzing apparatus that the latter entries should be discarded when they are reached for analysis. Accordingly, the trouble indicating entries, when sensed by the assembler, will also be reproduced on all of the derived records.

Yet another feature of the invention is an arrangement whereby certain items of information are sensed but not reproduced, the items themselves being "passed by" subsequent to sensing, either automatically or by means under manual control. As examples, mutilated entries, test entries and "splice pattern" entries, the latter being a number of lines perforated on the main record according to a certain code to provide a section thereof to which another main record tape may be affixed or spliced thereto, will or will not be reproduced on the derived records depending upon the operation of certain controls in the assembler, said controls being so arranged that said entries or any of them may be automatically skipped. In some cases certain of the entries may be skipped partially or en toto by the operation of certain keys provided in the assembler.

Still another feature of the invention is an arrangement which permits repeated attempts to be made at sensing and reproducing one or more items of information, an alarm being given and further operations arrested if, within a predetermined period measured by a timing device, all attempts at sensing and/or reproducing the item being sensed end in failure.

Yet another feature of the invention is an arrangement whereby if an item of information consists of two or more lines on the original record the same reproducing device is successively connected to the reading apparatus of the assembler for effecting the reproduction of all the lines of the item on the same record.

These and other features of the invention will be more clearly understood from the following description, appended claims and attached drawings in which:

Figs. 1 to 19 inclusive, arranged as indicated by Fig. 20, completely disclose the invention;

Figure 23A:
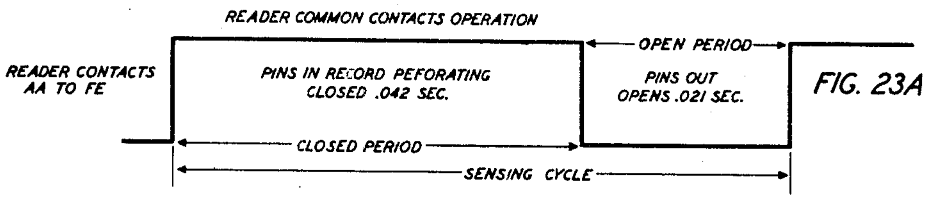
Figure 23B:
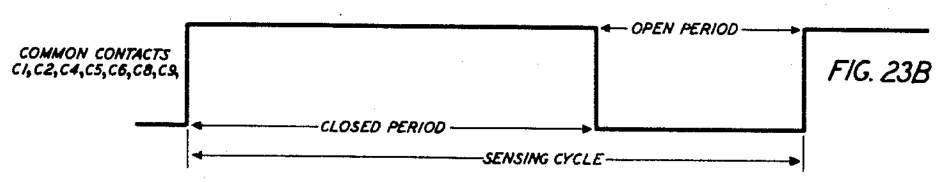
Figure 23C:
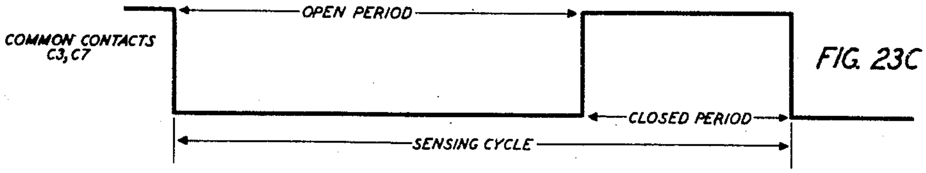
Figure 23D:
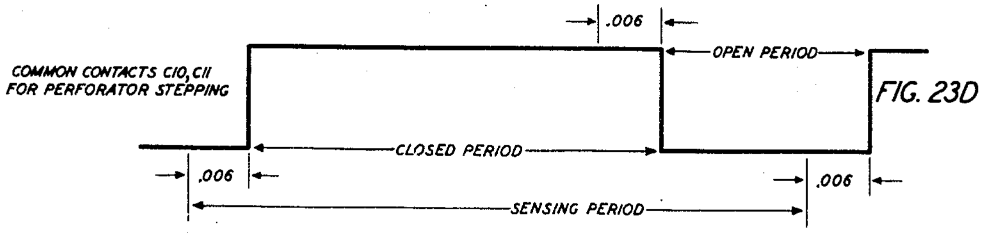
Figure 25:
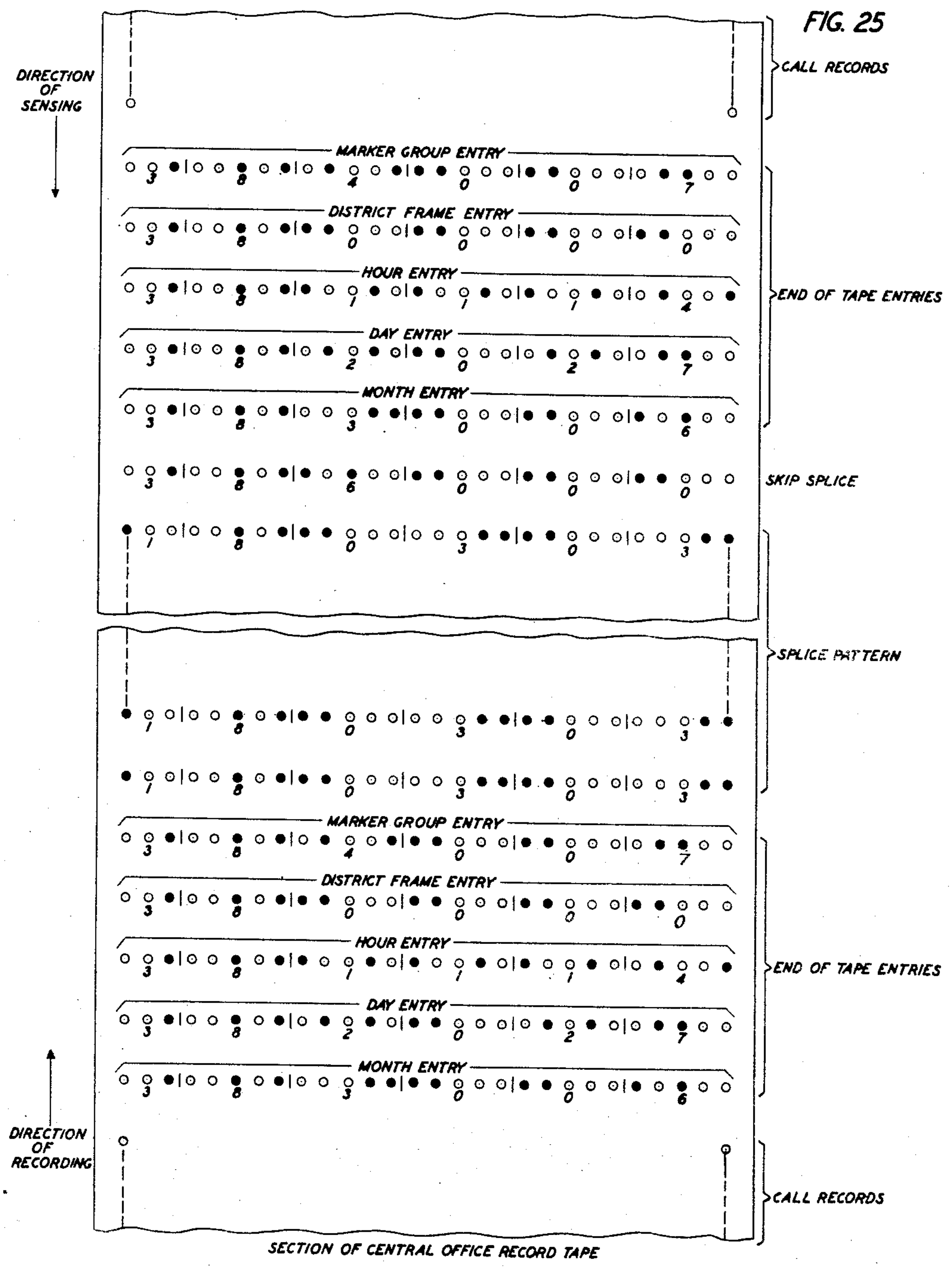
Figure 26:
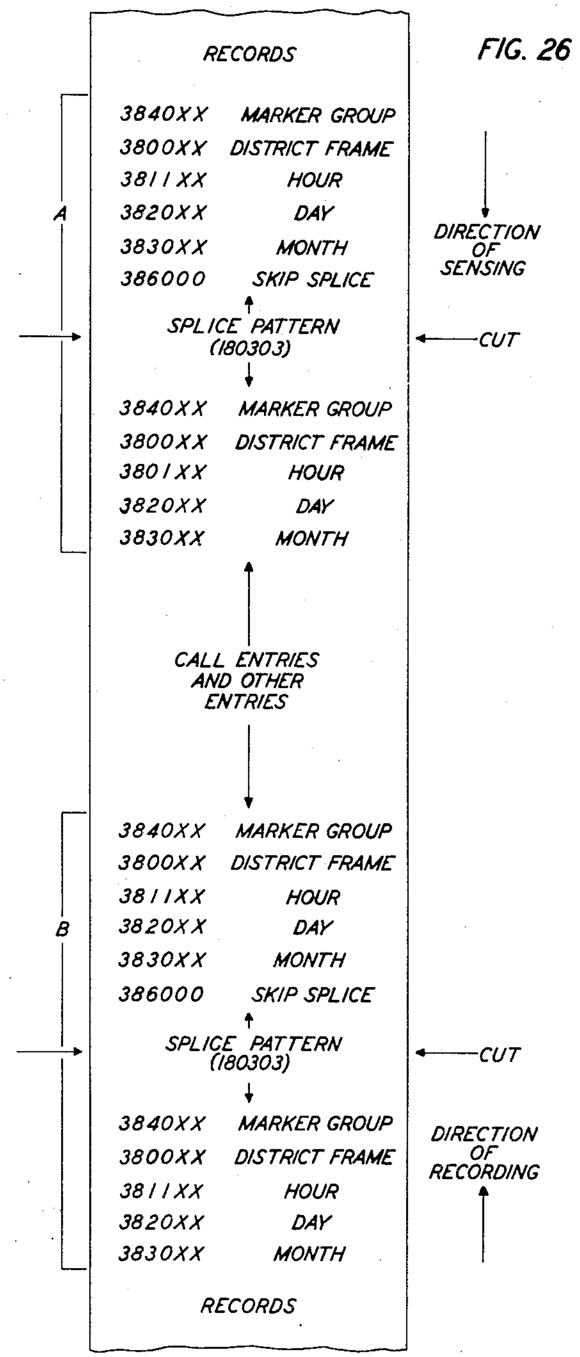
Figure 27:
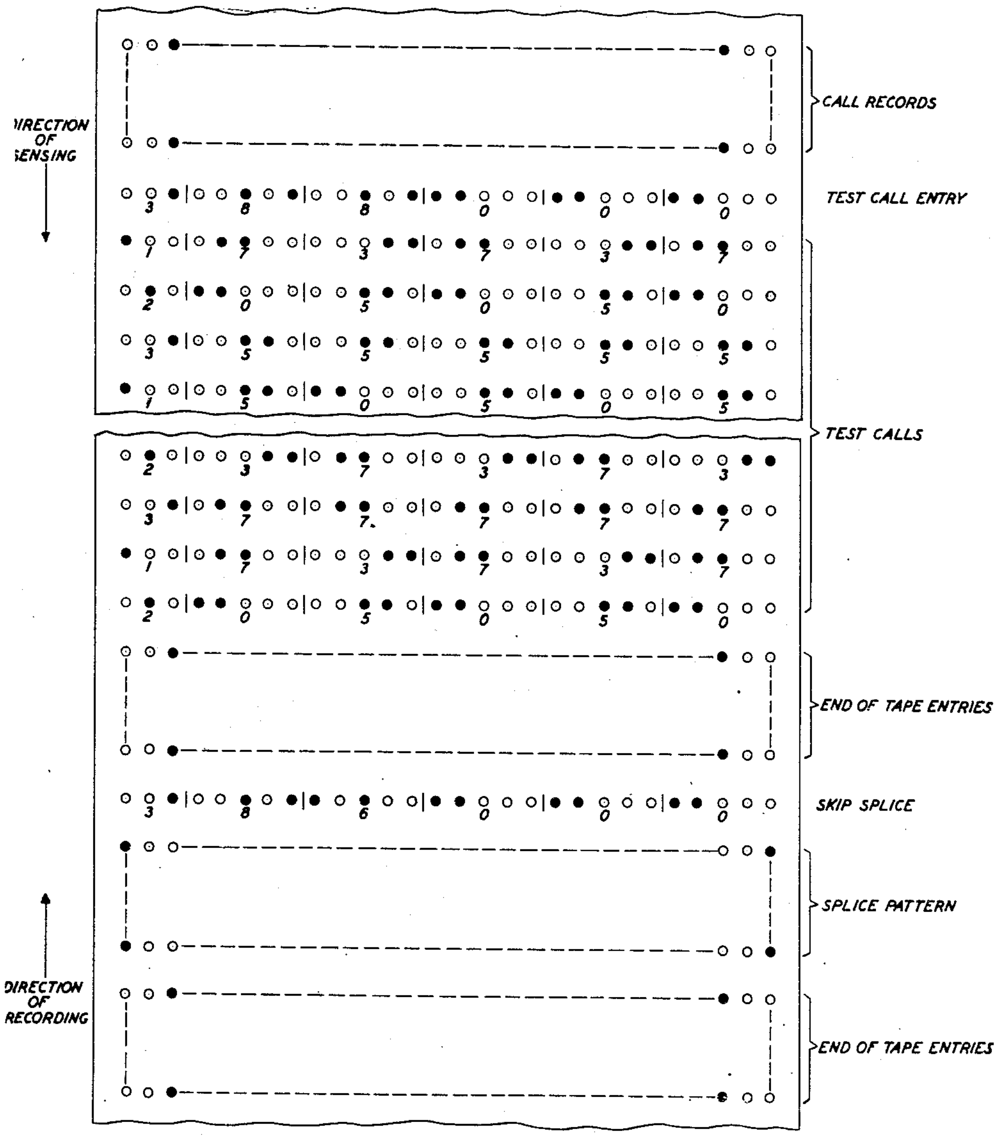
Figures 28A, 28B:
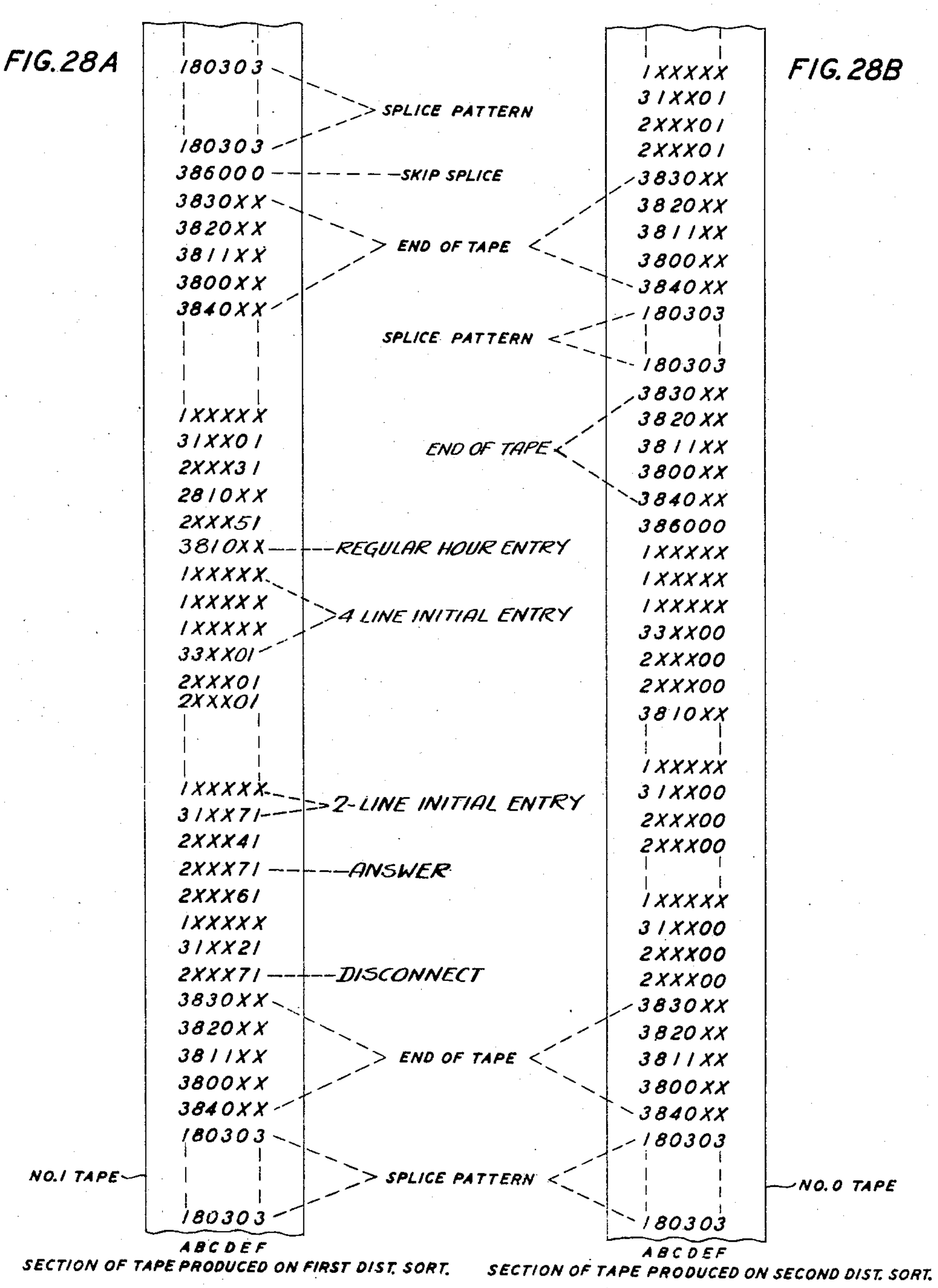

Figs. 23A–23D are four time-diagrams of which the Fig. 23A indicates the total period of the "sensing cycle," the period of the cycle when the sensing pins of the reader are in the sensed perforations (at which time certain contacts controlled by the pins are closed) and the period when the pins are out (at which time said contacts are open); Figs. 23B to 23D inclusive, indicate the closed or open position of certain common contacts controlled by the main shaft of the reader, in relation to the closed or open condition of the contacts controlled by the sensing pins of the reader during a sensing cycle;

Fig. 24A shows the punch positions of the tape;

Figs. 24B to 24G inclusive, and Figs. 25, 26 and 27 show various parts of the record to be analyzed and reproduced, while Figs. 28A and 28B show typical samples of the reproduced record in which the numerals in each line of said records are prefixed to the values indicated, while the X's indicate variable digital values.

SECTION I.—THE CENTRAL OFFICE RECORD

In the exemplified form herein shown and described by way of illustration, the present invention is intended for sensing a perforated record prepared in a typical automatic telephone central office by the circuits and apparatus shown and described in the copending application of W. W. Carpenter and R. A. Collis, Serial No. 759,402, filed July 7, 1947. The purpose of the sensing is to reproduce the "entries" on said record on one or more records as determined by certain characters or digits forming elements of the entries and to rearrange the reproduced entries according to a predetermined order. According to the disclosure of the above-mentioned Carpenter-Collis application, the telephone central office is adapted to make a record of all items of record information pertaining to established telephone connections, this record then supplying all the essential information for computing the cost of the connections and for preparing the monthly bills for the subscribers to whom the connections are to be charged. The general arrangement in the telephone central office, therefore, is to have a tape perforator or similar device for each group of trunks over which connections are established and to connect the perforator to a trunk in the group or to certain apparatus controlling the establishment of the connection over the trunk, whenever some item of record information pertaining to the connection is available for recording, at which time the perforator is operated to record the item. Although the perforator is then dismissed, it is, of course, available for similar connection to the other trunks in the group or controlling apparatus connected therewith, and can be reconnected to each of the trunks to which it was previously connected whenever other items of record information pertaining to the calls are available for recording. Thus the central office record tape contains a plurality of entries pertaining to established connections, and although the entries for each call established over a particular trunk are placed on the record in the chronological order in which they are made available for recording, nevertheless they are disassociated from each other by intermediate entries pertaining to other calls established over other trunks in the group.

Generally speaking there are three types of entries recorded for each connection. The first entry, called the "initial entry" is recorded by the perforator after the central office equipment has established the connection between the two subscribers. If the connection is a local connection to be charged for in terms of standard charge units and requiring no detailed account of the call on the subscriber's bill, the entry usually comprises a certain group of characters which identify the calling subscriber's line, another group of characters which identify the trunk number over which the connection was established and certain other characters which are either for the purposes of controlling the operation of the assembler or are otherwise for use by the computing devices. If the connection is a toll connection to be charged in money units and requiring a detailed account of the call on the subscriber's bill, the initial entry, besides containing the groups of characters pertaining to the information above-mentioned for a local connection, also contains other groups of characters which identify the called subscriber's number and certain other items of information for the use of the computing devices.

The remaining two entries are the "answer" and "disconnect" entries, respectively, the former being entered on the central office record to record the time when the called subscriber answers, the latter being entered in the record when either the calling or called subscriber restores his receiver. There is no difference between the two entries other than the difference in the notation of the time, the remaining characters or groups thereof in both entries being the identity of the trunk (which, of course, remains the same for the one call) and a certain control character which is the same for both entries.

Besides the entries pertaining to established connections, the central office record tape also contains certain other entries the details and significance of which will be presently explained. There is, for instance, the "hour" entry which is placed on the tapes of all perforators at the beginning of each hour. There are also certain entries defined as the "end-of-tape" entries which are placed on the record whenever a section of the tape containing call entries is to be cut from the tape roll. It should be realized that the central office record tape is continuous and that, periodically, the portion of it which hasbeen perforated to record the call entries must be severed from the tap roll for use by the apparatus of the present invention, and that some "special" entries must appear at the beginning and end of the severed section to define its limits. There is also a "splice pattern" which is entered on the record between two groups of end-of-tape entries to provide a cutting area across which the tape record may be cut and to provide a surface for splicing or joining together sections of other tapes either from the same trunk group or other trunk groups, as will be shown.

Thus a record tape is produced for each group of trunks in a central office, and each tape will have recorded thereon a number of entries pertaining to calls established over each of the trunks in the group. As previously stated, the three entries pertaining to each call are not adjacent to each other but are dispersed over the tape since, after an entry is made for one call established over a particular trunk in the group, other entries may be made immediately thereafter for calls established over other trunks in the same group. By means of the present invention the three entries pertaining to each call are recorded side by side on another tape in the chronological order in which they are recorded on the central office tape and all the entries pertaining to calls established over the same trunk are collected together on the same tape in the chronological order in which the calls are originated. Since the "district" trunk group for which a central office record tape is produced is limited to one hundred trunks, with each trunk having a designation 00 to 99, the assembler of the present invention produces these separate tapes by a first operation known as the "first district sort" in which the entries on the central office record tape are separately recorded on ten different tapes in accordance with the units digit of the district trunk numbers, and by a second operation known as the "second district sort" in which the entries on each of the ten tapes are then separately recorded on ten other tapes according to the tens digit of the district trunk numbers. The final tapes will then have all the entries for all calls established over the trunks "collected" and chronologically arranged.

Having indicated in general terms the form and character of the record tape to be analyzed by the assembler of the present invention, attention is now directed to certain figures of the drawing which show some of the typical entries on a central office record tape. Attention, however, is first directed to Fig. 24A which shows the number and general arrangement of the punch positions on the central office record tape. The latter is wide enough to accommodate twenty-eight (28) punch positions suitably spaced in staggered formation across the tape to conserve tape width though, in all the figures where the tape or portions thereof are illustrated, these positions are shown in straight line alignment for greater ease of perception.

The twenty-eight (28) punch positions across the tape are utilized to record six (6) digits indicated as digits A to F, inclusive, with digit A at the extreme left of the tape and digit F at the extreme right. Obviously, the order could be reversed so far as recording and sensing is concerned except that if the order is reversed, the wiring of the punch magnets of the central office perforator and the wiring of certain registers and magnets of the present invention would also have to be reversed.

For the recording of the first digit A, three punch positions are allocated, but for the recording of the remaining five digits B to F, inclusive, five punch positions are allocated, thus making a total of twenty-eight punch positions. Now the reason why only three punch positions are reserved for the A digit is because this digit is used for "control" purposes to indicate, generally, the character of the entry. And since no more than three values of this digit are utilized for this purpose, the value of the digit never exceeds "3" a fact which makes it simple to record the value "1" in the first position, the value "2" in the second position and the value "3" in the third position. Each of the other five digits, however, may have any value from 0 to 9, inclusive, and to record each digital value by punches in the five positions reserved for each of the digits the following code is used in which, for the value of each digit, two and only two positions are punched, the punched position being indicated by a check mark "√" in the code table given below:

*Code of holes punched in the tape*

| Numeral | Hole Positions | | | | |
|---|---|---|---|---|---|
| | (a) | (b) | (c) | (d) | (e) |
| 0 | √ | √ | | | |
| 1 | √ | | | √ | |
| 2 | | √ | | √ | |
| 3 | | | | √ | √ |
| 4 | | √ | | | √ |
| 5 | | | √ | √ | |
| 6 | √ | | √ | | |
| 7 | | √ | √ | | |
| 8 | | | √ | | √ |
| 9 | √ | | | | √ |

The 2-out-of-5 code has been adopted because errors due to failures of any sort which result in the punching of more or less than two positions may be easily detected by suitable checking apparatus. It may also be remarked here that the same code and the same number and arrangement of punch positions are used for recording the various digits on the tapes to be produced by the perforators of the assembler. It will be noted from Fig. 24A that the punch positions for each of the digits B to F, inclusive are given the small letter designations (a) to (e), inclusive, beginning with the first punch position allocated to the digit.

Referring, now, to Figs. 24B to 24G, inclusive, these figures illustrate portions of the central office record tape with a typical entry shown recorded in each figure by the filled-in punch positions, which indicate perforations.

Fig. 24B shows a typical "answer" or "disconnect" entry. Of the six digits in the tape the digit A, the entry or control digit, is always "2," said digit being recorded on the tape by a punch in position (b) of the three positions reserved for the A digit. Digits B, C and D are reserved for recording the time of answer or disconnect and this time is recorded in tens of minutes (tens), minutes (units) and tenths of a minute (tenths). Thus in the figure the three digits B, C and D are shown to be "111," recorded in terms of the above-given 2-out-of-5 code. The digits indicate that the time of answer or disconnect occurred 11 minutes and 6 seconds after the hour.

The last two digits E and F are reserved for the number of the trunk (or district as it is more often called) over which the connection was established. As previously stated, the districts in a central office are divided into groups of a hundred (or fractions thereof) with a perforator for producing the record assigned to each group and available to each district in the group whenever an entry is to be recorded on the tape. In order to record with the entry the district involved in the connection each district in the group is given a numerical designation of from 00 to 99, and when the perforator is seized by a district for the purpose of making an entry (in this case the answer or disconnect entry) the number of the district is recorded along with the time of answer or disconnect and the control digit. In Fig. 24B the district number is illustrated as being "71." As previously mentioned, there is no difference between an answer and a disconnect entry of the same call except in the recorded time.

Fig. 24C shows an initial two-line entry for a "bulk-billed" call; that is, a call for which no details are to be furnished the calling subscriber and the charge for which is to be computed in terms of standard local charge units. The entry occupies two lines of the central office record tape because all of the information making up the entry cannot be put on one line. On the first line (reading from the bottom) are the two entry or control digits A and B (in this case two control digits being necessary) and their values for an initial two-line entry are always 3 and 1, respectively.

The C digit is the so-called "index" digit and its value determines the charge for the call, in the sense that the value of the digit determines the number of charge units for an initial unit period of conversation and the number of charge units for the intervals of overtime conversation. The value of the index digit (for bulk-billed calls) ranges from 1 to 8, inclusive, as indicated.

The D digit is reserved for party designation. As is well known, a modern telephone exchange includes individual lines and party lines and, of course, when a call is made from a party line it is necessary to ascertain which party made the call in order that the charge therefor may be assessed against the subscriber who makes it. For the purpose of party identification, the D digit of the first line of the initial entry is reserved for line and party distinction. If the calling subscriber has an individual line, the value of the digit recorded will be "1," as shown, while if he is one of a group of subscribers whose stations are connected to the same line, a suitable digital value (not shown) is reserved and used for each of the subscribers or "parties." As in the case of a single line answer or disconnect entry, the E and F digits are used for recording the district number which, as in Fig. 24B, is indicated in Fig. 24C as "71."

On the second or "supplementary" line of a two-line initial entry the A digit is always 1 and indicates that the line is a supplementary line of an initial entry, the circuits of the assembler being so arranged that when an initial entry is sensed and the A and B digits thereof are "31," the equipment is readied to receive and reproduce the second line of the entry on the tape of the same perforator which reproduced the first line. The remaining digits B to F, inclusive, of the second line are reserved for the designation of the calling line. In the particular embodiment of the telephone system disclosed in the above-mentioned Carpenter-Collis copending application, the designation of the calling line is recorded in terms of its position in a cross bar switch of a designated array of switches. It is, of course, possible, to record the line in terms of its directory number, and when this is done digits B to F, inclusive, of the second line of the entry would record the directory number instead of a designation (as at present) indicating the location of the line on a certain cross bar switch frame. As shown on Fig. 24C, the line "number" indicated therein is "04826."

Fig. 24D illustrates an initial four-line entry. This entry is made for a "toll" call or for any call the particulars of which are to be furnished to the calling subscriber. The first two lines of the entry are substantially similar to those of an initial two-line entry except that the A and B digits are "33" instead of "31," the different value of the B digit indicating to the assembler that there are three supplementary lines for the entry instead of one. The index digit is also different in that it has the value "9" instead of 1 to 8, inclusive, the reason being that the value "9" indicates that the charge for the call is to be made in money units which must be specifically determined in accordance with the distance between the two subscribers and the duration of the conversation. The A digit of the third supplementary line is "1" to indicate that it is a supplementary line while the B digit is given the arbitrary value "0." The C digit of the third supplementary line is reserved to indicate the called numbering area and whether the called number in the identified area is below or above 10,000. The number of areas is limited to five (5), each of which, in the C digit, is designated by the values 0 . . . 4, except that if the called number in the identified area is over 10,000 the value of the C digit designating the area is increased by five (5). Thus if the called area is "0" and the called subscriber therein has a four-digit number, the C digit would be recorded as "0," but if it is a five-digit number the C digit would be recorded as "5," as indicated in Fig. 24D. Digits D, E and F of the third supplementary line are used to record the office of the called number, which is usually a three-digit number. In the figure the number illustrated is "794."

In the last or fourth supplementary line, and excepting for the A digit which has the value "1" to indicate that the line is a supplementary line, the five digits B to F, inclusive, are used to record the numerical portion of the called subscriber's number which is either four digits if it is an individual line or party line, or five digits if it is a party line having an additional digit assigned to the party station. Where the number is a four-digit number, the F or fifth digit is given the arbitrary value "0"; otherwise it will be given the digit which indicates the digit (or letter) assigned to the party station. In Fig. 24D the called line number is illustrated as being "9756."

Fig. 24E illustrates a regular hour entry. This entry is placed on each central office record tape at the beginning of each hour. It is a single line entry and has "331" for the value of the control digits ABC, the last two digits of this number indicating to the assembler that the entry is one which is to be reproduced in every tape record produced. The D digit is given the arbitrary value "0" while the digits E and F are used for recording the hour itself. Since the latter may have any value from "00" to "23" depending on the hour, the E digit may have any digital value 0, 1 or 2 while the F digit may have any digital value from 0 to 9, depending on the hour when the entry is made.

Fig. 24F illustrates a "district trouble" entry and has the fixed designation "385400" as illustrated in the figure. In the production of the central office record tape, a registering apparatus associated with the district selector (trunk) and controlling the establishment of the call thereover has as one of its functions a test to determine whether certain charging devices in the district are normal. If this apparatus finds these devices falsely operated the perforator is summoned immediately to perforate the special entry "385400" on the tape, said entry thus being placed on the tape before the district can be used to establish another call thereover which might result in a false charge condition to be perforated on the tape for the call previously established. Such a false charge condition would occur, for example, if the previously established call was not answered and if the next subsequent call was from a flat rate station for which no charge record should be made and for which no initial entry will be made. In this case, answer and disconnect entries would be made for the flat rate call (because of the trouble condition) and these entries would then become falsely correlated with the initial entry of the previous call that wasn't answered, thus causing the subscriber who initiated the latter call to be falsely charged therefor. Hence in order to prevent the false association of the answer and disconnect entries of the flat rate call with the initial entry of the previously not answered call, the special trouble entry "385400" is perforated on the tape before the flat rate call is established. As previously stated, one of the objects of the present invention, in so far as it appertains to the processing of the central office record tape produced by the apparatus disclosed in the above-mentioned Carpenter-Collis application, is to "assemble" on one tape adjacent to each other the three entries pertaining to an established connection over a particular district. This tape is then used by suitable computing and translating equipment (which is not part of the present invention nor disclosed in any of the drawings thereof) to add up the calls and assess appropriate charges therefor. In operating in response to the tape, the computing and translating apparatus is designed to sense and register the three entries for a call and to sense them in the reverse chronological order. If it senses and registers two answer and disconnect entries, and then senses the special entry "385400" will discharge said registered entries and further cancel the initial entry that it will sense after it will have sensed the special entry. In this way, the unanswered call identified by the initial entry but not followed by its own answer and disconnect entries will not be charged for.

Fig. 24G illustrates the cancel entry "387000" which is put on the central office record tape immediately after an initial entry when the checking circuits of the perforator at the central office recognize that the initial entry is not "perfectly" recorded as, for instance, if a punch pin of the perforator has not successfully penetrated the paper. Under these circumstances the call is not completed, and the object of the "387000" entry is to signify to the assembler to "skip" the initial entry associated therewith without reproducing it on any of its tapes.

Fig. 25 illustrates two groups of special entries which are placed on the central office record tape whenever the perforated portion thereof is to be cut from the tape roll. Each of these two groups of entries serve a special purpose. The first group known as the "end-of-tape" entries, identifies the record tape with respect to the telephone office building or office therein in which it was produced; the second group known as the "splice pattern" provides a perforated area through which the tape may be severed from the tape roll.

The end-of-tape entries consist of five special entries of which the purpose of the "hour," "day" and "month" entries is obvious. The remaining two entries, namely, the "marker group" entry and the "district frame" entry are those which identify, respectively, the office building where the tape was produced and the particular district frame upon which is mounted the group of one hundred districts having access to one perforator.

The marker group entry "3840XX" identifies the building or office of origin. The telephone system described in the above-mentioned Carpenter-Collis copending application employs cross bar switches of a well-known type in the telephone art, and to establish connections between subscribers through such an office it is necessary to employ a well-known translating device known as the "marker" the principal function of which is to connect the calling subscriber's line to an available trunk extending in the direction of the called subscriber. The operation of the marker is so fast that a small group of them usually suffices to carry the load of a number of offices, if the latter are located in the same building. To the group of markers serving a plurality of offices in one building is assigned a two-digit number the value of which, therefore, identifies the building, other two-digit numbers being assigned to other groups of markers serving other office buildings. This marker group number is recorded as the E and F digits of the marker group entry. Of course, where there is but one office in the building there is but one marker group which is individual to the office and, in this case, the E and F digits of the marker group entry not only identify the building but also the office.

The district frame entry "3800XX" identifies the office in the building. As previously stated, the trunks in an office are divided into groups of a hundred. The trunk group usually occupies one frame and, of course, the perforator for the trunks of a group is individual to the frame. Now where there are a number of offices in a building, no distinction is made with respect to the designation of the individual frames in all of the offices, but all of them are or may be serially designated by two-digit numbers since the capacity of a telephone office building does not, at the present time, exceed the need of more than one hundred (100) district frames. The numbers given to the specific district frames will, therefore, indicate the offices to which the latter belong so that the district frame entry with the frame designation entered as the E and F digits thereof identifies the office, the particular frame therein and the perforator which produced the particular section of the central office record tape.

Now when it is desired to cut off a perforated section of a tape belonging to a particular district frame, the perforator thereof is operated by a special device to perforate in the following order and in succession, the month entry "3830XX," the day entry "3820XX," the hour entry "3811XX" (indicating the hour when these entries are made and distinguishing from the regular hour entry "3810XX" by the fact that the D digit is "1" instead of "0"), the district frame entry "3800XX" and the marker group entry "3840XX."

After these "end-of-tape" entries are perforated, the perforator is operated to perforate approximately thirty lines with the entry "180303," the entire group of lines being termed the "splice pattern." It will be observed from Fig. 25 that the holes punched for this entry (the punched holes being shown filled) are more or less evenly distributed among the twenty-eight punch positions of the tape.

As previously stated, the object of the splice pattern is to provide a perforated section across which the tape may be perforated, and also to provide in the splice pattern on either side of the cut a section to which another section of tape may be spliced or joined. The perforator used in the Carpenter-Collis invention, and, also, the ones used in the present invention, do not perforate "clean" holes but cup-shaped embossments through the use of punch pins and the apertures of these embossments can receive the projecting portion of other embossments coincidentally superimposed thereupon. Thus two tapes may be joined to form one continuous tape by superimposing them along their splicing areas.

After the perforator has punched the splice pattern, it operates once more to punch the special entry "386000" known as the "skip splice" entry the significance of which will later appear, and, thereafter, a second group of end-of-tape entries. The tape may then be cut anywhere across the splice pattern so that the forward end of a tape section will have a portion of the splice pattern followed by the skip splice entry and five end-of-tape entries while at the trailing end it will have the five end-of-tape entries followed by a portion of the splice pattern. A section of such tape is indicated in Fig. 26 between the upper and lower "cut" (the figures of the entries thereon being shown in Arabic numerals).

SECTION II.—GENERAL DESCRIPTION OF THE PRINCIPAL PARTS OF THE INVENTION

With the above understanding of the significance of the different entries on the central office record tape to be analyzed, the operation of the invention in response to the sensing of the record will now be given.

Figure 21:
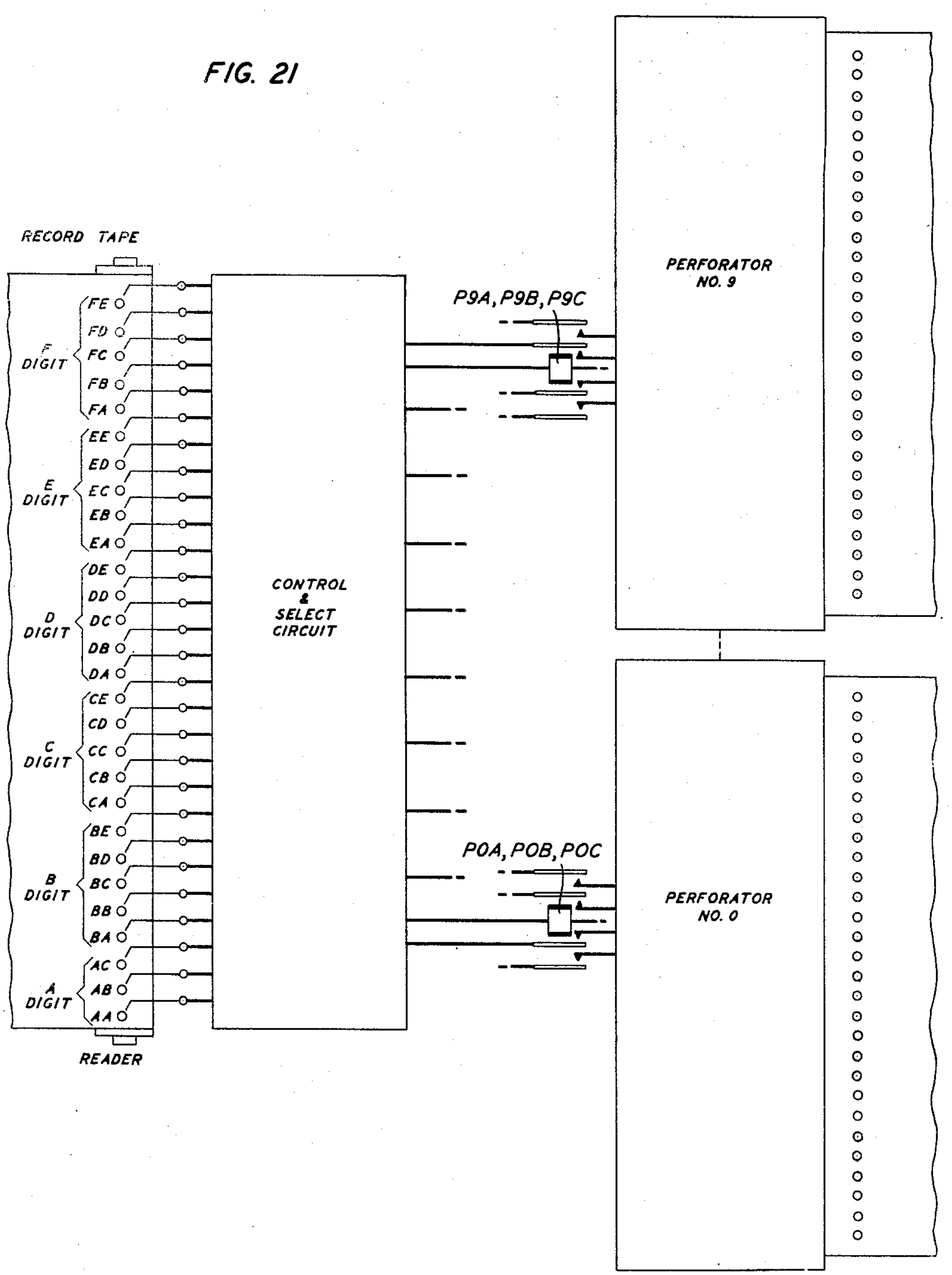
Fig. 21 is a schematic indication of certain elements of the invention.

The most simplified showing of the elements of the invention is indicated in Fig. 21. Essentially these comprise a reading mechanism called the "reader" for sensing the perforations in the tape, a control and select circuit, and ten perforating mechanisms designated 0 to 9, inclusive.

With each of these perforators there is associated a group of "cut-in" relays designated P0A, P0B, P0C . . . P9A, P9B, P9C, respectively, and by means of these groups of relays the associated several perforators may be connected to the control circuit and through it to the sensing devices of the reader.

Figure 22:
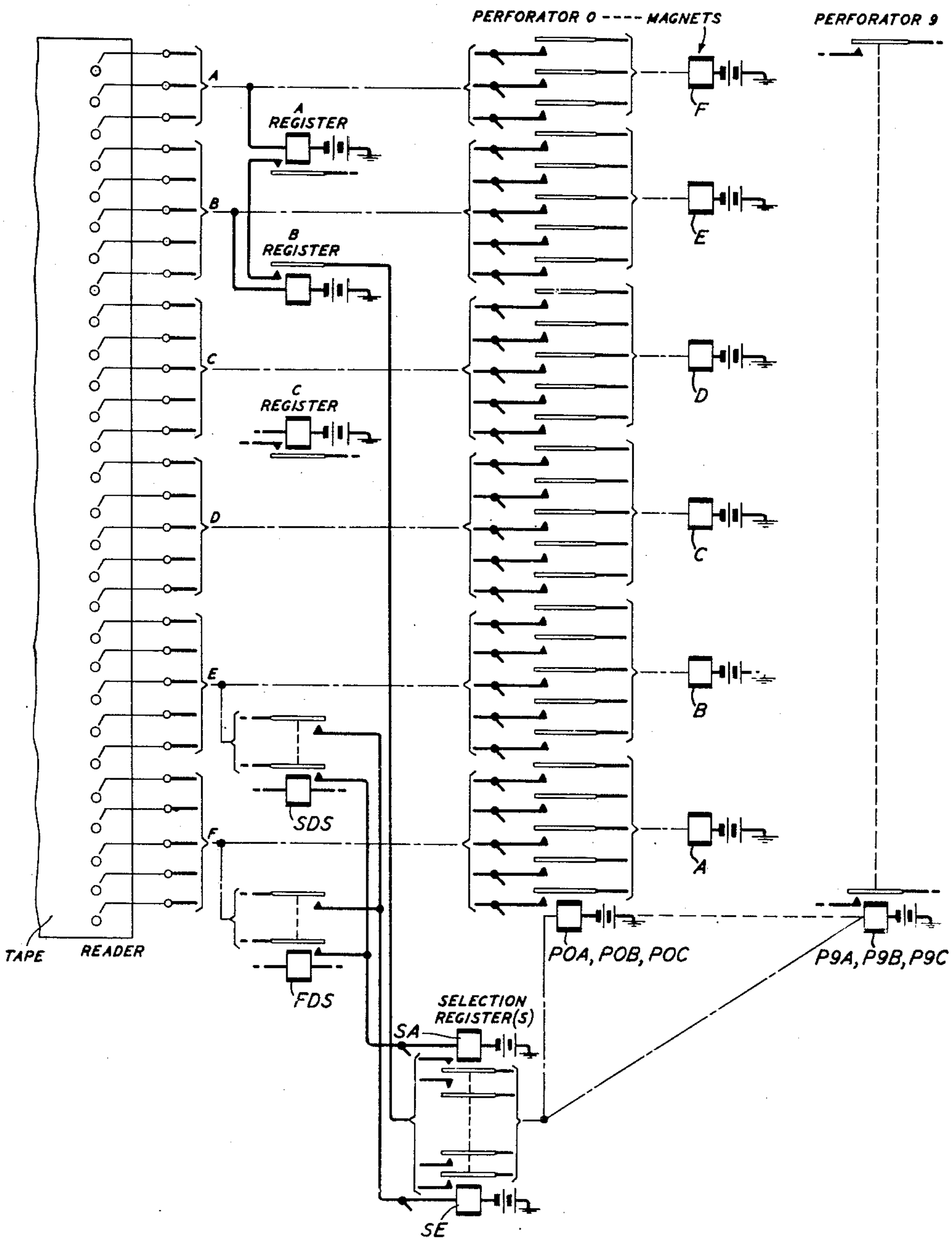
Fig. 22 is a schematic indication of the relation between the sensing apparatus (herein called the "reader"), the reproducing devices and the controlling elements of the selecting and controlling circuits.

A more detailed but still generalized disclosure of the elements of the invention is indicated by Fig. 22. It will be seen from this figure that the groups of cut-in relays are controlled through the contacts of the five relays SA . . . SE comprising the selection register S, and that the latter relays, in turn, are selectively controlled by two separate relays, the one, relay FDS having its contacts extending to the five sensing pins which sense the five punch positions of the F digit and the other, relay SDS, having its contacts extending to the five sensing pins which sense the five punch positions of the E digit. All of the twenty-eight sensing pins of the reader, on the other hand, are extended and multiples to the contacts of the cut-in relays (through certain intermediate relays not shown in this figure) so that, depending upon the group of cut-in relays operated, the sensing pins (meaning thereby certain grounded contacts called "reader contacts" controlled by the pins) are extended to the punch magnets of the perforator associated with the operated cut-in relay group.

The selection of a particular perforator through the relays of the selection register S is made in accordance with the value of the F or E digit of a particular entry, or the first line of the entry where an initial entry is being sensed. If relay FDS is energized, the selection is made in accordance with the value of the F digit because, in this case, the windings of the selection register relays SA . . . SE are respectively extended to the five reader contacts of the sensing pins of the F digit. Since the perforations that will be encountered by the sensing pins will be two-out-of-five to denote a particular value 0 . . . 9, it follows that two of the five relays SA . . . SE will operate and close a path to the particular group of cut-in relays indicated by the value of the F digit, the circuit closure for the selected group of cut-in relays being, however, controlled through certain registers A and B, respectively, associated with and operating in response to the reader contacts of the A and B digit sensing pins. Thus with relay FDS operated, the selection of one of the ten perforators is made in accordance with the value of the F digit.

In the same manner, if relay SDS is operated, the windings of the selection register relays SA . . . SE are extended to the reader contacts of the E digit sensing pins, and it is obvious from the figure and from what has already been said in connection with selecting a perforator in accordance with the value of the F digit that, with relay SDS operated, the selection of the perforator will be made in accordance with the value of the E digit. In both cases, when the reader contacts are extended to the punch magnets of the selected perforator the magnets will operate to reproduce on a tape individual to the perforator whatever perforations are sensed by the pins of the reader.

Before proceeding with a description of the detailed operation of the invention a brief description will be given of its component parts and their principal functions.

Figures 1, 20:
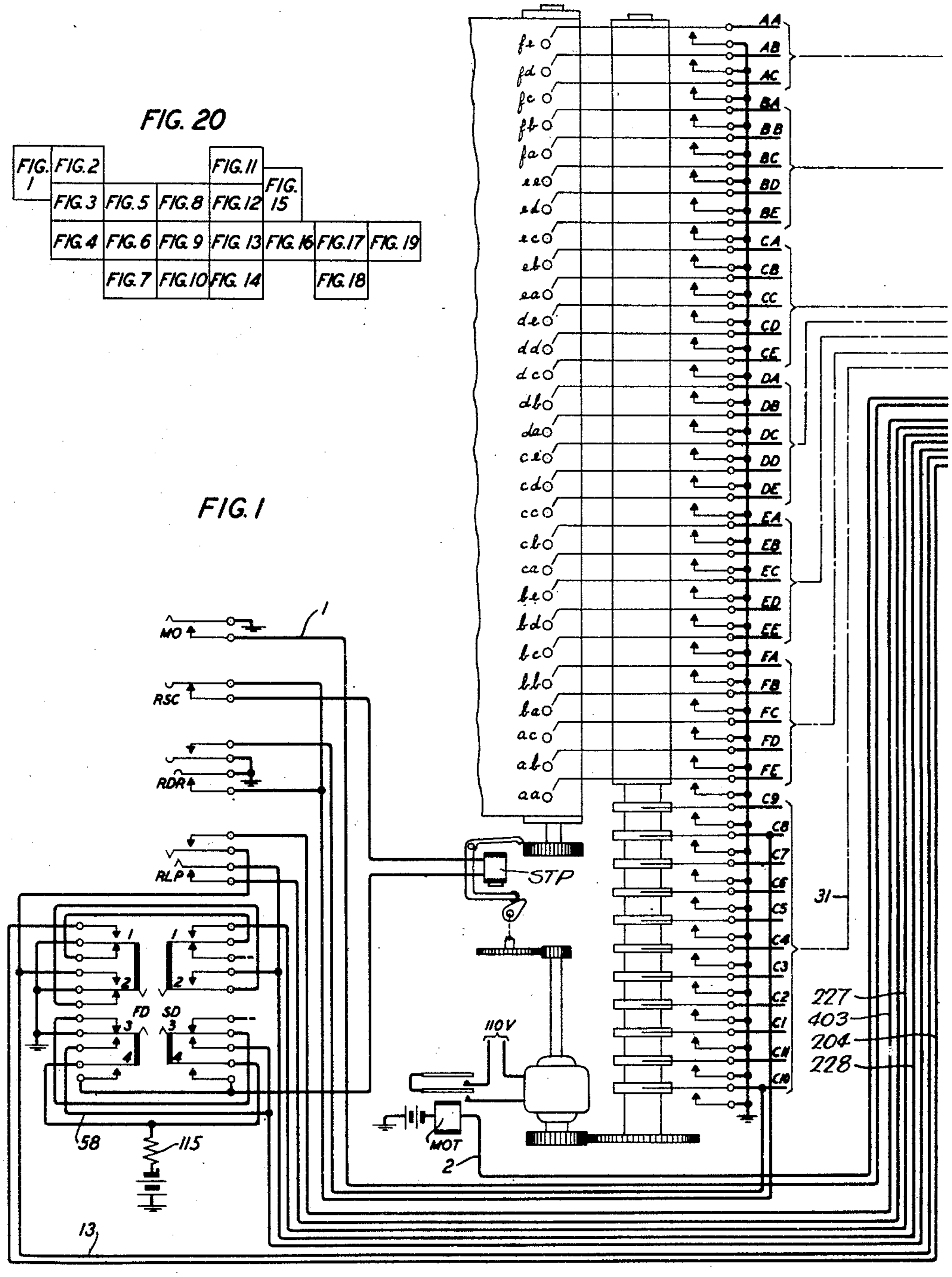

Fig. 1 shows the reader, the structure of which is adapted for sensing a perforated record though, of course, it may be modified or changed to suit the form of record to be sensed. Its mechanical parts are substantially similar to those of the reader disclosed in the copending application of W. W. Carpenter, Serial No. 666,280, filed May 1, 1946. It comprises a motor-driven cam shaft which controls the reciprocal operation of the twenty-eight (28) sensing pins AA . . . FE the points of which, for every revolution of the shaft, impinge upon the surface of the record to be analyzed. Each pin is provided with a pair of contacts called "reader contacts" bearing the same designation as the associated pin, and whenever a pin impinging upon the record penetrates a perforation therein, it closes its associated reader contacts to apply a ground to the conductor connected to one of the contacts. Each revolution of the shaft is termed a "sensing cycle" and the latter comprises a period during which the pins have entered perforations and closed their respective reader contacts and a period when the pins are out of the perforations and opened their reader contacts. Fig. 23A is a time chart of the sensing cycle, and it is there seen that if the shaft is rotated at a speed of 16 revolutions per second (for example) the "closed" period of the reader contacts is .042 second and the open period .021 second.

Mounted upon the same shaft are eleven (11) eccentric cams each of which controls a set of contacts designated (reading from top to bottom on the figure) C9, C8, C7, C6, C5, C4, C3, C2, C1, C11 and C10. These contacts are closed and opened for definite periods in relation to the sensing cycle, and serve to control certain circuit functions which will later be described in detail. Fig. 23B is a time chart for contacts C1, C2, C4, C5, C6, C8 and C9, and it shows that these contacts are closed during the closed period of the sensing cycle and open during the open period. Fig. 24C is a time chart for contacts C3 and C7, and it shows that the closed and open periods of these contacts are the reverse of those of the contacts indicated for Fig. 23B. Fig. 23D is a time chart for contacts C10 and C11. These contacts, though closed and opened for the same time intervals as those of the cycle, nevertheless close a short time after the beginning of the closed period of the cycle.

A part of the reader mechanism is the reader drum upon which is mounted the record to be analyzed. The step-by-step rotation of this drum is controlled by the armature of the step magnet STP through a simple pawl and ratchet arrangement, the ratchet being mounted on the drum. When the magnet STP is operated the armature tilts the pawl into engagement with a tooth in the ratchet wheel and, of course, so long as the magnet remains energized, the pawl will engage the ratchet wheel, causing it and the drum to which it is affixed to remain in a stationary position and thereby prevent any further advance of the tape. When, however, the magnet is deenergized, the release of its armature causes the pawl to advance the ratchet one tooth space, thus rotating the drum through an arc equal to the distance between two successive lines of perforations of the record mounted thereon and bringing the next line of perforations into coincidence with the punch pins when the latter impinge upon the surface of the record during the closed period of the sensing cycle.

One mechanical feature of the reader is the automatic advance of the reader drum one step for every rotation of the reader shaft so that, if magnet STP is not energized, both the shaft and drum rotate in synchronism to advance the record one line of perforations for sensing on the next reading cycle. This is accomplished by means of an auxiliary shaft coupled to the shaft of the motor and having an eccentric cam mounted thereon directly under the armature of the magnet. The high point of the cam is such that on every revolution it mechanically lifts the armature in the way it would be lifted were it to be operated electrically so that, for every revolution of the reader shaft, there is a corresponding one step advance of the reader drum. When the magnet is operated and the armature is lifted electrically, the attraction of the armature towards the core of the magnet is greater than the mechanical lift received from the cam, leaving a little clearance between the high point of the cam and the face of the armature, which causes the cam to rotate freely without affecting the armature and, therefore, the reader drum. The consequence is that while the magnet is energized the record is held in the same position and the sensing pins will repetitively sense the same line of perforations. By means of this arrangement it is possible to hold the record in one position for as many sensing cycles as desired, as, for instance, when some entry will have to be reproduced by all ten perforators, as will be described.

Figure 2:
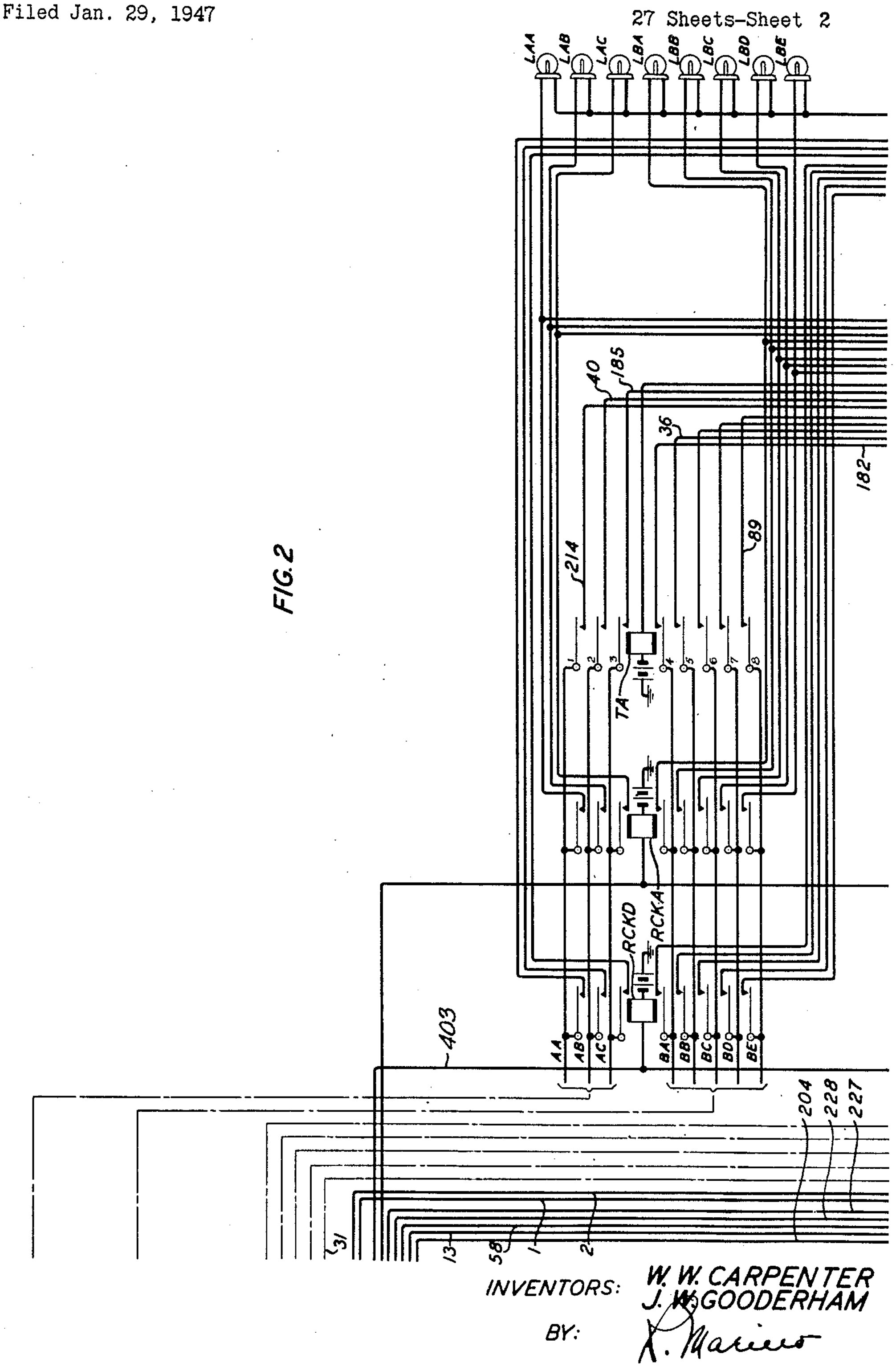
Figure 3:
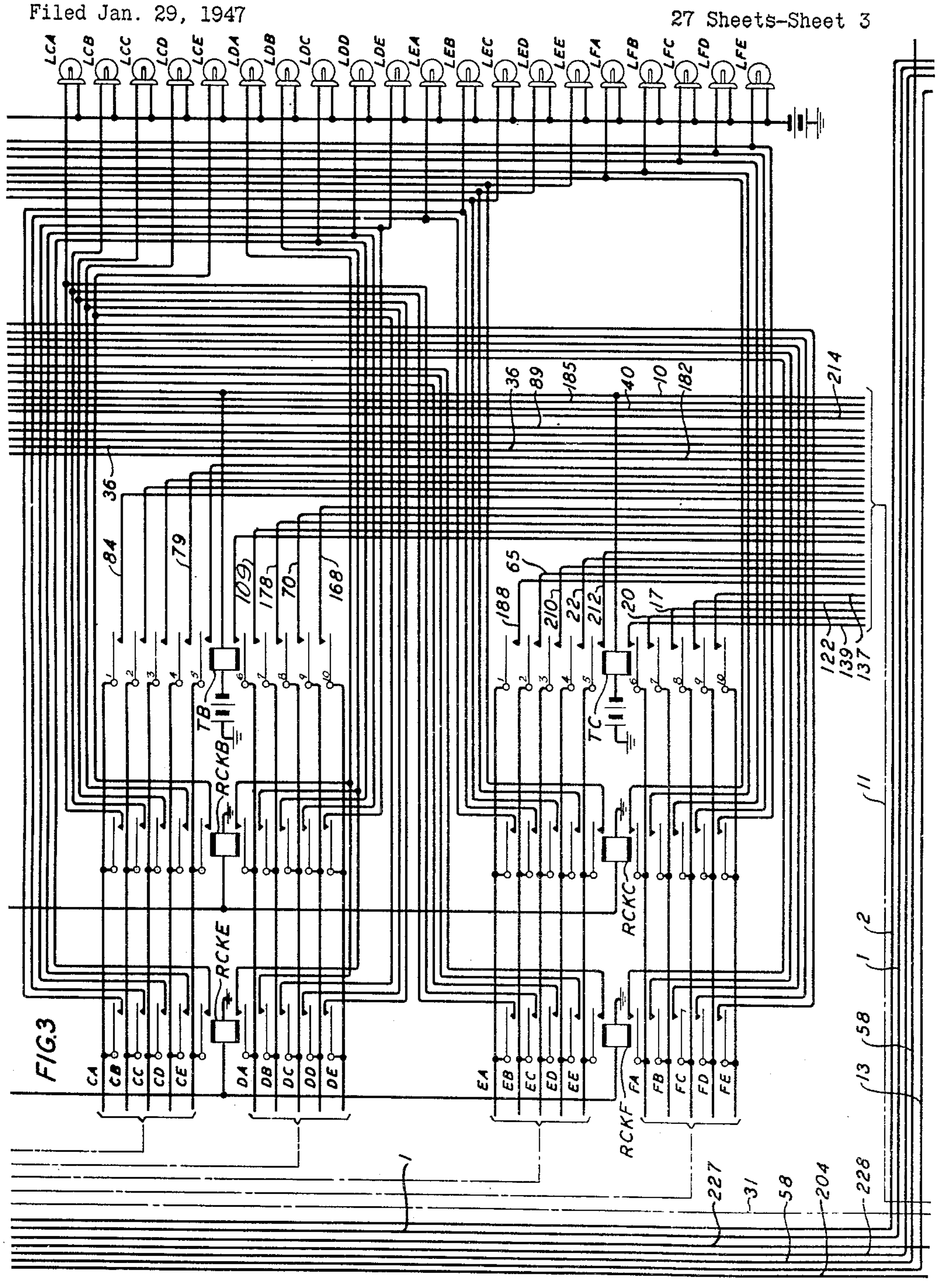
Figure 4:
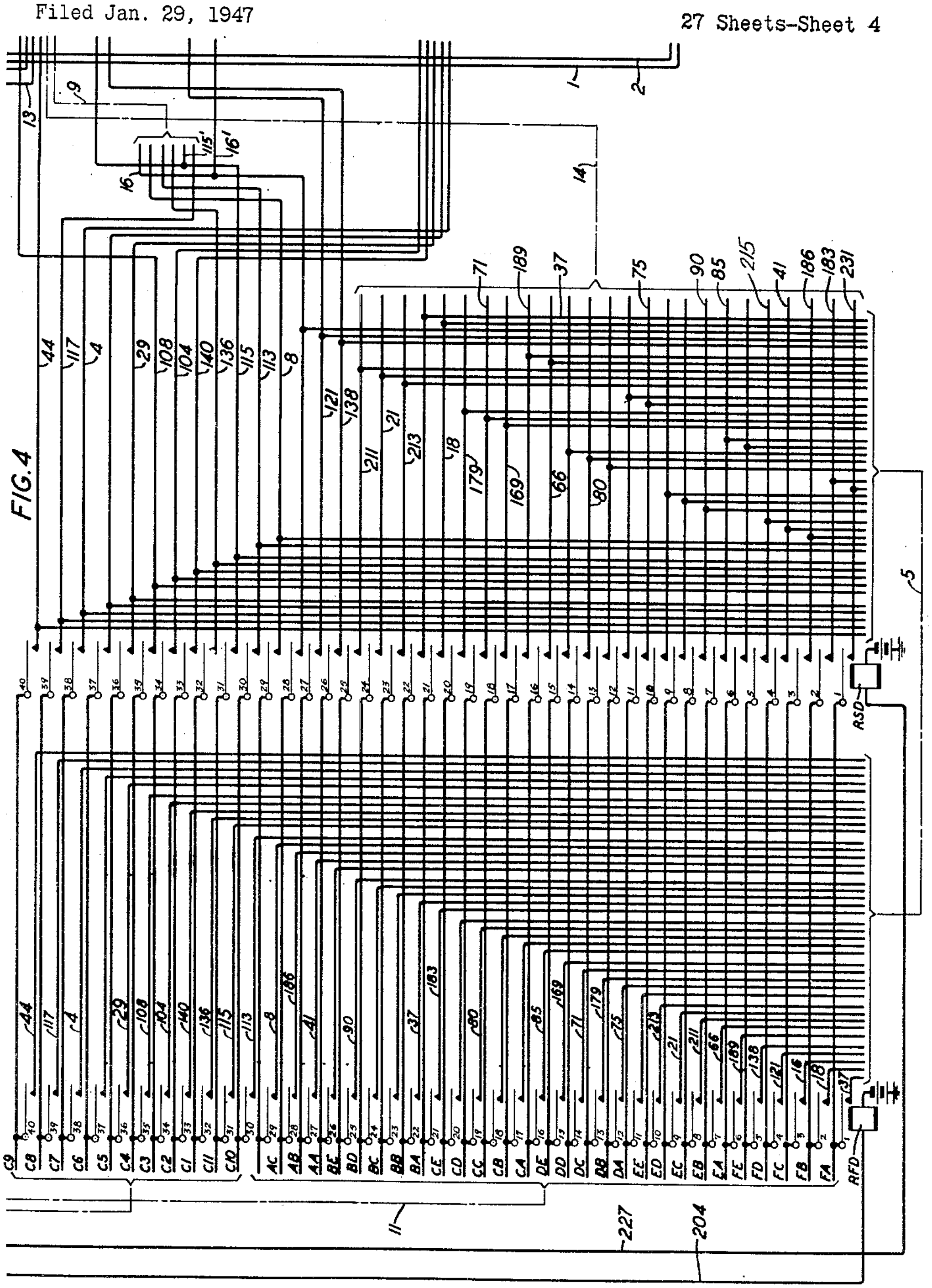

We will now describe the more important circuit elements and briefly outline their functions. In Figs. 2 and 3 are shown three groups of relays, the first group, consisting of relays TA, TB and TC, is for the purpose of extending the reader contacts to the armatures of relays RFD and RSD (Fig. 4), the former being operated when a record is analyzed for the selection of a perforator in accordance with the value of the F digit and the latter when a record is analyzed for the selection of a perforator in accordance with the E digit.

The second group of relays, consisting of relays RCKD, RCKE and RCKF is for the purpose of extending the reader contacts to the bank of lamps LAA . . . LFE, the latter being in parallel with the conductors extending to the relays RFD and RSD. The group of relays RCKD, RCKE and RCKF is operated by means of key RLP (Fig. 1) under the control of operated key FD (Fig. 1), and when, on analyzing the record according to the F digit these relays are operated, those reader contacts which are closed in consequence of the associated pins entering their respective perforations will light corresponding lamps. In case of failure, therefore, the attendant, by operating key RLP and noting which lamps have and which have not lighted, will be able to tell which pins have entered perforations and which have not. It will be noted that with the operation of RCKD, RCKE and RCKF relays the lamps are connected to the reader contacts in the "reverse" order of their respective designations. The reason for this is that the analysis of the central office record tape in accordance with the value of the F digit, hereinafter described as the "first district sort," is accomplished in reverse. That is, the central office record is inserted in the reader in reverse, thus causing the digital perforations in a line of perforations to be sensed by sensing pins of the reader other than those reserved for the indicated digital positions. Thus the perforation position (*aa*) will be sensed by sensing pin FE, position (*ab*) by FD, etc. (as shown in Fig. 1). Since the purpose of the lamp bank LAA . . . LFE is to apprise the attendant by an extinguished lamp in the lamp bank of the absence of a perforation in the record where one should appear, the stationary contacts of the relays RCKD, RCKE and RCKF are wired to the lamps in the same order as the perforation positions on the record tape when the latter is inserted in the reader in reverse, so that if, for example, the circuit fails because of an absence of a perforation in position (*aa*) in the record tape, lamp LAA will not light. It will be noted that the circuit of this lamp, when this group of relays is operated, is closed by reader contact FE.

The third group of relays consisting of relays RCKA, RCKB and RCKC is for the purpose of extending the reader contacts to the lamp bank LAA . . . LFE in the same order as the perforation positions on the record tape when the latter is inserted in the reader directly and not in reverse. When a record tape produced by the present invention (that is, a tape produced by one of the perforators of the invention in consequence of sensing the central office record tape in accordance with the value of the F digit) is to be analyzed according to the value of the E digit, hereinafter termed "second district sort," the record tape is applied to the reader in the order in which it was produced; that is, the perforation positions thereof appear for sensing directly under the sensing pins reserved for this sensing. Thus perforating position (*aa*) will be sensed by sensing pin AA, position (*ab*) by sensing pin AB, etc. Since the purpose of operating the relays RCKA, RCKB and RCKC is to apprise the attendant by an extinguished lamp in the lamp bank of an absence of a perforation, or perforations, on second district sort, the stationary contacts of these relays are wired to the lamp bank in the same order as the reader contacts, so that both the designations of the reader contacts and those of the lamps will correspond. The relays RCKA, RCKB and RCKC are operated by key RLP under the control of operated second district sort key SD.

Figure 5:
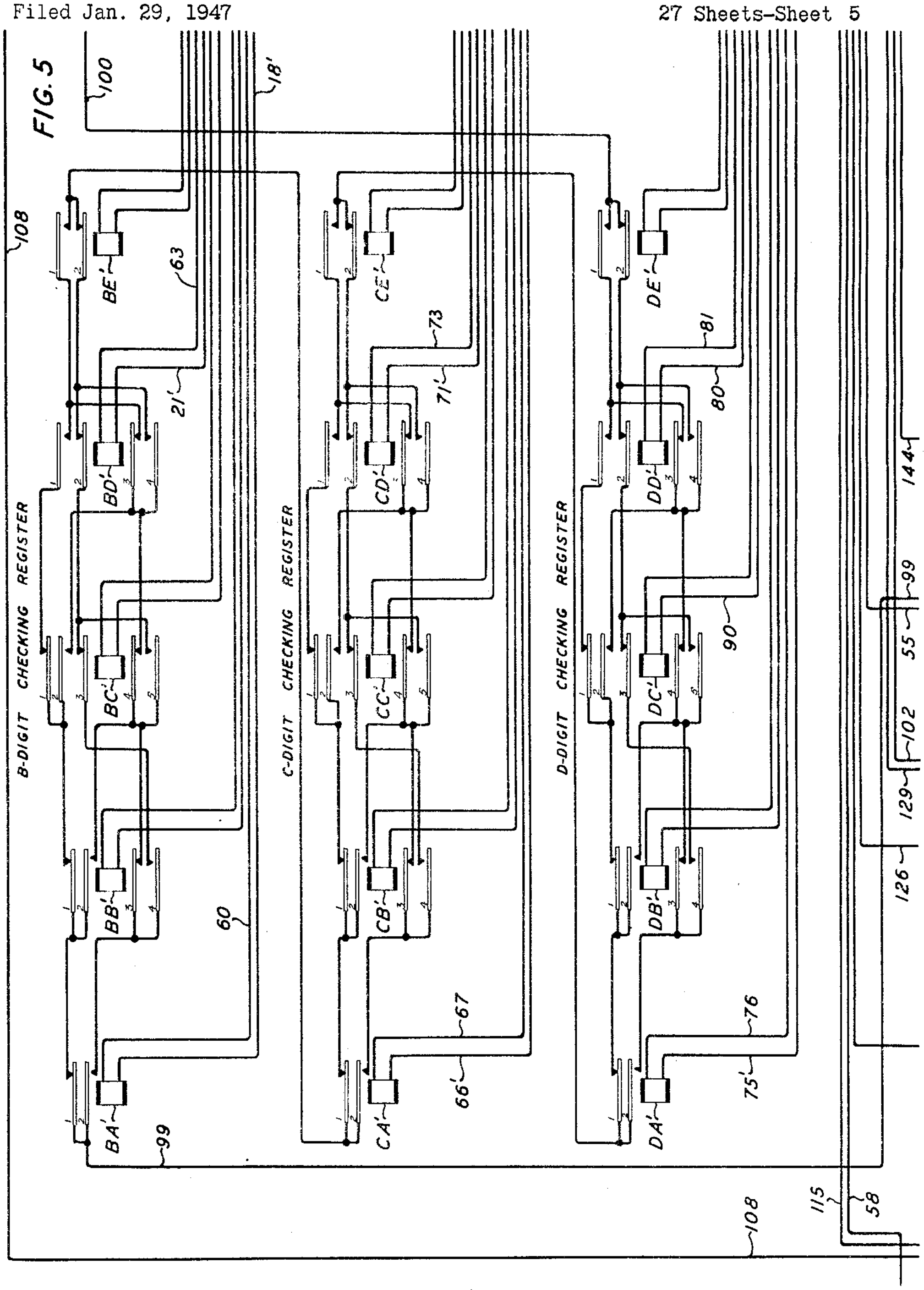
Figure 6:
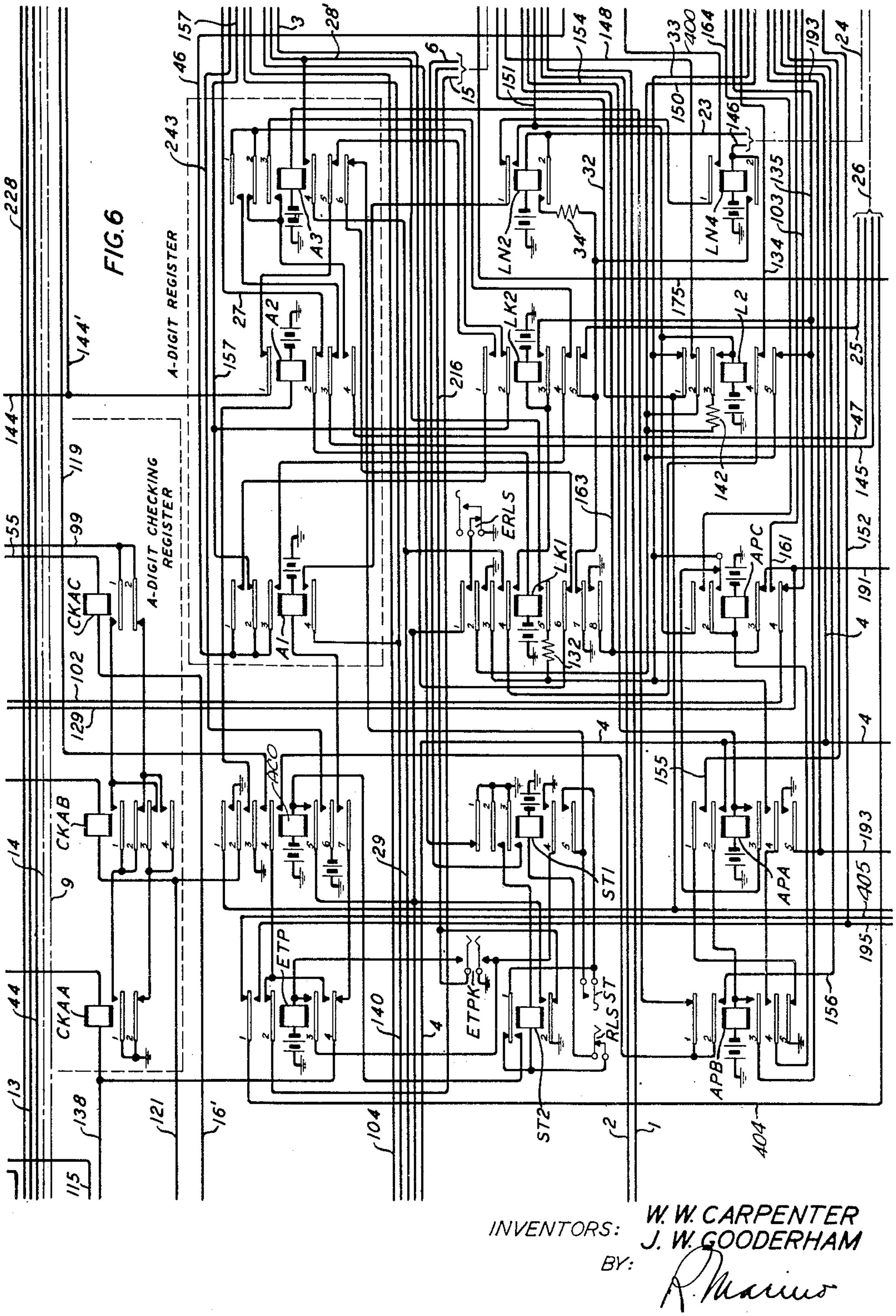
Figure 8:
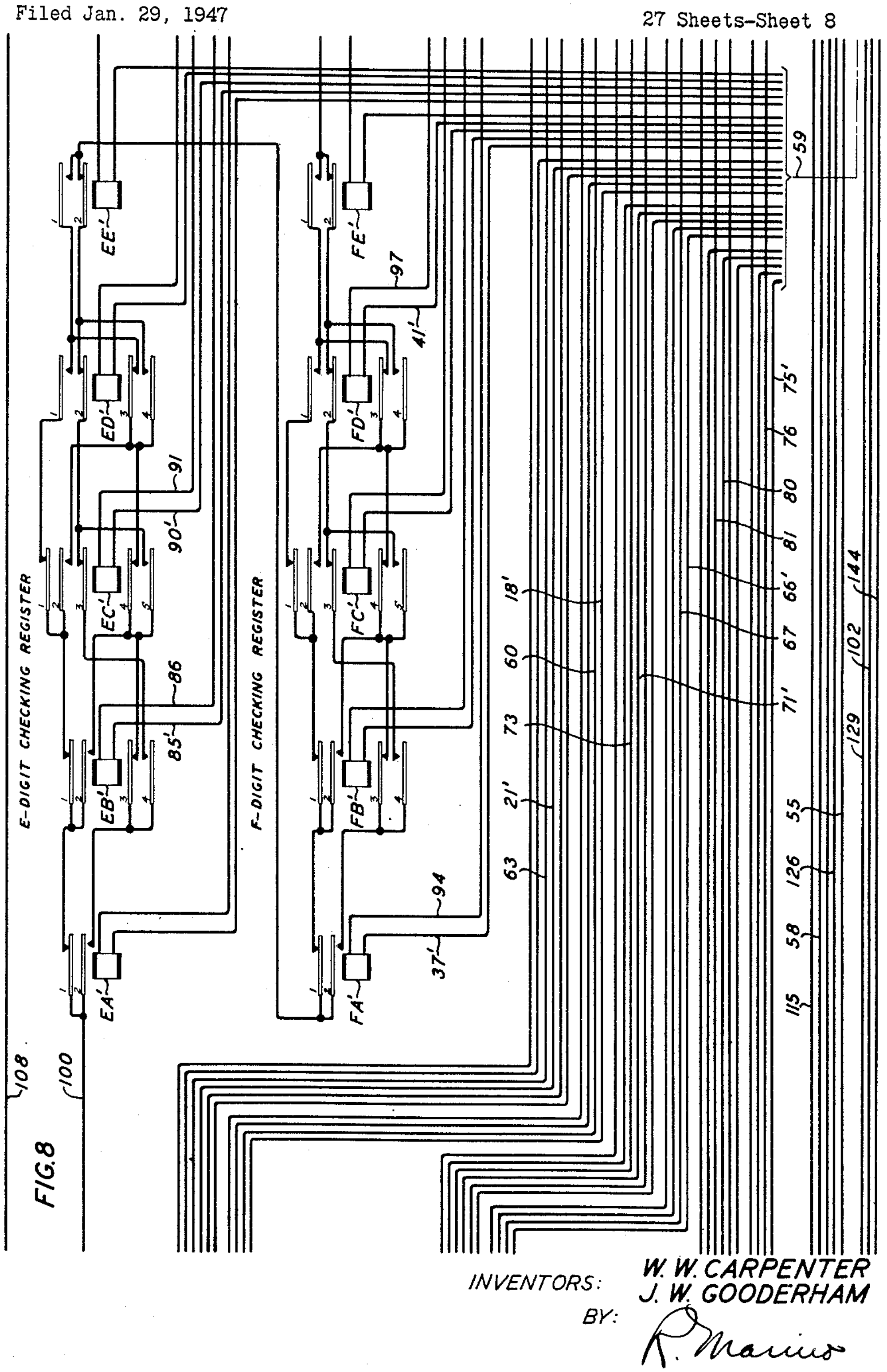

In series with each reader contact is a "check" relay the circuit of which is completed through the winding of the appropriate punch magnet of a connected perforator. The three checking relays for the three reader contacts of the A digit are shown in Fig. 6 within the dotted box designated "A digit checking register" and are designated as CKAA, CKAB and CKAC. The five checking relays for each of the remaining five groups of reader contacts are shown in Figs. 5 and 8 under appropriate headings, each of the relays bearing a "primed" designation identical to that of the reader contact with which it is in series.

It is the purpose of the relays of the A digit-checking register to indicate that one and only one perforation is always found in the three punch positions reserved for the A digit, and it is the purpose of the five relays in each of the other digit-checking registers to indicate that two and only two perforations are found in each of the five position reserved for each of the other five digits. Should no perforation or more than one perforation be found for the A digit, or less than two or more than two be found for each of the other five digits, further operations are immediately suspended since an operation of less than one or more than one check relay in the A digit-checking register and less than two or more than two in each of the other digit-checking registers, indicates a trouble requiring investigation.

A number of regular digit registers are provided for the performance of divers functions. An A digit register comprising the relays A1, A2 and A3 shown in Fig. 6 selectively responds to the sensing of the value of the A digit in the record tape and controls the operation of the assembler in accordance with which relay operates. The B digit register shown in Fig. 18 responds to the sensing of the B digit of the record tape under analysis, and in conjunction with the A digit register and sometimes the C digit register shown in Fig. 17 controls operations as determined by the value of the control number which may consist of only the A digit or the A and B digits or the A, B and C digits.

Figure 19:
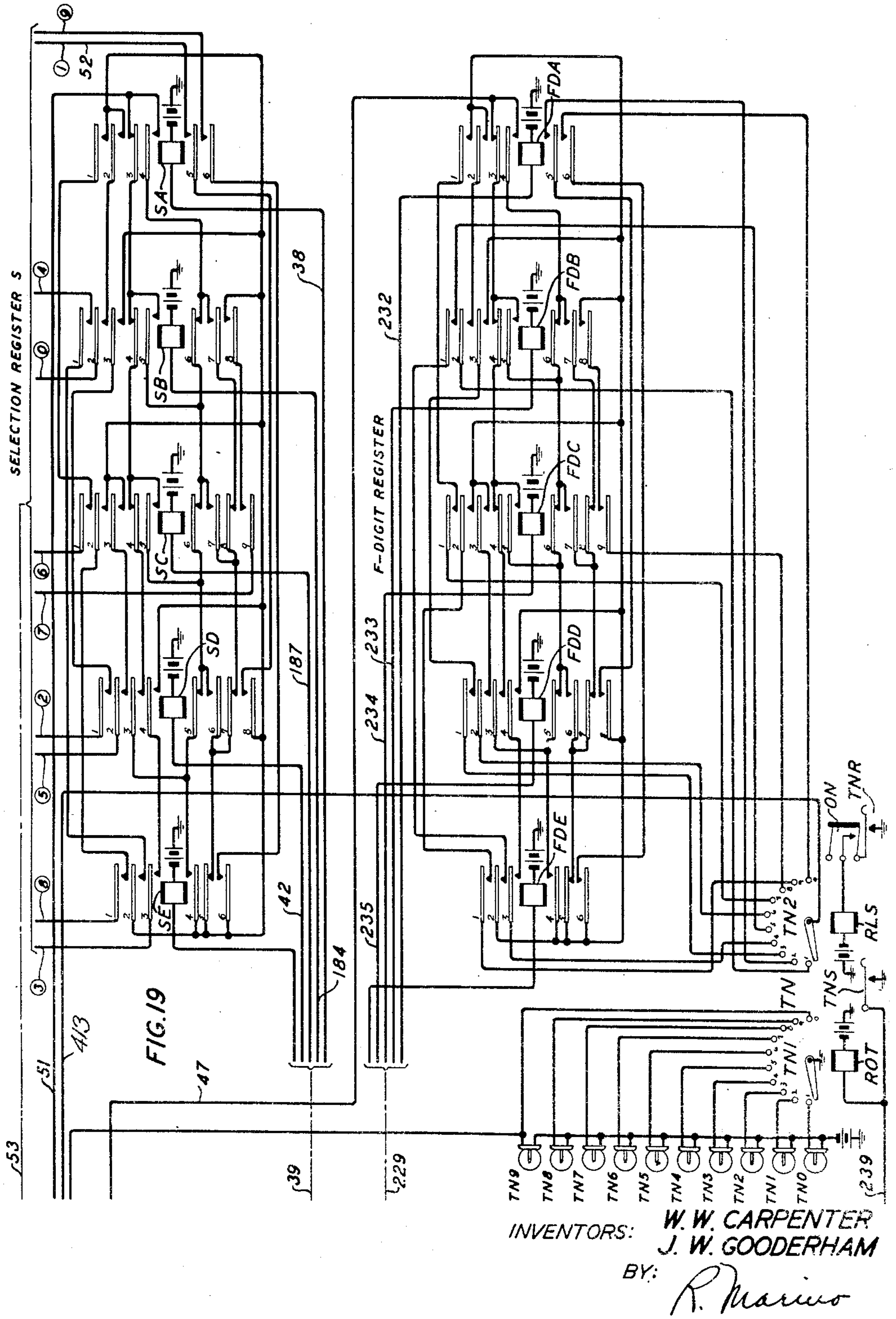

The F digit register shown in the lower half of Fig. 19 is used on second district sort only to check the value of the F digit, and in combination with switch TN checks that the tapes being sensed are arranged in an ascending numerical order with respect to the F or units digit thereof. If the tapes are not spliced together in this order, or should they be inserted in the reader in any other order but the indicated consecutive numerical order, the relays operated in the F digit register will indicate the fact, block further operations and bring in an alarm.

Figure 15:
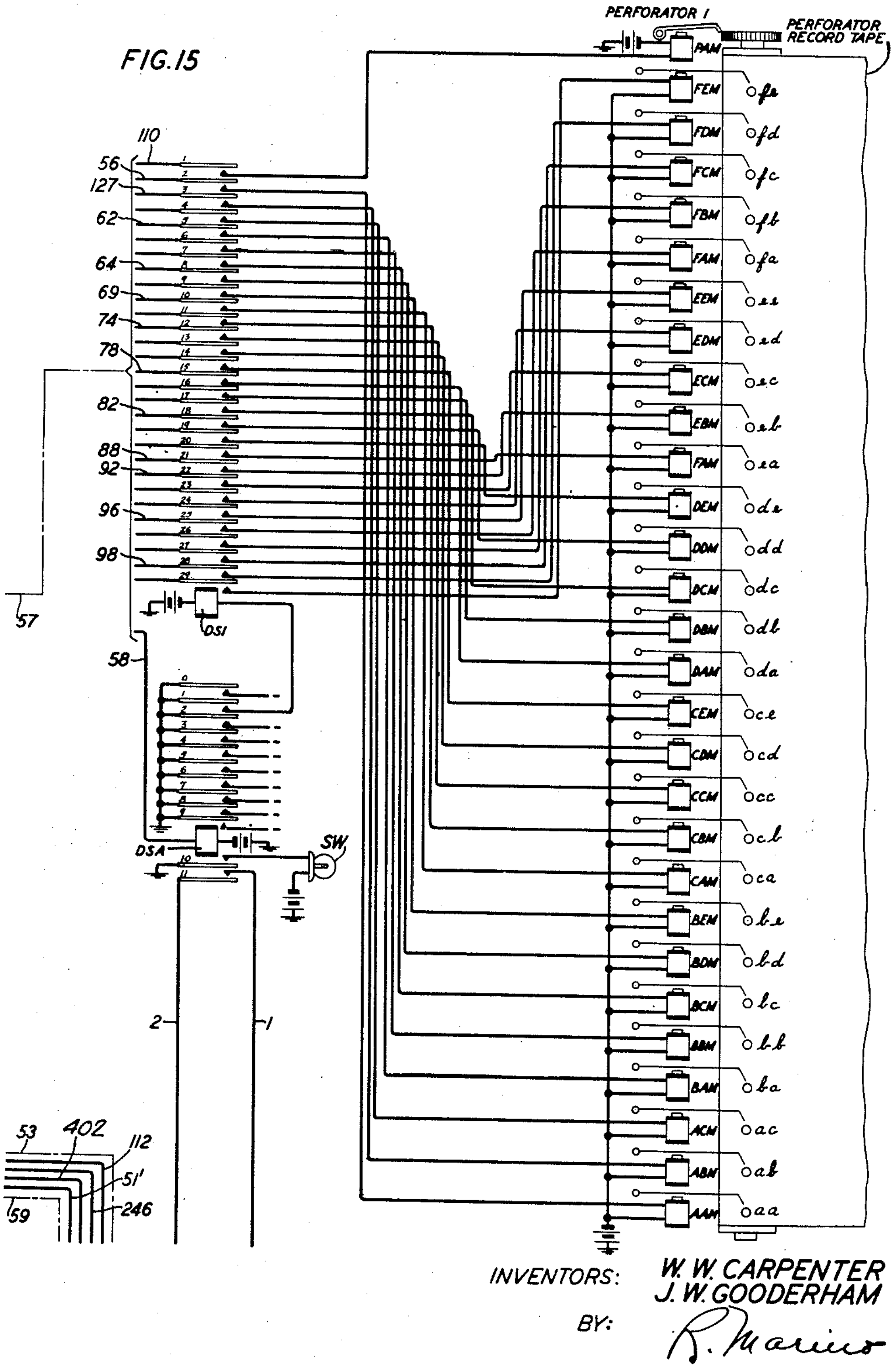

The selection register S shown on the upper half of Fig. 19 is the register indicated in Fig. 22 above discussed, and is the one which determines which of the ten perforators is to be connected to the sensing pins of the reader. On first district sort (that is, on the analysis of the central office record tape) the five relays SA . . . SE of the selection register are extended via the operated contacts of relay FDS (Fig. 17) to the five reader contacts FA . . . FE the sensing pins associated with which sense the F or units digit of the district number on the first line of all entries. The setting of this register then completes the operating path of the group of cut-in relays P0A, P0B, P0C . . . P9A, P9B, P9C (shown in Fig. 12) which connects with the desired perforator. The circuit of one of said perforators (perforator No. 1) is shown in Fig. 15.

On second district sort (that is, on analysis of the ten tapes produced by the assembly as a result of analyzing the central office record tape on first district sort) the five relays of the selection register are extended, via the operated contacts of relay SDS (Fig. 17), to the five reader contacts of the sensing pins EA . . . EE which sense the E or tens digit of the district number on the first line of all entries, reproduced from the central office record tape on first district sort, and control the selection of the required perforator.

Figure 7:
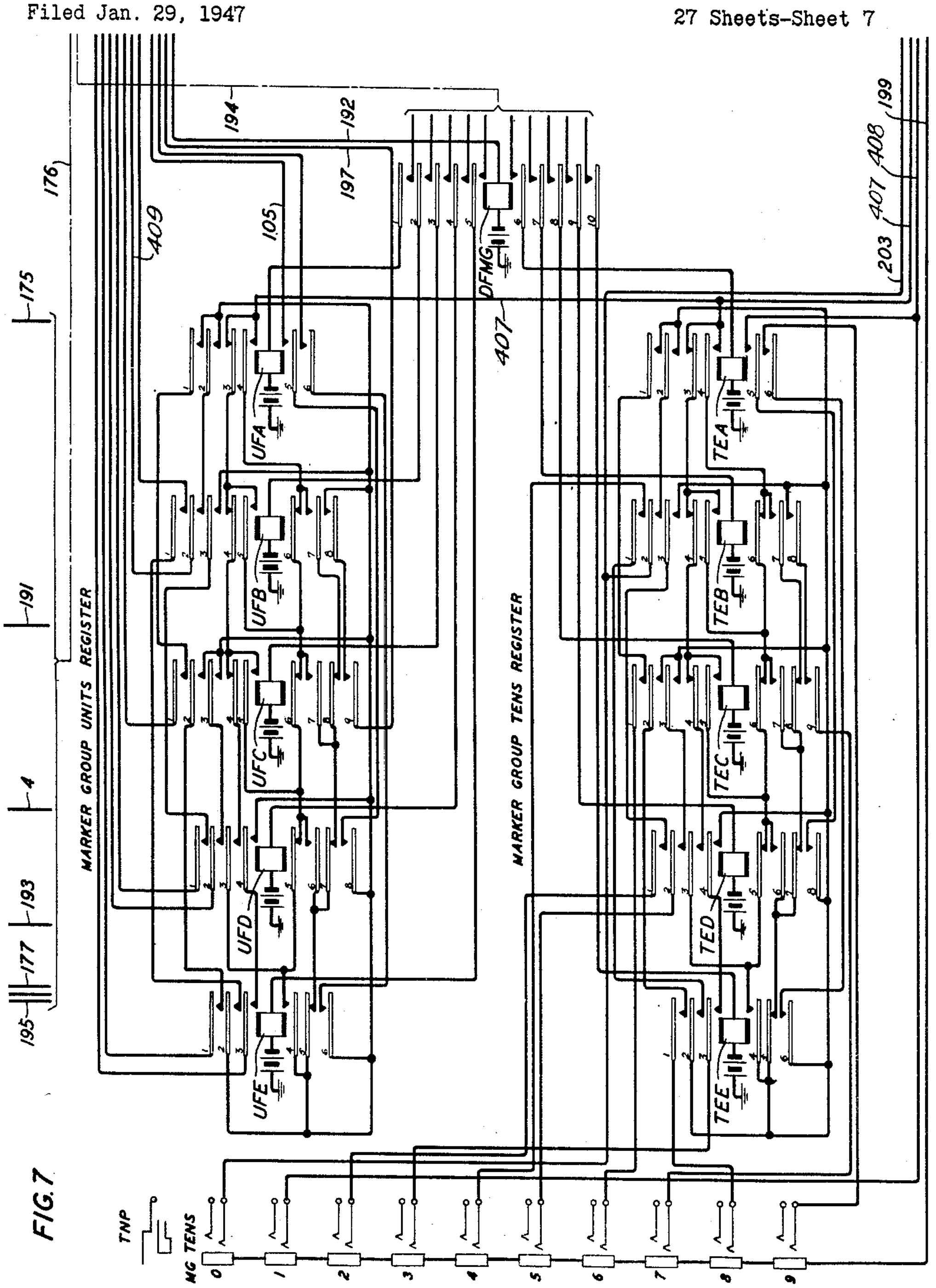
Figure 14:
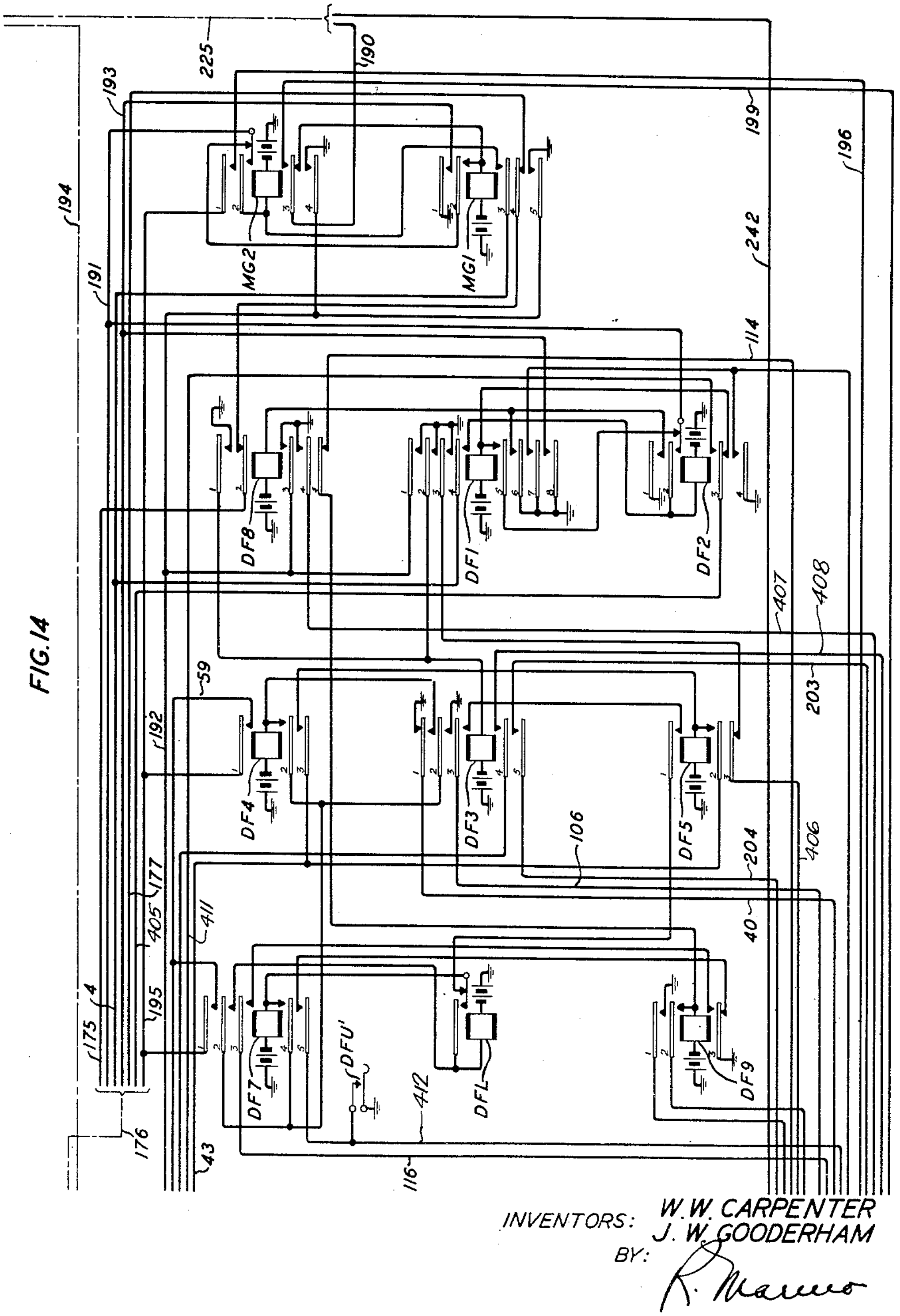

The two registers designated Marker group tens register and Marker group units register shown in Fig. 7 are used to "check" the marker group record in the five end-of-tape entries. This check is accomplished in conjunction with the two sets of jacks designated MG tens and MG units shown, respectively, in Figs. 7 and 10, and in conjunction with the control circuit shown in Fig. 14. When a central office record tape is to be analyzed it is essential that the apparatus of the present invention be manually adjusted to conform with the particular marker group number whence the record tape originates and recorded in the E and F digits of the marker group entry. This manual adjustment is made by inserting the plug TNP in the jack of the MG tens group designating the tens digit of the marker group and the plug UNP in the jack of the MG units group designating the units digit of the marker group. When the reader senses the marker group entry, the E and F digits of the latter are registered in the tens and units marker group registers. If this registration agrees with the digital designation of the jacks into which the plugs TNP and UNP are inserted, sensing operations are allowed to proceed; otherwise the circuit is blocked and an alarm is given.

Figure 10:
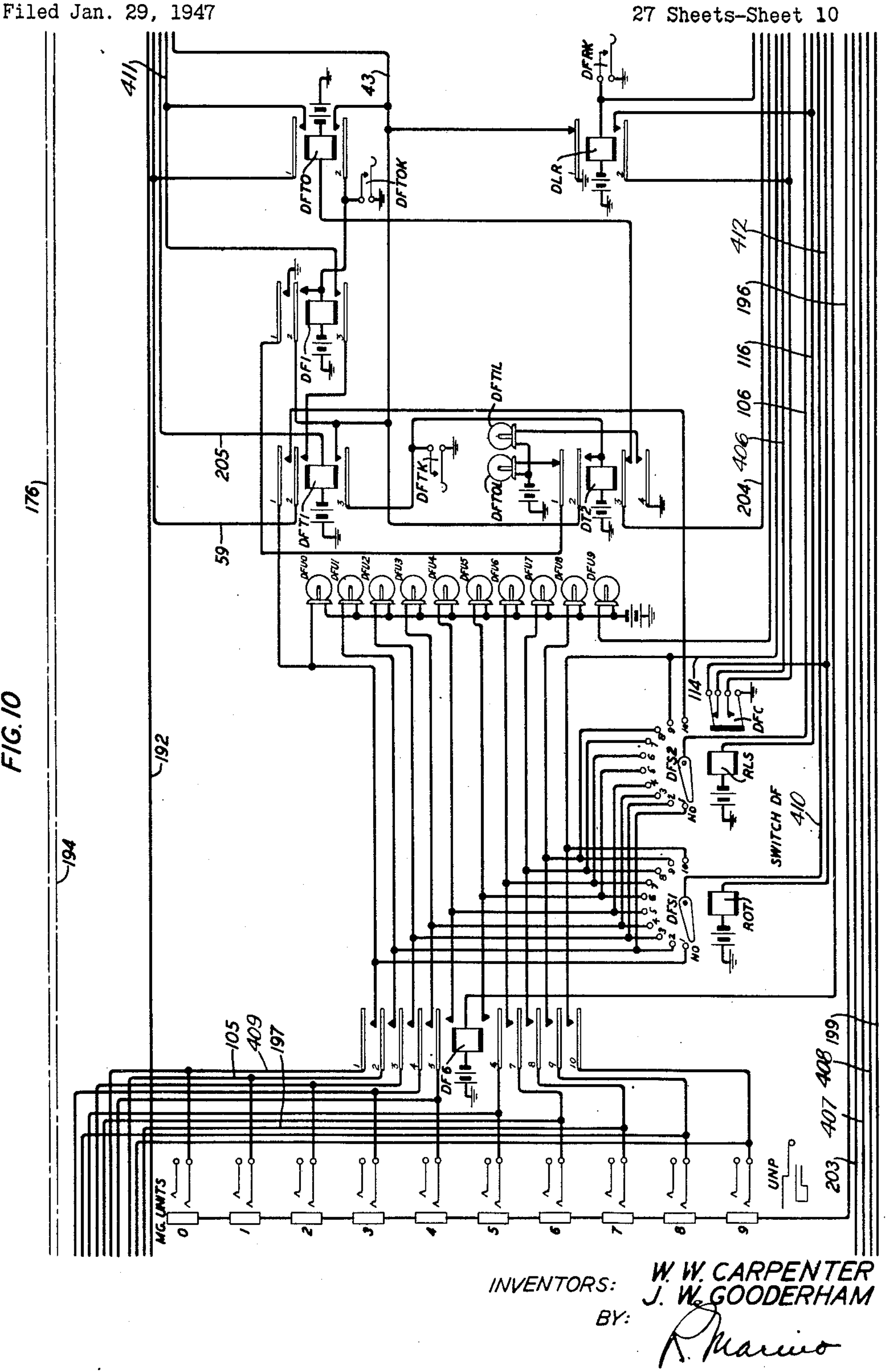

In sensing the tapes from a particular marker group it is further essential that the tapes be inserted in the reader in the ascending and consecutive numerical order indicated by the district frame entry number, that is, the E and F digits of the frame entry. To insure that this order of tape analysis is followed the check switch DF and the control circuit shown in Fig. 10 are provided. The first tape analyzed (from a particular marker group) should have the district frame entry "380000" and the next should have "380001," etc. The switch DF, being in its "0" position (to which it should be placed by operating key DFUK at the beginning of sensing operations) tests for the "0" digit and for succeeding digits thereafter on the succession of tapes from the different district frames of the same marker group. Should the tapes be applied to the reader in a different order than the ascending consecutive order, operations are suspended and an alarm is given.

All of the equipment of the invention comprises relays of the well-known type; the switches TN and DF are of the type disclosed in Patent No. 1,520,821 while the perforator shown in Fig. 15 (of which ten are provided for the invention) comprises twenty-eight (28) punch magnets AAM . . . FEM, punch pins and a tape roll identical in construction to those of the reader, and a magnet PAM which drives the roll step by step by means of a pawl engaging a ratchet mounted in the roll shaft.

Having given a brief outline of the main elements of the invention, we will now describe its detailed operation.

SECTION III.—FIRST DISTRICT SORT

1. *Answer or disconnect entry*

To initiate the operation of the circuit, the central offices record is inserted in the reader in reverse as shown in Fig. 1, motor key MO, first district sort key FD, and start key ST (Fig. 6) are operated. The operation of key MO completes the circuit of relay MOT over a path which may be traced from ground on the contacts of key MO, conductor 1, No. 2 contacts of relay AL, conductor 2, winding of relay MOT to battery, operating this relay and causing the power supply 110 v. to be applied to the motor, whereupon the operation of the reader is started, the sensing fingers AA . . . FE thereof being reciprocated against the surface of the record to be analyzed and the contacts C1 . . . C11, controlled by the cams mounted on the reader shaft, being caused to go through their respective cycles of closing and opening said contacts in the various sequences and for the various durations determined by the individual cams as indicated on Figs. 23B, 23C and 23D. Among other functions to be described later, the operation of key FD completes a circuit for relay FDS, which circuit may be traced from ground on the No. 2 upper contacts of key FD, conductor 13, winding of relay FDS to battery, causing said relay to operate. Key FD also completes the circuit of relay DSA over a circuit which may be traced from ground on the No. 3 lower front contacts of key FD, conductor 58 within bracket 57, winding of relay DSA to battery. Relay DSA operates, completes an obvious circuit for lamp SW over its No. 10 contacts, completes ten other obvious circuits, one to each of the ten relays DS0 . . . DS9 individual to each of the ten perforators 0 . . . 9, whereby the punch magnets AAM . . . FEM and the stepping magnet PAM of each of said reperforators are extended to the stationary contacts of the corresponding cut-in relays PXA . . . PXC and, over its No. 11 contacts, short-circuits the No. 2 contacts of the alarm relay AL whose function will be later described.

Key FD further completes an obvious circuit for relay RFD over conductor 204 to the No. 1 top contacts of said key, and said relay, in operating, extends via the relays TA, AB and TC the leads connected to the reader contacts AA . . . FE and the leads connected to the control contacts C1 . . . C11 to the internals of the circuit network for the performance of functions to be described hereafter. Key FD also completes a circuit for the reader stepping magnet STP, which circuit may be traced from battery, resistance 115, No. 4 contacts of key FD, winding of magnet STP, contacts of key RSC, contacts C8 to ground. When the reader shaft rotates to the point where the latter contacts are closed, the magnet STP operates and advances its pawl to the next notch of the ratchet wheel secured to the record-advancing drum and holds the drum (and the record) in a fixed position with a transverse line of record perforations opposite the sensing pins AA . . . FE. The magnet STP is maintained in this operated position for the period during which contacts C8 are closed, at the opening of which the magnet may or may not release as explained below. If it does release, then the drum is rotated one step forward and the record is advanced to the next line of perforations.

It is necessary, however, to hold up the advance of the record until the line of the entry which is being sensed has been reproduced on the tape of the perforator which is selected for the reproduction of this line of the entry. Otherwise if the drum is rotated before this occurs and the record is advanced to the next line of perforations, the reader (that is, the sensing pins AA . . . FE) might proceed to sense the next line of perforations (which may be the succeeding line of the same entry or the line of an entirely new entry) while the selected perforator is still connected to the circuit for the perforation of the preceding line, in which event the perforations of the succeeding line would be superimposed upon those of the first line and thus produce a false record. Therefore to prevent the advance of the record while a line of the entry is being reproduced on a selected perforator, relay RS1 is provided which, as will be explained later, operates in response to the completion of perforating operations by the selected perforator. So long as relay RS1 is normal, therefore, it acts as a signal that the record must not be advanced even though, during this waiting period, the sensing pins AA . . . FE of the reader continue to sense, with each rotation of the reader shaft, the same line of perforations. Hence to hold the record in the same position during the normal condition of relay RS1, a holding ground is provided for the reader magnet STP, which may be traced from ground on the No. 4 contacts of relay RS1, conductor 117 within brackets 9 and 5 in the order named, No. 39 contacts of relay RFD, to conductor C8 within bracket 31 (said conductor being designated the same as the contacts C8 to which it is connected), contacts of key RSC, winding of magnet STP, thence as previously traced to battery. Thus the magnet STP will release only if relay RS1 is operated and contacts C8 are opened, at which time the magnet armature will release and the pawl thereof rotate the reader drum one position to advance the record to the next line of perforations.

The closure of key ST completes a circuit for relay ST1, which circuit extends from battery through the winding of relay ST1, contacts of release key RLS, No. 1 back contacts of relay ST2, contacts of key ST, No. 6 contacts of relay A3, No. 6 contacts of relay LK1, conductor 3, No. 1 contacts of relay RS3, conductor 4 within bracket 5, No. 38 contacts of relay RFD, conductor C7 within bracket 31, contacts C7 (when closed) to ground.

From Fig. 23C it will be observed that the common reader contacts C3 and C7 are timed to be open during the period when the sensing pins AA . . . FE have penetrated perforations and therefore during the time when their associated reader contacts are closed. It will be observed, further, that the common contacts C3 and C7 are closed when the sensing pins are not engaging the record. Therefore the above traced circuit for relay ST does not become effective until contacts C7 are closed, which will be when the sensing pins are not engaging the record and when their associated reader contacts are opened.

When relay ST1 operates, a circuit path is completed for the three relays TA, TB and TC, which circuit extends from battery severally through the windings of said relays, conductor 10 within bracket 11, No. 29 contacts of relay RFD, conductor 8 within brackets 5 and 9 in the order named, No. 1 back contacts of relay TR1, conductor 6 within bracket 7, to ground in the No. 3 contacts of relay ST1. Relays TA, TB and TC operate.

Through its No. 2 contacts relay ST1 further applies ground to one side of the winding of relay ST2, the other side of said winding being grounded by the aforesaid contacts C7. When these contacts break at the beginning of the closed period of the sensing cycle, relay ST2 operates in series with relay ST1 over a circuit path extending from battery through the winding of relay ST1, contacts of key RLS, winding of relay ST2, to ground on the No. 2 contacts of relay ST1. On the next closure of contacts C7 at the end of the closed period of the sensing cycle, a path is closed for relay AC0 which extends from battery through the winding of said relay, No. 1 front contacts of relay ST2, No. 5 contacts of relay ST1, and thence as previously traced to ground on contacts C7. Relay AC0 operates and locks to ground on the No. 2 front contacts of relay ST2. The operation of relays AC0, TA, TB and TC extends the conductors severally connected to the twenty-eight (28) reader contacts to the relays of the assembler.

On the third sensing cycle of the reader shaft, and since relays AC0, TA, TB and TC are now operated, circuits are completed to certain relays of the assembler circuit or to certain magnets of a selected perforator in consequence of certain of the sensing pins AA . . . FE entering oppositely located perforations in the central office record.

We may now proceed with the description of concrete examples of sensing different types of "entries" in the record. It will be recalled from the description of the central office record tape that the entries first encountered by the sensing pin of the reader are the splice pattern entries and the end-of-tape entries (see Fig. 26). These entries as sensed are reproduced by all ten perforators. For convenience of description, however, and in order to better facilitate an understanding of the operation of the assembler, the operation of the latter in response to the sensing of the splice and end-of-tape entries will be postponed until its operation has been described with respect to the regular call entries and certain other entries. It will be assumed, therefore, that the central office record tape has been regularly advanced beyond the end-of-tape entries to the first call entry which may be supposed to be an answer or disconnect entry. It should be understood, however, (and as just stated) that while the operation of the invention will be described in connection with the sensing of entries in an order best suited to develop the operation of different parts of the assembler, that this order is not the one in which the entries appear for sensing, said last-mentioned order being the one indicated at the beginning of this paragraph.

It will now be assumed that, for the purpose of illustration, the six digits A . . . F of an answer and disconnect entry have the specific values "211171," as shown in Fig. 24B.

As previously stated, the digital values punched in the B, C and D digit positions of the central office record tape represent the time of answer, or disconnect, in terms of tens of minutes (B digit), minutes (C digit) and tenths of minute (D digit). The digital values punched in the E and F digit positions represent the number of the district selector (or junctor or trunk) over which the telephone connection was established in the central office where the record being analyzed was produced. In the present example, the district used for the connection is assumed to have the number 71, the numeral 7 being the "tens" digit recorded in the E digit position and the numeral 1 being the "units" digit recorded in the F digit position.

With the above understanding of the significance of the numerals recorded in each of the digital positions A . . . F of the single line answer and disconnect entry being sensed, those operations of the assembler circuit which occur in response to the sensing of this entry will now be described.

As previously pointed out, the operations of the circuit have advanced to the point where the reader contacts AA . . . FE have been extended by the operation of relays TA, TB, TC and AC0.

As shown in Fig. 24B, there is one hole punched in the punch position (*Ab*) for the assumed digital value "2" of the A digit and two holes punched in the indicated position in the record tape for each of the other digital values of the digits B . . . F, inclusive. For the latter digits, there will always be two relays or magnets, and only two, selectively operated (as will be shown) according to which two punch positions are perforated in each of the indicated digital orders on the record tape, while one relay or magnet, and only one, is selectively operated (as will be shown) for the A digit in accordance with which one of the three punch positions of the A digit will have been punched on the record tape. Consequently when sensing pin FD engages the hole in position (*Ab*) a circuit will be completed for relay A2 of the A register over the following path: battery through the winding of relay A2, No. 2 contacts of relay AC0, conductor 121 within bracket 5, No. 4 contacts of relay RFD, conductor 122 within bracket 11, No. 9 contacts of relay TC, reader contacts FD, to ground. Relay A2 thus operates and registers in the A register the digital value 2 of the A digit.

With relay A2 operated, ground is applied to conductor 51 over the following path: ground on contacts C9 (said contact being grounded during the closed period of the sensing cycle as shown in Fig. 23B), No. 40 contacts of relay RFD, conductor 44 within bracket 5, No. 2 contacts of relay TST2, conductor 45, No. 1 contacts of relay AL, conductor 46, No. 2 contacts of relay A1, No. 2 contacts of relay LK2, No. 2 contacts of relay A3, No. 4 contacts of relay A2, conductor 47 within bracket 26, No. 2 contacts of relay FDS, conductor 48 within bracket 49, No. 4 back contacts of relay CE2, conductor 50, No. 1 contacts of relay RS1, conductor 51 to the No. 3 back contacts of relay SA of the selection register S. Conductor 51 is a lead which is common to the five relays SA . . . SE of this register and, as will be shown, is the conductor over which a circuit will be completed to the group of cut-in relays P0A, P0B, P0C . . . P9A, P9B, P9C individual to the perforator indicated by the setting of the relays of this register.

In the B digit position of the record the digital value "1" is recorded with perforations punched in positions (*Ba*) and (*Bd*) of the record. Since, according to Fig. 1, these perforations are sensed by the pins FB and ED, respectively, the following circuits are completed for relays B1A and B1D of the B register: (1) Ground on the reader contacts FB, No. 7 contacts of relay TC, conductor 20 within bracket 11, No. 2 contacts of relay RFD, conductor 18 within brackets 5, 14 and 19 in the order named, to battery through the winding of relay B1A; (2) ground on the reader contacts ED, No. 4 contacts of relay TC, conductor 22 within bracket 11, No. 9 contacts of relay RFD, conductor 21 within brackets 5, 14 and 19 in the order named, to battery through the winding of relay B1D. Relays B1A and B1D operate over these circuits to register the digital value "1" in the B register. It will be noted that relay B1A closes an obvious circuit for relay B2A and that relay B1D closes an obvious circuit for relay B2D. Both of these latter relays operate but perform no function in connection with the sensing of the answer or disconnect entry.

As previously stated, the digital value "2" in the A digit of the record indicates an "answer" or "disconnect" entry. Now it will be recalled that relay FDS was operated in response to the operation of the first district sort key FD. Among its other functions this relay, when operated, extends the windings of five relays SA . . . SE of the selection register S to the five sensing pins AA . . . AC and BA and BB which, according to Fig. 1, are sensing the F or units digit perforations of the district number punched on the record. It has been assumed that the units digit of the district number is "1" and that, accordingly, holes are punched in the punch positions (*Fd*) and (*Fa*) of the F digit. Since, as noted in Fig. 1, these two punch positions are sensed by pins AB and BB, respectively, ground will be connected to their respective reader contacts to complete the following two circuits for the operation of relays SD and SA, respectively: (1) Ground on the reader contacts AB, No. 2 contacts of relay TA, conductor 40 within bracket 11, No. 27 contacts of relay RFD, conductor 41 within brackets 5 and 14 in the order named, No. 9 contacts of relay FDS, conductor 42 within bracket 39, winding of relay SD to battery; (2) ground on the reader contacts BB, No. 5 contacts of relay TA, conductor 36 within bracket 11, No. 22 contacts of relay RFD, conductor 37 within brackets 5 and 14 in the order named, No. 12 contacts of relay FDS, conductor 38 within bracket 39, winding of relay SA to battery. Both relays SD and SA operate to cause the selection of the perforator No. 1 in accordance with the value of the units digit "1" registered in the F digit position of the record. As will be shown, the "answer" or "disconnect" message "2 1 1 1 7 1" will be recorded on the record tape controlled by this perforator and in the identical code in which it was recorded on the original record tape. In other words, the entire entry is reproduced upon the record tape of the selected perforator.

Figure 12:
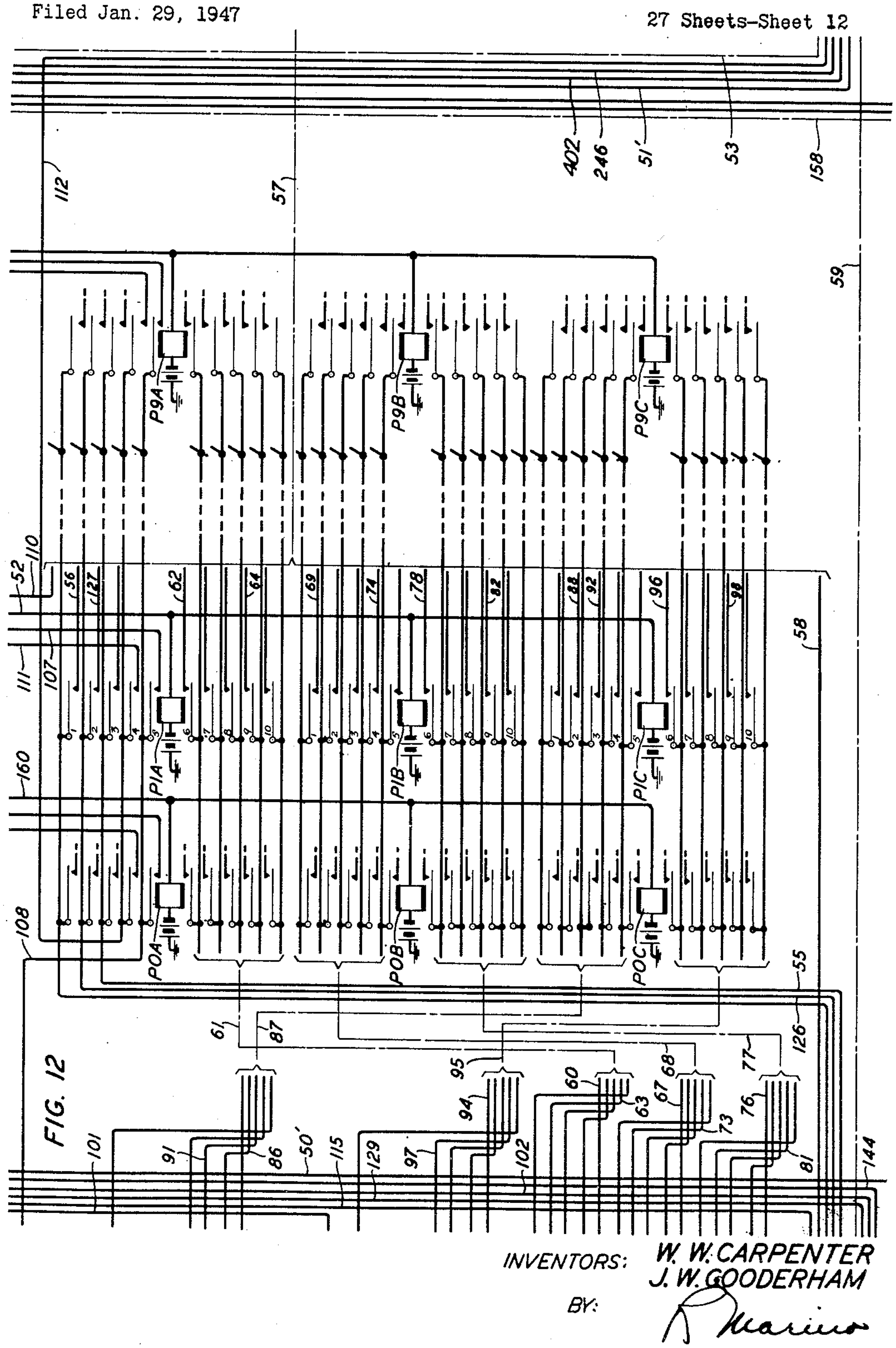

With relays SA and SD thus operated, and remembering that relay A2 is now operated, a circuit is completed for relays P1A, P1B and P1C which are the "cut-in" relays for perforator No. 1 and by means of which the perforator magnets thereof are extended to the reader contacts AA . . . FE; there being, as previously stated and as indicated by Fig. 12, one set of "cut-in" relays PXA . . . PXC for each of the ten perforators 0 . . . 9 but of the latter of which only the magnets of perforator No. 1 are shown in Fig. 15. The circuit path by which relays P1A . . . P1C are operated is as follows: ground from contacts C9 as previously traced to conductor 51, No. 4 contacts of relay SA (which is operated), No. 6 contacts of relay SB, No. 6 contacts of relay SC, No. 6 contacts of relay SD (which is operated), No. 5 contacts of relay SE, No. 8 contacts of relay SD, No. 5 contacts of relay SA, conductor designated by the circled 1 within bracket 53, conductor 52, winding of relays P1A, P1B and P1C, respectively, to battery. These relays operate and connect perforator No. 1 (shown in Fig. 15) to the circuit. Relay P1A, when operated, also completes a circuit for relay PD1 which may be traced from battery through the winding of said relay, conductor 107, No. 5 contacts of relay P1A, conductor 108 within bracket 5, No. 35 contacts of relay RFD and thence to the contacts C4. As noted from Fig. 23B contacts C4 are closed during the closed period of the sensing cycle, ground is then applied thereto and relay PD1 is caused to operate over the above traced circuit. Relay P1A also completes a partial path serially through the paper advance magnet PAM of perforator No. 1 and relay PCK1, said circuit being traced from battery through the winding of magnet PAM, No. 1 contacts of relay DS1 (of perforator No. 1), conductor 110 within bracket 57, winding of relay PCK1, conductor 111, No. 4 contacts of relay P1A, conductor 112, No. 2 back contacts of relay TR3, conductor 113 within brackets 9 and 5 in the order named, No. 30 contacts of relay RFD to contacts C10. As will be noted from Fig. 23D, contacts C10 (and also C11) are out of phase with the sensing cycle, close approximately .006 second after the beginning of the closed period of the sensing cycle and open .006 second after the end of said closed period. The above circuit, therefore, is completed after sensing proper has commenced, at which time the paper advance magnet PAM operates to position its pawl to advance the record tape of perforator No. 1 one step on the release of the magnet, as subsequently set forth, while relay PCK1 operates and locks over its No. 2 contacts, conductor 115 within bracket 5, No. 31 contacts of relay RFD, to ground in contacts C11 which are closed at this time.

Figure 11:
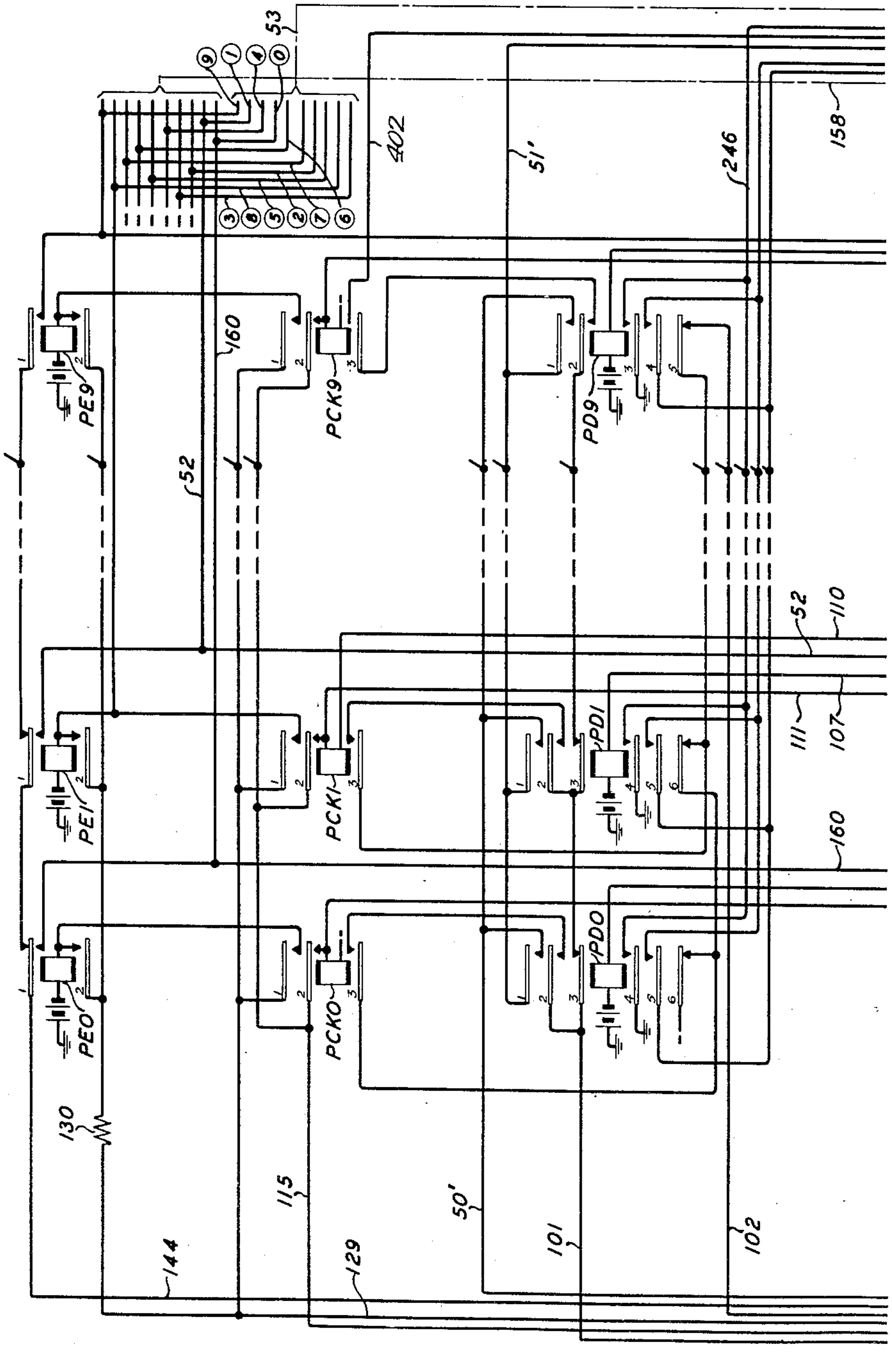

In a similar manner depending upon the value of the F digit and the operation of the two relays out of the five relays SA . . . SE of the selection register S which indicate this digit, the circuit of any of the other nine groups of relays P0A, P0B, P0C . . . P9A, P9B, P9C will be completed over the common conductor 51, to cause the operation of one of the indicated groups of relays and the connection thereby of the corresponding perforator to the assembler, the operation of the associated relay PD– and the operation of relay PCK– in series with the paper advancing magnet PAM of the selected perforator. In order to avoid unnecessary reptition, the number of the perforator which is connected to the assembler in response to the operation of each of the 2-out-of-5 combinations of relays SA . . . SE caused by the sensing of the F digit positions is indicated by the several circled numerals in Fig. 19 on the conductors within bracket 53 which connect with like circled numerals on the conductors in Fig. 11 which connect to the appropriate groups of cut-in relays P0A, P0B, P0C . . . P9A, P9B, P9C associated with each one of the ten perforators.

Once relays P1A, P1B and P1C are operated, the perforator magnets AAM . . . FEM of perforator No. 1 are connected to the reader contacts AA . . . FE through the contacts of said relays, and by the selective operation of the magnets of said perforator as indicated below, one line of perforations across the central office record tape is reproduced on the tape controlled by perforator No. 1.

It has been assumed that the answer or disconnect entry consists of the number 211171, the first digit "2" being the A digit; the second digit "1" being the B digit; the third digit "1" being the C digit; the fourth digit "1" being the D digit; the fifth digit "7" being the E digit, while the sixth digit "1" being the F digit. Since the record is being analyzed backward and in reverse, then, according to Fig. 1, the perforations representing these digits are sensed by the different sensing pins as indicated below, to operate the indicated punch magnets of the selected perforator No. 1. It will be noted from the following table (and from Fig. 15) that the punch magnets of the perforator are given the same letter designation as the punch pins except that the letter "M" is additionally affixed:

| Digit | Punch Positions on the Record | Sensed by | Punch Magnets Operated |
|---|---|---|---|
| 2(A) | *Ab* | FD | ABM. |
| 1(B) | *Ba*, *Bd* | FB, ED | BAM, BDM. |
| 1(C) | *Ca*, *Cd* | EB, DD | CAM, CDM. |
| 1(D) | *Da*, *Dd* | DB, CD | DAM, DDM. |
| (7)(E) | *Eb*, *Ec* | CA, BE | EBM, ECM. |
| 1(F) | *Fa*, *Fd* | BB, AB | FAM, FDM. |

Accordingly, upon the operation of relays P1A, P1B, P1C the following circuits are completed from the reader contacts associated with the above-indicated sensing pins to the perforator magnets of perforator No. 1 indicated below:

1. Ground on the reader contacts FD, No. 9 contacts of relay TC, conductor 122 within bracket 11, No. 4 contacts of relay RFD, conductor 121 within bracket 5, winding of the check relay CKAB, conductor 126, No. 2 contacts of relay P1A, conductor 127 within bracket 57, No. 3 contacts of relay DS1, winding of punch magnet ABM to battery. Both the magnet and relay CKAB operate in this circuit.

2. Ground on the reader contacts FB, No. 7 contacts of relay TC, conductor 20 within bracket 11, No. 2 contacts of relay RFD, conductor 18 within brackets 5 and 14 in the order named, conductor 18′ within bracket 59, winding of check relay BA′ of the B digit checking relays, conductor 60 within bracket 61, No. 6 contacts of relay P1A, conductor 62 within bracket 57, No. 5 contacts of relay DS1, winding of punch magnet BAM to battery. Both the magnet BAM and relay BA′ operate in this circuit.

3. Ground on the reader contacts ED, No. 4 contacts of relay TC, conductor 22 within bracket 11, No. 9 contacts of relay RFD, conductor 21 within brackets 5 and 14 in the order named, conductor 21′ within bracket 59, winding of relay BD′ of the B digit checking relays, conductor 63 within bracket 61, No. 9 contacts of relay P1A, conductor 64 within bracket 57, No. 8 contacts of relay DS1, winding of punch magnet BDM to battery. Both the magnet and relay BD′ operate in this circuit.

4. Ground on the reader contacts EB, No. 2 contacts of relay TC, conductor 65 within bracket 11, No. 7 contacts of relay RFD, conductor 66 within brackets 5, 14 in the order named, conductor 66′ within brackets 59, winding of relay CA′ of the C digit checking relays, conductor 67 within bracket 68, No. 1 contacts of relay P1B, conductor 69 within bracket 57, No. 1 contacts of relay DS1, winding of punch magnet CAM to battery. Both the punch magnet CAM and relay CA′ operate in this circuit.

5. Ground on the reader contacts DD, No. 9 contacts of relay TB, conductor 70 within bracket 11, No. 14 contacts of relay RFD, conductor 71 within brackets 5 and 14 in the order named, conductor 71′ within bracket 59, winding of relay CD′ of the C digit checking relays, conductor 73 within the bracket 68, No. 4 contacts of relay P1B, conductor 74 within bracket 57, No. 13 contacts of relay DS1, winding of punch magnet CDM to battery. Both the punch magnet CDM and relay CD′ operate in this circuit.

6. Ground on the reader contacts DB, No. 7 contacts of relay TB, conductor 109 within bracket 11, No. 13 contacts of relay RFD, conductor 75 within brackets 5, 14 in the order named, conductor 75′ within bracket 59, winding of relay DA′ of the D digit checking relays, conductor 76 within bracket 77, No. 6 contacts of relay P1B, conductor 78 within bracket 57, No. 15 contacts of relay DS1, winding of punch magnet DAM to battery. Both the punch magnet DAM and relay DA′ operate in this circuit.

7. Ground on the reader contacts CD, No. 4 contacts of relay TB, conductor 79 within bracket 11, No. 19 contact of relay RFD, conductor 80 within brackets 5, 14 and 59, in the order named, winding of relay DD′ of the D digit checking relays, conductor 81 within bracket 77, No. 9 contacts of relay P1B, conductor 82 within bracket 57, No. 18 contacts of relay DS1, winding of punch magnet DDM to battery. Both the punch magnet DDM and relay DD′ operate in this circuit.

8. Ground on the reader contacts CA, No. 1 contacts of relay TB, conductor 84 within bracket 11, No. 16 contacts of relay RFD, conductor 85 within brackets 5, 14 in the order named, conductor 85′ within bracket 59, winding of relay EB′ of the E digit checking relays, conductor 86 within bracket 87, No. 2 contacts of relay P1C, conductor 88 within bracket 57, No. 21 contacts of relay DS1, winding of punch magnet EBM to battery. Both the magnet EBM and relay EB′ operate in this circuit.

9. Ground on the reader contacts BE, No. 8 contacts of relay TA, conductor 89 within bracket 11, No. 25 contacts of relay RFD, conductor 90 within brackets 5, 14 in the order named, conductor 90′ within bracket 59, winding of relay EC′, conductor 91 within bracket 87, No. 3 contacts of relay P1C, conductor 92 within bracket 57, No. 22 contacts of relay DS1, punch magnet ECM to battery. Both the punch magnet ECM and relay EC′ operate in this circuit.

10. Ground on the reader contacts BB, No. 5 contacts of relay TA, conductor 36 within bracket 11, No. 22 contacts of relay RFD, conductor 37 within brackets 5 and 14 in the order named, conductor 37′ within bracket 59, winding of relay FA′ of the F digit checking relays, conductor 94 within bracket 95, No. 6 contacts of relay P1C, conductor 96 within bracket 57, No. 25 contacts of relay DS1, winding of punch magnet FAM to battery. Both the magnet FAM and relay FA′ operate in this circuit.

11. Ground on the reader contacts AB, No. 2 contacts of relay TA, conductor 40 within bracket 11, No. 27 contacts of relay RFD, conductor 41 within brackets 5 and 14 in the order named, conductor 41′ within bracket 59, winding of relay FD′ of the F digit checking relays, conductor 97 within bracket 95, No. 9 contacts of relay P1C, conductor 98 within bracket 57, No. 28 contacts of relay DS1, winding of punch magnet FDM, to battery. Both the punch magnet FDM and relay FD′ operate in this circuit.

Figure 17:
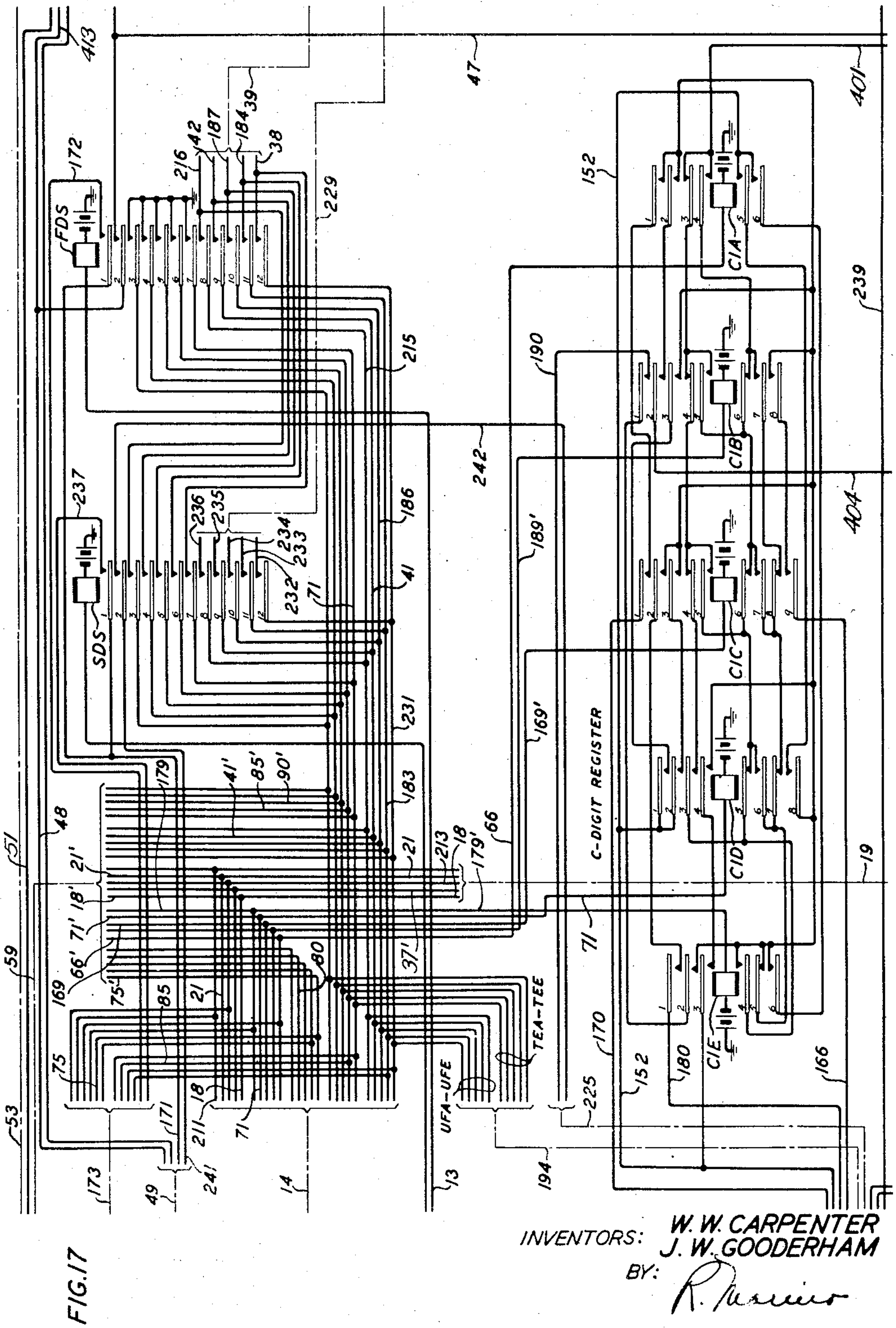
Figure 18:
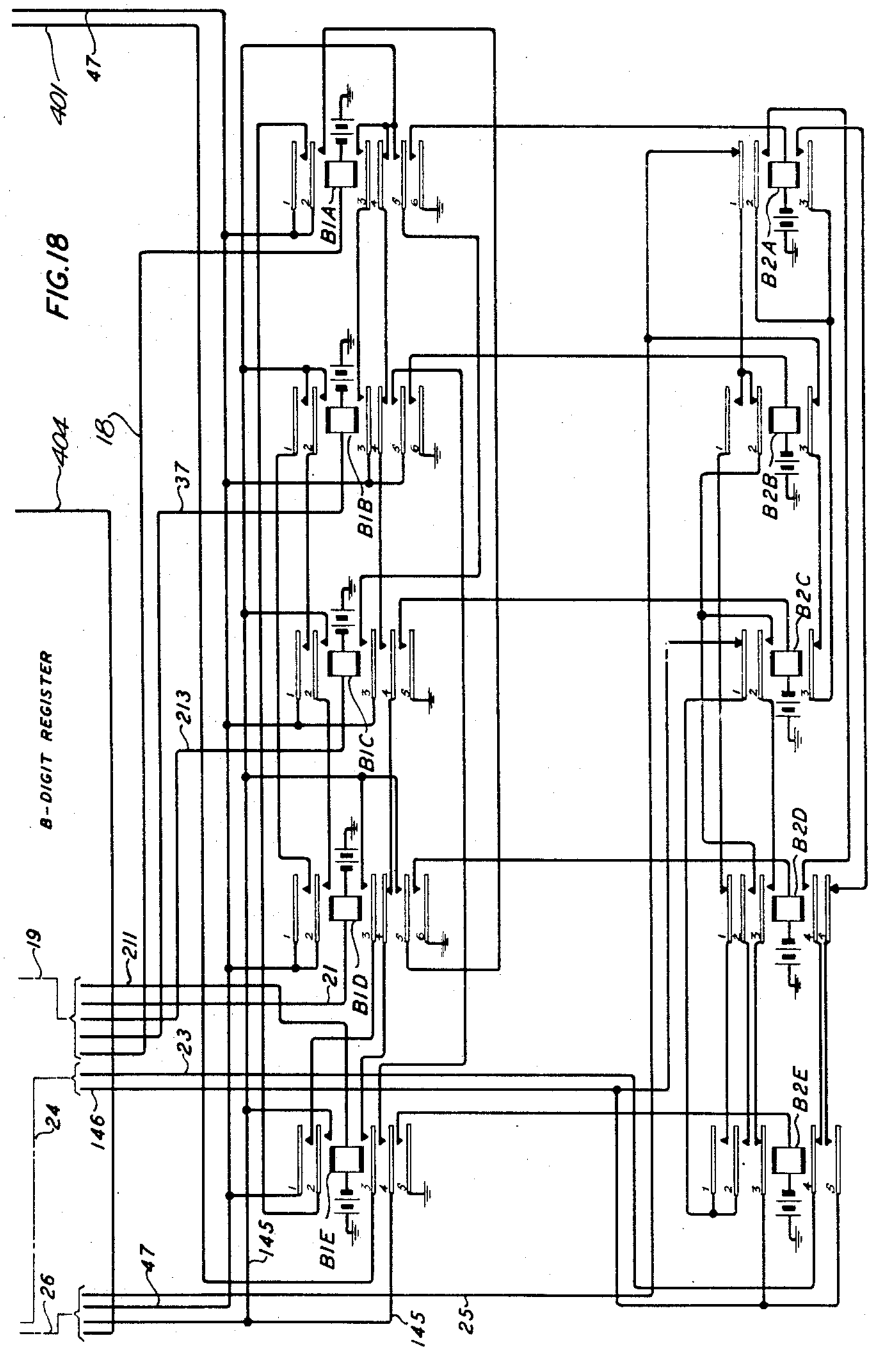

It will be observed that with respect to circuits (4) and (5) above traced, parallel circuits are also completed to corresponding relays C1A . . . C1E in the C digit register (Fig. 17). With respect to the circuit of the punch magnet CAM, the parallel branch is established over conductor 66, winding of relay C1A to battery. With respect to the circuit of punch magnet CDM, the parallel branch is established over conductor 71, winding of relay C1D to battery. Both relays C1A and C1D operate but perform no useful function. That is, the perforations designating the value of the C digit not only cause the operation of the appropriate punch magnets in the selected perforator No. 1, but also the operation of the appropriate 2-out-of-5 relays in the C digit register for registering the value of this digit therein. Although each value of the C digit will always be registered in the C digit register, it will be shown that this registration comes into play only for the entries which have the digital value "8" for the B digit of other "one line" entries.

The operation of the above-indicated punch magnets of perforator No. 1 produces perforations on the tape associated with this perforator, which are reproductions of those sensed and, therefore, constitute the reproduction of the answer or disconnect entry "211171."

It should be noted that relay A2 and the two relays S– of the selection register S all operate from their respectively associated reader contacts at the same time that the perforator cut-in relays P1A . . . P1C operate as the second relay event in connecting the perforator with said reader contacts. Inasmuch as the digit checking relays BA' . . . FE' and CKAA, CKAB and CKAC are connected in series between the reader contacts and the punch magnets of the perforator, there will be 2 out of 5 of these relays operated for each of the B, C, D, E and F digit checking registers, as above indicated, and also one relay in the A digit checking register. Thus there will be 11 "check" relays operated when the perforator is connected to the reader contacts during the time that the said contacts are closed.

The operation of the above indicated 11 check relays (the relays whose circuits were traced in series with the windings of the punch magnets) closes a checking circuit which may be traced from ground on the No. 2 contacts of relay CKAA, No. 4 contacts of relays CKAB (operated), No. 2 contacts of relay CKAC, conductor 99, No. 2 contacts of relay BA' (operated), No. 3 contacts of relay BB', No. 4 contacts of relay BC', No. 4 contacts of relay BD' (operated), No. 2 contacts of relay BE', No. 2 contacts of relay CA' (operated), No. 3 contacts of relay CB', No. 4 contacts of relay CC', No. 4 contacts of relay CD' (operated), No. 2 contacts of relay CE', No. 2 contacts of relay DA' (operated), No. 3 contacts of relay DB', No. 4 contacts of relay DC', No. 4 contacts of relay DD' (operated), No. 2 contacts of relay DE', conductor 100, No. 1 contacts of relay EA', No. 2 contacts of relay EB' (operated), No. 5 contacts of relay EC' (operated), No. 2 contacts of relay ED', No. 2 contacts of relay EE', No. 2 contacts of relay FA' (operated), No. 3 contacts of relay FB', No. 4 contacts of relay FC', No. 4 contacts of relay FD' (operated), No. 2 contacts of relay FE', conductor 101, No. 3 contacts of relay PD0, No. 2 contacts of relay PD1, No. 3 contacts of relay PCK1, No. 5 contacts of any of the relays PD2 . . . PD9, conductor 102, No. 4 back contacts of relay APC, conductor 103, windings of relays RS1 and RS2 to battery. Relays RS1 and RS2 operate, the former in turn operating relay RS3. The closure of the circuit of relays RS1 and RS2 insures (*a*) that 11 and only 11 punch magnets are operated, (*b*) that one and only one perforator is connected to the reader contacts and (*c*) that the circuit is closed for operating the paper-advance magnet PAM of the connected perforator since the above-traced check circuit runs through the No. 3 operated pair of contacts on relay PCK1, the winding of which is in series with the winding of the paper-advance magnet PAM of perforator No. 1. Relay RS1 locks over its No. 2 contacts, conductor 104 within bracket 5, No. 34 contacts of relay RFD, to ground on contacts C3 when (as noted from Fig. 23B) the sensing pins advance from the closed period of the sensing cycle to the open period.

Thus the operation of relays RS1, RS2 and RS3 serves as an "OK" signal to insure that the circuits have been closed to punch the proper record on the proper perforator. As noted before, the record punched on the tape of this perforator is the same that read from the central office tape by the sensing pins of the reader.

It will be noted that the locking circuit of relay PCK1 (and other relays PCK– of this group) which, over conductor 115, extends to ground on the contacts C11, has a supplementary ground over the No. 3 contacts of relay AC0 through a path which may be traced over conductor 115' within bracket 9, No. 1 contacts of relay SS2, conductor 118, No. 1 back contacts of relay TR6, No. 4 contacts of relay RS3, conductor 119 to ground on the No. 3 contacts of relay AC0. It is essential that if the checking circuit fails for any reason, as evidenced by the failure to operate relays RS1, RS2, and RS3, the perforator be held from advancing the record tape. Since the reader shaft is continuously rotating so long as key MO is operated, contacts C11 will open a little after the closed period of the sensing cycle and relay PCK1 and magnet PAM will release, the latter causing the advance of the record tape one step. If the check circuit fails, however, relays PCK1 and magnet PAM will be held operated by the aforetraced ground on conductor 115' to prevent this advance. Hence when contacts C11 open and relay RS3 is normal (on the assumption that the check circuit has failed), ground on conductor 115' will be applied to conductor 115 to hold relay PCK1 and magnet PAM operated, thus arresting the advance of the perforator record tape. The reader shaft will, in the meanwhile, continue to rotate and thereby cause the repetitive sensing of the entry (or the line of an entry). However, since ground is applied to conductor 117 from the No. 4 contacts of relay RS1 (which is normal because the check circuit failed) the reader stepping magnet STP is held operated, the reader drum is held stationary, the central office record tape is not advanced and the sensing pins will continue to sense the same line of perforations for which the check circuit failed. As will be shown later, the failure to release the perforator will cause the operation of an alarm that will call attention to the abnormal condition.

It should further be noted that in operating any group of perforator cut-in relays such as, for example, relays P1A . . . P1C with relay A2 operated, the path for operating said relays is through the No. 1 contacts of relay RS1 by way of conductor 51. This is to insure that relays RS1 and RS2 are normal before a new record is put on the tape of any perforator. After the group of perforator cut-in relays is operated and circuits are closed through the contacts of said relays to the perforator punch magnets as already described for the cut-in relays P1A . . . P1C, relays RS1 and RS2 are operated as above described. The circuit of the cut-in relays P1A . . . P1C is then opened by the operation of relay RS1 in consequence of the latter's operation over the checking circuit. If by this time, the punch magnets of the selected perforator have not completed their function of punching the record tape, (the circuit thereof still being closed by the reader contacts if the closed period of the sensing cycle is still in progress) the release of the cut-in relays P1A . . . P1C would open the circuit of these magnets. Therefore to insure that relays P1A . . . P1C will not release after the operation of relay RS1, the No. 1 contacts of said latter relay are short-circuited over conductor 51', No. 1 contacts of relay PD1, conductor 50' and thence as traced over conductors 50 . . . 44 to ground on contacts C9.

When the reader contacts open, relay A2, relays SA and SD of the selection register S, the cut-in relays P1A . . . P1C, relay PD1 and the operated relays of the digit-checking registers all release. With relay RS3 operated, ground is removed from conductor 117, thereby opening one of the circuits which hold the stepping magnet STP operated. When contacts C8 open, the other circuit is also opened and this magnet will then release to cause the reader drum to be rotated one step and thereby advance the central office record tape to the next line of perforations.

It will be recalled that relay PCK1 is locked to ground on contacts C11 in series with the paper-advance magnet PAM of perforator No. 1. As will be noted from the time chart of Fig. 23D contacts C10 and contacts C11 break approximately .006 second after the termination of the closed period of the sensing cycle and, therefore, after the reader contacts break. This is to allow sufficient time for the punch pins of the selected perforator to be released before the contacts C10 and C11 open, so that these pins will not snag the record tape of the perforator when the drum of the latter rotates to step the record tape. Relay PCK1 (or any other of the relays PCK–) is locked to the contacts C11 because each of the circuits of the cut-in relay groups P9A . . . P0B, P0C . . . P9A, P9B, P9C (through the contacts of one of which relay PCK1 is operated) may open before the paper-advancing magnet PAM will have completed its function of advancing the perforator record tape. That is, the punch magnets of the perforator will release immediately after the reader contacts open. For a period after this opening, the circuit of relay PCK1 and that of the magnet PAM are held to ground on the contacts C11 in order to allow the punch pins controlled by the punch magnets to release and clear from the record tape. By the time that contacts C11 open, which, as noted, is about .006 second after the reader contacts break, the punch pins will have cleared the record tape and, accordingly, the circuit of the magnet PAM and relay PCK1 will be opened to allow the advance of the record tape.

Thus with all of the above-mentioned relays released during the open period of the sensing cycle (with the exception of relays RS1, RS2 and RS3), the assembler will be in position to read and perforate another entry or the succeeding line of the same entry in the central office tape record. When the sensing pins AA . . . FE read the next line of the message and the associated contacts close in response to the pins which pass through perforations in the record, the appropriate relay A– of the A digit and the appropriate two out of five relays S– of the selection register S will operate. However, since conductor 51 to which ground to operate the next group of cut-in relays is applied, is controlled through the normal No. 1 contacts of relay RS1, said cut-in relays cannot be operated until relay RS1 is released. This acts as a check to insure that relays RS1, RS2 and RS3 are released before another record is punched on the record tape of a perforator. As was noted above, the No. 1 contacts of relay RS1, used to check its normal condition, are short-circuited through the No. 1 contacts of relay PD– (depending upon which one is operated), in order to prevent the opening of the circuit to the previously operated cut-in relays P1A . . . P1C subsequent to the operation of relay RS1 after the check relays have operated on the sensed line of perforations.

The circuit will continue to perforate the "answer" and/or "disconnect" entries once for each time that the reader is stepped and the sensing pins thereof are brought in opposite alignment with the transverse line of perforations representing such entries. These answer and disconnect entries are, of course, perforated on the record tapes of the several perforators selected by the 2-out-of-5 relays of the selection register S, which are operated in response to the sensing of the units digit (F digit) of the district number associated with the particular answer or disconnect entry being sensed.

2. *Initial two-line entry*

An initial two-line entry, indicated in Fig. 24C, is the entry recorded on the central office record tape as the initial entry of a local call which is to be charged in terms of standard call units and for which no details are to be furnished the subscriber to be charged. For this entry and in the first line thereof (reading from bottom up in Fig. 24C) the A and B digits together constitute the "entry" digits; the C digit, called the "index," designates the number of charge units; the D digit indicates the calling party station, while the E and F digits designate (as with a single line answer or disconnect entry) the tens and units digits, respectively, of the district junctor over which the connection was established.

In the second line of the entry (the upper line in Fig. 24C) the A digit always has the value "1" to indicate that it is a supplementary line, while the remaining five digits B . . . F are used to identify the number of the calling line with respect to its terminal location in the switching frames of the office, all of which has been previously explained in Section I.

It will now be assumed that, as indicated in Fig. 24C, the first line of an initial two-line entry is 311171 and that the second line is 104826. According to Fig. 1, the perforation in position (Ac) (recording the A digit 3) will be sensed by the pin FC. Consequently when this pin enters the perforation a circuit will be completed for relay A3 which may be traced from ground on reader contacts FC, No. 8 contacts of relay TC, conductor 17 within bracket 11, No. 3 contacts of relay RFD, conductor 16 within brackets 5 and 9 in the order named, No. 4 back contacts of relay TR3, conductor 15 within bracket 7, No. 2 contacts of relay ETP, No. 4 contacts of relay AC0, No. 1 contacts of relay APB, winding of relay A3 to battery. Relay A3 operates in this circuit to register the value "3" in the A digit register. Also at the same time, relays B1A and B1D will be operated in response to the perforations in positions (B*a*) and (B*d*) of the B digit (to register the value "1" in the B digit register) as before described and they, in turn, locally operate relays B2A and B2D, respectively. Further (as in the case of the answer and disconnect entry previously described), two relays SA . . . SE of the selective register S are operated in response to the sensing of the F digit in which is recorded the value of the units digit of the district number. Since the value of this digit is "1" (punch positions (F*a*) and (F*d*) and sensed by the sensing pins BB and AB, respectively) relays SA and SD are operated over previously traced circuits, in turn to complete a circuit for operating the perforator cut-in relays P1A, P1B and P1C individual to perforator No. 1, thereby to connect the magnets of this perforator to the reader contacts.

Also in this case, as in the case of the answer and disconnect entry, the C digit which, in the initial two-line entry under consideration contains the index number which is assumed to have the digital value "1," relays CA and CD of the C digit register are operated over previously described circuits. As before, these relays though operated, perform no function with respect to an entry the B entry digit of which has any value other than "3."

With relay A3 operated, a circuit is completed for relay LK1, which circuit extends from battery through the winding of said latter relay, No. 2 contacts of relay A2, conductor 27, No. 1 contacts of relay CE1, No. 1 contacts of relay TST2, No. 4 contacts of relay SKP, conductor 28, No. 4 contacts of relay A3, conductor 29 within bracket 5, No. 36 contacts of relay RFD, common contacts C5, to ground, said contacts being closed during the closed period of the sensing cycle (Fig. 23C). Relay LK1 operates and locks over a circuit extending from ground on the No. 1 contacts of relay AC9, No. 1 contacts of relay L2, resistor 132, No. 5 contacts of relay LK1, conductor 28′, conductor 28, thence as traced to the winding of relay LK1. It will be noted that this latter ground supplements the ground on contact C5 available over conductor 29 and (through the operated contacts of relay A3) over conductor 28′. Hence in order for relay LK1 to release, not only must contacts C5 be opened but relay L2 must also be operated. The broad function of relay LK1 is to serve as an off-normal relay to supply off-normal grounds for various relays during the time that the supplementary lines of an initial entry are being perforated. It will be shown that relay L2 operates when the last line of the entry is being punched, at which time one of the locking circuits of relay LK1 is opened. When the sensing pins thereafter reach the open period, contacts C5 will open, thereby opening the second locking circuit of relay LK1 and causing it to release.

When the perforator cut-in relays P1A . . . P1C are operated, a circuit is completed for operating the associated relay PD1 as previously described. Further, when the contacts C10 and C11 are operated, relay PCK1 is operated and subsequently locked in series with the paper-advance magnet PAM, also as previously described. However, since relay LK1 is now operated as above noted, a circuit is closed for relay PE1 which extends from battery through the winding of said relay, No. 1 contacts of relay PCK1, conductor 129, No. 3 contacts of relay APC to ground on the No. 8 contacts of relay LK1. Relay PE1, operating over this circuit, locks over its No. 2 contacts and resistor 130 to aforesaid ground on conductor 129. This relay serves as a "memory" relay and will remain locked after the first line of the entry is perforated on the tape of perforator No. 1 so that the additional line, or lines, of the entry will be perforated in the same tape. As will be explained later, this is accomplished by causing the reoperation, on succeeding lines of the entry, of the same group of cut-in relays which were operated as a result of the selective operation of relays SA . . . SE in the selection register S in response to the sensing of the F digit on the first line of the message, said circuit being available, as will be explained, through the No. 1 contacts of relay PE1.

As previously mentioned, relays B2A and B2D were locally operated by relays B1A and B1D, respectively. The function of relays B2– is to indicate whether the initial entry is a two-line or a four-line entry, the distinction between the two entries being recognized, as indicated in Figs. 24C and 24D, by the fact that the B digit of the first line of an initial two-line entry (Fig. 24C) is "1" while the B digit for an initial four-line entry is "3," the A digit of the first line for both entries having the value "3." Consequently, as soon as relay LK1 operates during the make period of the sensing cycle, and with relays B2A and B2D operated in response to the sensing of digital value "1" for the B digit of the initial two-line entry, a circuit is completed for relay LN2, which circuit extends from ground on the No. 7 contacts of relay LK1, No. 5 contacts of relay LK2, conductor 25 within bracket 26, No. 3 contacts of relay B2B, No. 3 contacts of relay B2C, No. 2 contacts of relay B2A, No. 4 contacts of relay B2B, No. 4 contacts of relay B2E, conductor 23 within bracket 24, winding of relay LN2 to battery. Relay LN2 operates and locks over its No. 2 contacts, resistance 34, ground on the No. 7 contacts of relay LK1.

Now after the perforator No. 1 has punched the first line of the two-line entry during the time that the reader contacts are going through the closed period of the sensing cycle and, thereafter, relays RS1, RS2 and RS3 have operated by the circuit closure through the eleven relays of the check circuit, the reader contacts open and contacts C7 close (see Fig. 23C) whereupon a circuit is completed for relay LK2 which may be traced from ground on contacts C7, No. 38 contacts of relay RFD, conductor 4 within bracket 5, No. 4 contacts of relay RS2, conductor 133, No. 2 back contacts of relay LAC, No. 1 back contacts of relay LAA, conductor 134, No. 4 contacts of relay L2, No. 4 contacts of relay LK1, winding of relay LK2 to battery. The latter relay operates and locks over two separate circuits, the one over its No. 3 contacts, No. 5 contacts of relay L2, to ground in the No. 2 contacts of relay LK1; the other over its No. 3 contacts, conductor 135, No. 3 back contacts of relay TR3, conductor 136 within brackets 9 and 5 in the order named, No. 32 contacts of relay RFD, to ground on contacts C1. As will be shown, relay L2 operates on the last line of an initial entry regardless of whether the entry is a two-line entry or a four-line entry. Since relay LK2 is locked to ground over a pair of normal contacts on relay L2, and also to ground on contacts C1 (which are closed during the closed period of the sensing cycle), it follows that relay LK2 (and relay LK1 which is locked through it) will not release until the open period of the reader contacts is reached following the perforation of the last line of the entry.

Relay LK2 is operated, as was noted, during the open period of the sensing cycle. With the operation of this relay, the operating circuit of relay LN2 is opened at the No. 5 contacts of relay LK2 although relay LN2 remains locked to ground on the No. 7 contacts of relay LK1. The operating circuit of relay LN2 is, of course, also opened at the contacts of the relays B2A and B2D of the B register when the latter relays release after the perforator No. 1 has perforated the first line of the entry. If relay LN2 had not been locked, its operating circuit might not be available on the sensing of the second line of the entry inasmuch as the B digit for this line might be any value, including the value "1." Hence to preserve an indication in the assembler that the entry is a two-line entry, relay LN2 is locked so that the relays B2– may be reset in accordance with any value of the B digit in the second (and last) line of the entry. Relays RS1, RS2 and RS3 operate and release as before described to advance the record to the second line of the entry. Also, all the operated register relays of the assembler and the operated punch magnets of perforator No. 1 release as already described for the one-line entry, the magnet PAM, on releasing, advancing the tape of perforator No. 1 by one step.

On the next closed period of the sensing cycle following advance of the central office record tape to the second (and last) line of the entry in response to the release of the stepping magnet STP, the sensing pins sense the perforations of said second line. Since the A digit is "1," the record thereof being a perforation in punch position (Aa), and since this perforation is sensed by pin FE, a circuit is completed for relay A1 which may be traced from ground on reader contacts FE, No. 10 contacts of relay TC, conductor 137 within bracket 11, No. 5 contacts of relay RFD, conductor 138 within bracket 5, No. 4 back contacts of relay ETP, No. 7 contacts of relay AC0, winding of relay A1 to battery. Relay A1 operates in this circuit. Since relay LN2 is locked as before described, a circuit is completed for relay L2 which extends from ground on contacts C2, No. 33 contacts of relay RFD, conductor 140 within bracket 5, No. 4 contacts of relay A1, No. 1 front contacts of relay LN2, winding of relay L2 to battery. The latter relay operates, locks over its No. 3 contacts, resistor 142, No. 2 contacts of relay LK1 to ground and performs certain functions which will be described in their proper order.

The B digit of the second line has a value of "0," with holes in punch positions (Ba) and (Bb) and sensed by sensing pins FB and FA, respectively. Then sensing of the hole in position (Ba) completes a previously described circuit for relay B1A of the B digit register, while the sensing of the hole in position (Bb) completes a circuit for relay B1B which may be traced from ground on reader contacts FA, No. 6 contacts of relay TC, conductor 139 within bracket 11, No. 1 contacts of relay RFD, conductor 37 within bracket 5, 14 and 19 in the order named, winding of relay B1B to battery. This relay operates, and, along with relay B1A, both locally operate relays B2A and B2B. These two operated relays of the B register, however, perform no function in the supplementary line (or lines) of an initial entry.

The C digit of the second line of the entry has a value of "4," with holes punched in positions (Cb) and (Ce) and sensed by sensing pins EA and DC, respectively. Sensing pin EA completes a circuit for relay C1B, said circuit being traced from ground on the reader contacts EA, No. 1 contacts of relay TC, conductor 188 within bracket 11, No. 6 contacts of relay RFD, conductor 189 within brackets 5 and 14 in the order named, conductor 189', winding of relay C1B to battery. Sensing pin DC completes a circuit for relay C1E, said circuit being traced from ground on the reader contacts DC, No. 8 contacts of relay TB, conductor 178 within bracket 11, No. 13 contacts of relay RFD, conductor 179 within brackets 5 and 14 in the order named, conductor 179', winding of relay C1E to battery. Both relays C1B and C1E operate in these circuits but do not perform any function.

In the given example of the second or supplementary line of an initial two-line entry, the F digit has a value of 6, the latter being recorded in the central office record tape by two holes punched in punch positions (Fa) and (Fc), respectively. These holes are sensed by the sensing pins BB and AC, respectively, the former closing a previously described circuit for relay SA of the selection register S and the latter closing the following circuit for relay SC of said register: ground on contacts AC, No. 3 contacts of relay TA, conductor 185 within bracket 11, No. 28 contacts of relay RFD, conductor 186 within brackets 5 and 11 in the order named, No. 10 contacts of relay FDS, conductor 187 within bracket 39, winding of relay SC to battery. Relays SA and SC both operate.

It will be recalled that for the answer and disconnect entries the selective operation of two out of the five relays of the selection register S in response to the sensing of the F digit, determines the selection of the perforator to be connected to the assembler, the reason being that the ground applied to conductor 51 through relay A2 is selectively applied through the register to complete the circuit of one of the ten groups of perforator cut-in relays P0A, P0B, P0C . . . P9A, P9B, P9C. However, since in the second (and last) line of an initial two-line entry the recorded value of the A digit is "1" instead of "2" and, therefore, relay A2 is normal, ground cannot be applied to conductor 51 and utilized through the register S for the selective operation of the cut-relays. Instead, and remembering that when the first line of the entry was being sensed relay PE1 was operated in response to the connection of perforator No. 1 to the assembler and remained locked during the succeeding open period of the sensing cycle, a circuit is now completed for the same group of perforator cut-in relays that was operated in response to the value of the F digit for the first line of the two-line entry. Since the value of the F digit is "1" for the first line of the entry and "6" for the second, the circuit is, of course, completed to the cut-in relays P1A, P1B and P1C, to cause again the connection of perforator No. 1 to the assembler in order that the second line of the entry may be perforated on the same tape as the first line. The circuit is as follows: ground on contacts C9 applied to conductor 44 as previously traced thereto, No. 2 back contacts of relay TST2, conductor 45, No. 1 contacts of relay AL, conductor 46, No. 1 contacts of relay A1, No. 1 contacts of relay LK2, No. 5 contacts of relay A3, No. 1 contacts of relay A2, conductor 144, No. 1 back contacts of relay PE0, No. 1 front contacts of relay PE1, severally through the windings of relay P1A, P1B and P1C to battery. These relays operate and extend the reader contacts AA . . . FE to the windings of the punch magnets AAM . . . FEM of the perforator No. 1, serially through the windings of the several checking relays of the A . . . F digits checking registers. The perforator magnets which are operated in response to the reader contacts of those sensing pins which enter perforations now function as before to perforate the second (and last) line of the two-line initial entry on the tape individual to the perforator. Said record tape is then advanced (as before) in response to the clear-out signal given by the operation of relays RS1, RS2 and RS3.

When the reader contacts open at the end of the closed period of the sensing cycle, relay LK1 will remain locked as above stated while relays RS1, RS2 and RS3 will remain locked to ground on contact C3. Also when, at the end of the closed period of the sensing cycle, contacts C7 close, the circuit of relay LK2 is completed over a previously traced circuit and said relay operates and locks as before, except for the fact that since relay L2 is now operated to indicate the perforation of the second (and last) line of the initial two-line entry, the previously traced locking path through the No. 1 contacts of this relay is opened, leaving relay LK2 locked only under the control of ground on contacts C7. When these contacts release, relay LK2 releases. The release of relay LK2 releases relay LK1, in turn releasing relay PE1.

3. *Initial four-line entry*

An initial entry consisting of four consecutive lines as shown in Fig. 24D is an entry which, as previously stated, is made on the central office record tape for a call the details of which are to be furnished to the calling subscriber as part of the bill and the charge for which is to be made in money units instead of call units as for "bulk billed" calls.

The first line of the entry is the same as for the first line of an initial two-line entry except that the "B" digit has always the value "3" and "C" digit (index) has the value "9."

The second line of the entry is also of the same order as the second line of an initial two-line entry, the A digit thereof having the value "1" to indicate that this line is a supplementary line of an initial entry. The remaining digits of the line are used to record the identity of the calling line terminal.

The third and fourth lines of the entry are also supplementary lines and, of course, have the numeral "1" for the value of their respective A digits, each of said lines recording the information indicated in Fig. 24D and further discussed below.

We may now assume that an initial four-line entry is presented to the reader for analysis and that, by way of example, it is the entry illustrated by Fig. 24D.

When the first line of the entry comes into coincidence with the sensing pins and the latter penetrate the perforations thereof during the closed period of the sensing cycle, then since a hole is present in position (*Ac*) which is sensed by pin FC, a previously traced circuit is completed for relay A3 which causes this relay to operate. Also at the same time, relays B1D and B1E of the register B are operated in response to the sensing of perforations in positions (*Bd*) and (*Be*) by sensing pins ED and EC, respectively. The circuit of relay B1D was previously described; that of relay B1E extends from ground on reader contacts EC, No. 3 contacts of relay TC, conductor 210 within bracket 11, No. 8 contacts of relay RFD, conductor 211 within brackets 5, 14 and 19 in the order named, winding of relay B1E to battery. Relays B1D and B1E operate and locally operate B2D and B2E. Relays C1A and C1E of the register C are operated in response to the sensing of perforations in positions (*Ca*) and (*Ce*) by the sensing pins EB and DC, respectively, and the circuits thereof have been previously traced. Relays SA and SD of the selection register S are operated in response to the sensing of holes in positions (*Fa*) and (*Fd*) of the digit F by sensing pins BB and AB, respectively, and the circuits thereof have also been previously traced.

It has been noted that relays B1D and B1E of the B register are operated. Since relay A3 is also operated, ground to conductor 51 may now be traced over the following path: ground on contacts C9 and thence as previously traced to conductor 46, No. 2 contacts of relay A1, No. 2 contacts of relay LK2, No. 1 contacts of relays A3, No. 3 contacts of relay A2, conductor 145 within bracket 26, No. 3 contacts of relay B1D, No. 1 contacts of relay B1E, conductor 47, No. 2 contacts of relay FDS, and thence as previously traced to the common conductor 51 which extends to the relays of the selection register S. Since relays SA and SD are operated in this register, the path is completed over conductor 52 to the windings of relays P1A, P1B and P1C which, as previously noted, are the cut-in relays of perforator No. 1 and which, when operated over the above circuit, cause the connection of this perforator to the reader contacts as previously described for the previously described entries.

It will now further be noted that relays B1D and B1E have locally operated relays B2D and B2E. It is the principal function of the relays B2A . . . B2E to discriminate between an initial two-line entry and an initial four-line entry. For an initial two-line entry the B digit has always the value "1" and results in the operation of relays B2A and B2D and the closure of a circuit for relay LN2, as previously described. For an initial four-line entry the B digit has always the value of "3" and results in the operation of relays B2D and B2E. Therefore during the sensing cycle in which the first line of the four-line entry is being sensed, and immediately after relay LK1 has been operated as previously described, a circuit is closed for relay LN4 which extends from ground on the No. 7 contacts of relay LK1, No 5 contacts of relay LK2, conductor 25 within bracket 26, No. 1 contacts of relay B2A, No. 2 contacts of relay B2B, No. 2 contacts of relay B2D, No. 2 contacts of relay B2E, No. 1 contacts of relay B2C, conductor 146 within bracket 24, winding of relay LN4 to battery. The latter relay operates and locks over its No. 2 contacts to operating ground on the No. 7 contacts of relay LK1. The operation of relay LN4 indicates to the assembler the fact that the entry being analyzed is an initial four-line entry. Since we have noted that relay L2 operates on the perforation of the last line of plural line initial entry (it having been operated on the punching of the second line of a two-line initial entry as previously described), it is the general purpose of relay LN4 to delay the operation of relay L2 until the last or fourth line of an initial four-line entry has been perforated on the tape of the selected perforator.

The selected perforator No. 1 proceeds to perforate the first line of the initial four-line entry in the same manner as it proceeded to perforate the first line of the initial two-line entry, relays LK1 and LK2 (among others previously noted) remaining locked at the end of the sensing cycle including the open period thereof. Now when the central office record tape has been advanced to the second line of the entry, and since the value of the A digit of this line is "1," a previously described circuit is completed for relay A1, causing said relay to operate. In a similar manner, circuits are completed as before in response to the sensing of the two perforations in each of the B, C, D, E and F digit positions, causing (among other operations) the operation of the appropriate 2-out-of-5 relays in each of the registers B and C but which relays, however, perform no function. Moreover, since relay PE1 is now locked as a result of operations incident to the perforation of the first line of the entry on the record tape of perforator No. 1, the same perforator is now caused to be connected again to the reader contacts to record the second line of the entry in the next recording position of the record tape. However, due to the fact that relay A1 is now operated as above noted, a circuit is completed for relay L4A, said circuit extending from ground on contacts C2, thence as traced to conductor 146, No. 4 contacts of relay A1, No. 1 back contacts of relay LN2, No. 1 contacts of relay LN4, conductor 400, No. 1 back contacts of relay L4D, No. 1 back contacts of relay L4B, winding of relay L4A to battery. The latter relay operates and, over its No. 2 contacts, locks to ground via the No. 1 back contacts of relay L4C, resistor 147, conductor 148, No. 2 contacts of relay L2, No. 2 contacts of relay LK1 to ground.

The perforator proceeds in the described manner to perforate the second line of the entry, but at the time that contacts C7 are closed during the open period of the sensing cycle, a circuit is completed for relay L4B, said circuit extending from ground on the contacts C7, thence as traced to conductor 4, No. 4 contacts of relay RS2, conductor 133, No. 2 back contacts of relay L4C, No. 1 front contacts of relay L4A, winding of relay L4B to battery. The latter relay operates and then locks over its No. 2 contacts, No. 2 back contacts of relay L4D, resistor 149, conductor 150 to ground over the No. 2 contacts of relay LK1. Thus relays L4A and L4B, the first operating and locking during the closed period of the sensing cycle when the second line of the entry is being perforated and the second operating and locking during the time that contacts C7 are closed following the closed period of the sensing cycle, preserve in the assembler a "memory" of the fact that the second line of the entry has been perforated on the record tape of the same perforator on which the first line was perforated. During the open period following the closed period of the sensing cycle, relays L4A and L4B remain locked, along with relays LK1 and LK2 and others previously noted.

When the central office record tape is advanced to the third line of the entry in the manner previously described for the two-line entry the assembler operations are identical with those taking place during the sensing and perforating of the second line of the initial call line entry except for the fact that since relay A1 is now reoperated (the A digit for the third line being "1") and relays L4A and L4B are locked, a circuit is completed for relay L4C, said circuit extending from ground on contacts C2, thence as previously traced to the No. 1 contacts of relay LN4, conductor 400, No. 1 back contacts of relay L4D, No. 1 front contacts of relay L4B, winding of relay L4C to battery. The latter relay operates, locking over No. 1 contacts, resistor 147, conductor 148, and thence as previously traced to ground on the No. 2 contacts of relay LK1. The operation of relay L4C opens the locking circuit of relay L4A which releases.

Thus during the perforation of the third line of the entry relay L4C is operated and locked. During the time that contacts C7 are closed in the open period of the sensing cycle a circuit is completed for relay L4D, said circuit extending from ground on contacts C7, thence as previously traced to conductor 133, No. 2 front contacts of relay L4C, winding of relay L4D to battery. The latter relay operates, opens the locking circuit of relay L4B which releases, and locks over its No. 2 front contacts and resistor 149 to aforetraced ground on the No. 2 contacts of relay LK1. Relays L4C and L4D locked, preserve a "memory" in the assembler of the fact that the third line of the initial four-line entry has been successfully sensed and perforated on the record tape of the perforator used for the perforation of the two previous lines of the entry. The assembler proceeds to release all relays except relays LK1, LK2, L4C, L4D and those previously noted in connection with the perforation of the two lines of an initial two-line entry.

It has been stated that the purpose of operating relay LN4 is to delay the operation of relay L2 until the last line of an initial four-line entry has been sensed and reproduced. Therefore when the central office record tape is advanced one step to the fourth line of the entry, and noting that the value of the A digit of this line is "1," causing thereby the operation of relay A1 as previously described, a circuit is completed for relay L2, which circuit extends from ground on contacts C2, thence as traced to conductor 140, No. 4 contacts of relay A1, No. 1 back contacts of relay LN2, No. 1 contacts of relay LN4, conductor 400, No. 1 front contacts of relay L4D, conductor 151, winding of relay L2 to battery. Relay L2 operates and locks as previously described to cause the assembler to perform the same release functions that have been described in connection with the operation of this relay following the sensing and perforation of the second (and last) line of an initial two-line entry.

It should be noted that if the first supplementary line of the entry was not properly perforated and the check relays in the various digit-checking registers failed to operate and, therefore causing relays RS1 and RS2 not to operate, relay L4B would not operate, the counting of the lines would be stopped and the stepping of the reader and perforator would be prevented. Under these circumstances a suitable alarm will be operated, as will be shown.

Having disposed of the three entries which are made on the central office record tape during the set-up of connections, at the beginning of conversation and at the end of conversation, we will now describe the operation of the assembler with respect to a number of auxiliary entries made on the central office record tape and having to do with the computation of charges, the identity of certain pieces of equipment used in setting up connections, the identification of certain trouble conditions, and the tie-in of the tape records produced by the several perforators.

It should be realized that the ultimate purpose of the records produced by the perforators of the assembler is to use them in operating certain tabulating, computing and accounting devices, by which the latter are enabled to collect all charges, correlate them with the numbers of the calling stations from which the calls were made and compute the total charges for such stations over a defined billing period.

4. *Regular hour entry "3810XX"*

As stated in Section I, hour entries are placed in the central office record tape regularly at the beginning of each hour, the entry code thereof (A, B, C and D digits) being "3810" followed by the designation of the hour in the E and F digit positions in terms of two digits, the E digit representing the tens digit of the hour (either a "0" or "1" or "2") and the F digit representing the units digit of the hour (0 to 9). By way of example, the beginning of the hour count will start with noon which is designated as "00" and end with "23" in the twenty-fourth hour thereafter. An illustration of the hour entry which is made upon the central office record tape every hour is shown in Fig. 24E wherein the hour entry is shown to be "23."

It is necessary to distinguish here between the regular hour entry periodically made on the central office tape record at the beginning of each hour and the hour entry which is made along with other entries as part of the "end-of-tape"

entries which are shown in Fig. 25, wherein it will be noted that the "control digits" for the hour entry (ABCD) are "3811."

The entry number "3810" indicates to the assembler that the single line entry is a regular hour entry which is to be perforated on the record tapes of all perforators 0 . . . 9 before the reader can be stepped to advance the central office record tape to the next line of perforations.

When the central office record tape is advanced to where the perforations of a regular hour entry are underneath the sensing pins, and since the codes of the digits 381 are punched in the A, B and C digit positions, respectively, relay A3 will be operated (for the A digit "3") over a previously described circuit. The value of the B digit is "8," is recorded by perforations in positions (B*c*) and (B*e*), the latter being sensed by sensing pins EE and EC, respectively, and the latter, in turn, causing the operation of relays B1C and B1E, respectively. The circuit of relay B1E has been previously traced. That of relay B1C extends from ground on reader contacts EE, No. 5 contacts of relay TC, conductor 212 within bracket 11, No. 10 contacts of relay RFD, conductor 213 within brackets 5 and 14 and 19 in the order named, winding of relay B1C to battery. Relays B1E and B1C operate and locally operate relays B2E and B2C, respectively.

The value of the C digit is "1," is recorded by perforations in position (C*a*) and (C*d*), the latter being sensed by sensing pins EB and DD, respectively, and causing the operation of relays C1A and C1D over previously traced circuits.

The value of the D digit is "0," is represented by perforations in punch positions (D*a*) and (D*d*) which are sensed by sensing pins DB and DA, respectively. It will now be assumed that, according to Fig. 24E, the hour is the twenty-fourth hour (indicated as 23) and that, accordingly, the E digit will have perforations in punch positions (E*b*) and (E*d*) for the digit 2 and the F digit will have perforations in positions (F*d*) and (F*e*) for the digit 3. The latter are sensed by sensing pins AB and AA, respectively, and will cause the operation of relays SD and SE, the former relay over a circuit previously traced and the latter relay over a circuit which may be traced from ground on reader contacts AA, No. 1 contacts of relay TA, conductor 214 within bracket 11, No. 26 contacts of relay RFD, conductor 215 within brackets 5 and 14 in the order named, No. 8 contacts of relay FDS, conductor 216 within bracket 39, winding of relay SE to battery. Although relays SD and SE operate, it will be shown that they do not perform their normal function of causing the selection of perforator No. 3 inasmuch as the hour entries are to be perforated in the record tapes of all perforators and, therefore, requiring the connection of all perforators to the assembler.

With relays A3 operated for the A digit, relays B1C and B1E operated for the B digit and relays C1A and C1D operated for C digit, a path is completed from ground on contacts C9, thence as traced to conductor 46, No. 2 contacts of relay A1, No. 2 contacts of relay LK2, No. 1 contacts of relay A3, No. 3 contacts of relay A2, conductor 145 within bracket 26, No. 4 contacts of relay B1A, No. 4 contacts of relay B1B, No. 4 contacts of relay B1C, No. 4 contacts of relay B1D, No. 3 contacts of relay B1E, conductor 401, No. 4 contacts of relay C1A, No. 6 contacts of relay C1B, No. 6 contacts of relay C1C, No. 6 contacts of relay C1D, No. 5 contacts of relay C1E, No. 8 contacts of relay C1D, No. 5 contacts of relay C1A, conductor 152, conductor 152′, brush AP3 and normal terminal N of the all-perforators selector AP, conductor 153, No. 3 contacts of relay TR6, conductor 154, winding of relay APA to battery. Relay APA operates.

Before describing operations consequent to the operations of relay APA, it will be well to recall briefly at this point that the selection of a particular perforator in response to the value of the F digit for an answer and disconnect entry, or an initial two-line entry or an initial four-line entry, follows from the application of ground to conductor 51, either from ground on conductor 47 to which it is applied by the operation of relay A2 when the A digit of the entry is "2" and independently of the setting of the B register, or from ground on conductor 145 by the operation of relay A3 when the A digit of the entry is "3" but under the control of the B register for all settings thereof except the digit "8." When, however, the B register is set for this latter digit (relays B1C and B1E operated) the ground on conductor 145 is not applied to conductor 51 but, as traced immediately above, is applied to conductor 401. If, now, the setting of the C register is for the digit "1" (as it is for the regular hour entry) then it is further applied as traced beyond conductor 401 to cause the operation of relay APA. In causing the circuit of this relay to traverse the brush AP3 and the normal terminal N of its arc, a check is made to insure that the all-perforators selector AP is normal. If this selector is not normal, further operations will be suspended and an alarm given, as will be described.

Relay APA operates, locks over its No. 3 contacts, No. 2 normal contacts of relay APC, No. 3 contacts of relay LK1 (which is operated as previously described for any of the previous entries for which the control digit A has the value 3) to afore-traced ground on conductor 29, applied thereto by contacts C7 during the open period of the sensing cycle, and completes a path for the stepping magnet APM of selector AP which extends from ground on the No. 5 contacts of relay APB, No. 1 contacts of relay APA, conductor 155, normal brush AP1 and normal terminal N, winding of stepping magnet APM to battery. The magnet operates and conditions the wipers AP1 . . . AP4 of the selector AP to advance to their respective next terminals on the release of the magnet.

Relay APA was operated at the beginning of the closed period of the sensing cycle, at which time the switch magnet AP is operated as just described. No perforating operations occur during this sensing cycle inasmuch as no perforator is yet connected to the assembler. During the open period of the sensing cycle and with relay APA operated, a circuit is completed for relay APB which extends from ground on contacts C7, thence as traced to conductor 4, No. 2 contacts of relay APA, winding of relay APB to battery. The latter relay operates, locks over its No. 3 contact, No. 5 contacts of relay L2, to ground on the No. 2 contacts of relay LK1, and opens the circuit of the selector magnet APM causing the release thereof and the advance of the selector brushes AP1 . . . AP4 to their respective first terminals 0. Also when relay APB operates, a path is completed for relay APC which extends from ground on the No. 1 contacts of relay AC0, No. 1 contacts of relay L2, No. 4 contacts of relay APA, No. 4 contacts of relay APB, winding of relay APC to battery. The latter relay operates, locks over its No. 2 front contacts, No. 1 contacts of relay L2 to afore-traced ground on the No. 1 contacts of relay AC0, and opens the path of relays PE– none of which is to operate on the regular hour entry since the latter, being a single line entry which is to be perforated in the record tapes of all the perforators 0 . . . 9, no "memory" need be preserved as to which perforator was selected, as was the case in response to the sensing of the first line of an initial two-line or initial four-line entry. The operation of relay APC opens the locking circuit of relay APA which releases, however, only after the termination of the closed period of the sensing cycle, at which time contacts C9 break and thereby open its operating circuit.

It will be recalled that the perforation in the punch position (*Ac*) on the central office record tape is sensed by pin FC, and that during the first sensing cycle of the regular hour entry the ground on the reader contacts FC will complete the circuit of relay A3 the path of which, as previously traced, traverses the No. 1 contacts of relay APB. Now when, during the second sensing cycle (that is, the sensing cycle following the operation of relay APB), the pin FC again enters the perforation in position (*ac*), and due to the fact that relay APB is now operated and locked, the path previously completed to the winding of relay A3 is now completed to the winding of relay A3A, said path extending from ground on contacts FC to the No. 4 contacts of relay AC0 as previously traced thereto, No. 2 contacts of relay APB, conductor 156, winding of relay A3A to battery. Relay A3A operates and among its other functions completes a circuit for relay SS3, which circuit extends from ground on contacts C2 and thence as traced to conductor 140, No. 2 contacts of relay A3A, winding of relay SS3 to battery. The latter relay operates and locks to ground over its No. 1 contacts, No. 2 contacts of relay SS1, conductor 162, No. 3 contacts of relay TR5, conductor 163 to ground on the No. 8 contacts of relay LK1. Relay SS3 now completes a circuit for the magnet APM of selector AP which extends from ground on the No. 2 front contacts of relay SS3, No. 0 terminal and brush AP1, winding of magnet APM to battery. The magnet operates and conditions the wipers AP1 . . . AP4 to advance to their respective No. 1 terminals on the release of the magnet, which occurs on the release of relay SS3 when unlocked by the opening of contacts C2 at the end of the closed period of the sensing cycle.

With relay A3A operated, a path is further completed from ground on contacts C9 and thence as traced to conductor 46, No. 2 contacts of relay A1, conductor 157, No. 1 contacts of relay A3A, No. 4 contacts of relay SS1, brush AP4 and No. 0 terminal engaged thereby, conductor 160 within bracket 158, windings of relays P0A, P0B and P0C to battery. These latter relays operate and since they are the cut-in relays for perforator No. 0, the punch magnets of the latter are extended to the reader contacts, whereupon the hour entry is caused to be perforated on the record tape of perforator No. 0 in the same manner as the lines of the previously described entries were caused to be perforated on the record tape of perforator No. 1.

In this case, however, when the eleven check relays of the digit-checking registers in series with the perforator magnets are operated, and because relay APC is now operated, relays SS1 and SS2 will be operated instead of relays RS1 and RS2. It will be recalled in connection with the perforation of the previously described entries that relay PD– was operated over conductor 108 from ground on contacts C4. Now when, on the regular hour entry, relay PD0 operates over the same path and relay PCK0 is locked in series with the paper advance magnet PAM of perforator 0, the checking conductor 101 which has ground applied to it from the contacts of relay CKAA, is now extended over the No. 2 contacts of relay PD0, No. 3 contacts of relay PCK0, No. 6 contacts of relays PD1 . . . PD9, conductor 102, No. 4 front contacts of relay APC, conductor 161, windings of relays SS1 and SS2 to battery. These latter relays operate and lock (over the No. 3 contacts of relay SS1) to ground from contacts C3 applied to conductor 104 as previously traced thereto.

When the sensing cycle reaches its open period, ground will be disconnected from contacts C2, causing thereby the release of relay SS3 and the release of the selector magnet APM which, in turn, advances the brushes AP1 . . . AP4 of selector AP to their respective No. 1 terminals. However, due to the fact that relay RS1 has not been operated, ground will be maintained on conductor 117 which, as previously traced, extends to the winding of the reader stepping magnet STP, holding this magnet operated and preventing the reader from advancing the central office record tape. In other words, the record tape is held to the regular hour entry position with the sensing pins repeatedly sensing this entry during succeeding sensing cycles. At the end of the second cycle all relays held to the reader contacts or to the common contacts release. The relays held to relay LK1, however, will be maintained operated as before, including in this case relays APB and APC.

On the succeeding sensing cycle of the reader, and due to the fact that relay APB is locked, relay A3A again operates, and since the brushes of switch AP are now engaging their respective No. 1 terminals, the perforator cut-in relays P1A, P1B and P1C of perforator No. 1 will be operated over the same circuit by which relays P0A, P0B and P0C were operated, except that a single point in the path of the circuit on the terminal of the arc engageable by brush APA is now traced over the No. 1 terminal of this arc instead of the No. 0 terminal. Perforator No. 1 will now operate to perforate on its record tape the same hour entry which was perforated on the record tape of perforator No. 0. When the digit-checking relays operate to operate relays SS1 and SS2, the latter will cause the switch magnet APM to release and advance the brushes AP1 . . . AP4 to their respective No. 2 terminals. These operations will continue in the manner described until the hour record has been perforated on the record tapes of all ten perforators.

On the sensing cycle when the reader contacts are closed to put the hour record on the record tape of perforator No. 9 and the cut-in relays P9A . . . P9C are operated as described, the operation of the eleven digit-checking relays will now complete a circuit for relays RS1 and RS2 instead of relays SS1 and SS2. The path of this circuit is as follows: ground on the checking conductor 101 as previously traced thereto, No. 3 contacts of relays PD0 . . . PD8, No. 2 contacts of relay PD9, No. 3 contacts of relay PCK9, conductor 402, No. 1 back contacts of relay TR3, conductor 103, windings of relay RS1 and RS2 to battery. The operation of relay RS2 disconnects ground from conductor 117 which, it will be recalled, held operated the stepping magnet STP of the reader so that the central office record tape would be prevented from stepping to the first line of the next entry until all the sensing cycles required to perforate the hour entry on the record tapes of all ten perforators will have been executed. The disconnection of ground from conductor 117 opens one circuit that keeps the stepping magnet operated, the other circuit being opened when, during the open period of the last sensing cycle, contacts C8 open as previously described.

When the brushes of switch AP engage their respective No. 9 terminals for putting the hour entry on the record tape of perforator No. 9, a circuit is further completed for relay L2, said circuit tracing from ground on the No. 2 contacts of relay LK1, conductor 150, No. 3 contacts of relay A3A, No. 9 terminal and brush AP2, conductor 164, No. 1 contacts of relay APC, winding of relay L2 to battery. With relay L2 operated, relays LK1, APB and APC will release when the reader contacts break, and the circuit will then be in a position to operate on the first line of the next entry.

5. *District charge trouble "385400"*

There are three other single line entries besides the regular hour entry. Of these, the first is placed on the central office record and reproduced on the record tapes of all perforators in the same manner as the hour entry; the second is also placed on the central office record but is cancelled by the assembler, while the third is placed on the record tapes of all ten perforators by the circuits of the assembler. Two of these three entries are illustrated in Figs. 24F and 24G and all have "38" for the A and B digits, respectively; 5 and 7 for the C digit, respectively; 4 and 0 for the D digit, respectively, and 0 and 0 for the E and F digits, respectively. Since the value of the B digit for all the above entries is "8" the ground previously traced to conductor 151 extending through the relays B1A . . . B1E of the B register when the latter relays are set for the value "8" will be extended to the relays C1A . . . C1E of the C register. The contacts of the latter relays, however, are so wired that when the relays are selectively operated for each of the values 1, 2, 3, 5, 7, 8 or 9, the ground on conductor 401 is extended to conductor 152 which, as previously described, controls the operation of the assembler for the perforation of the hour entry on the record tapes of all perforators. It is evident, therefore, that for the single line entries shown in Figs. 24F and 24G, the operation of the circuit will be the same as for the hour entry.

However, each of these entries tells a separate story and with respect to each of them a review of their significance will help to clarify the operation of the assembler with respect to entries which immediately precede the special entry and with respect to the disposition of said entries.

As stated in Section I, the special entry "385400" (Fig. 24F) is placed on the central office record tape after an initial entry, to record the fact that the call was not established because of a "charge" trouble condition in the trunk, and that the object of the special entry is to serve as a signal to the computing devices to disregard any answer and disconnect entries preceding the special entry, and ignore the initial entry following the special entry. On first district sort and on sensing the special entry "385400," it is the purpose of the assembler to reproduce this entry on each of the ten perforator tapes in the same manner as the regular hour entry and then to reproduce the initial entry following it on the tape of the one perforator which is indicated by the value of the F digit in the first line of the initial entry.

6. *Initial entry cancel record "387000"*

Figure 9:
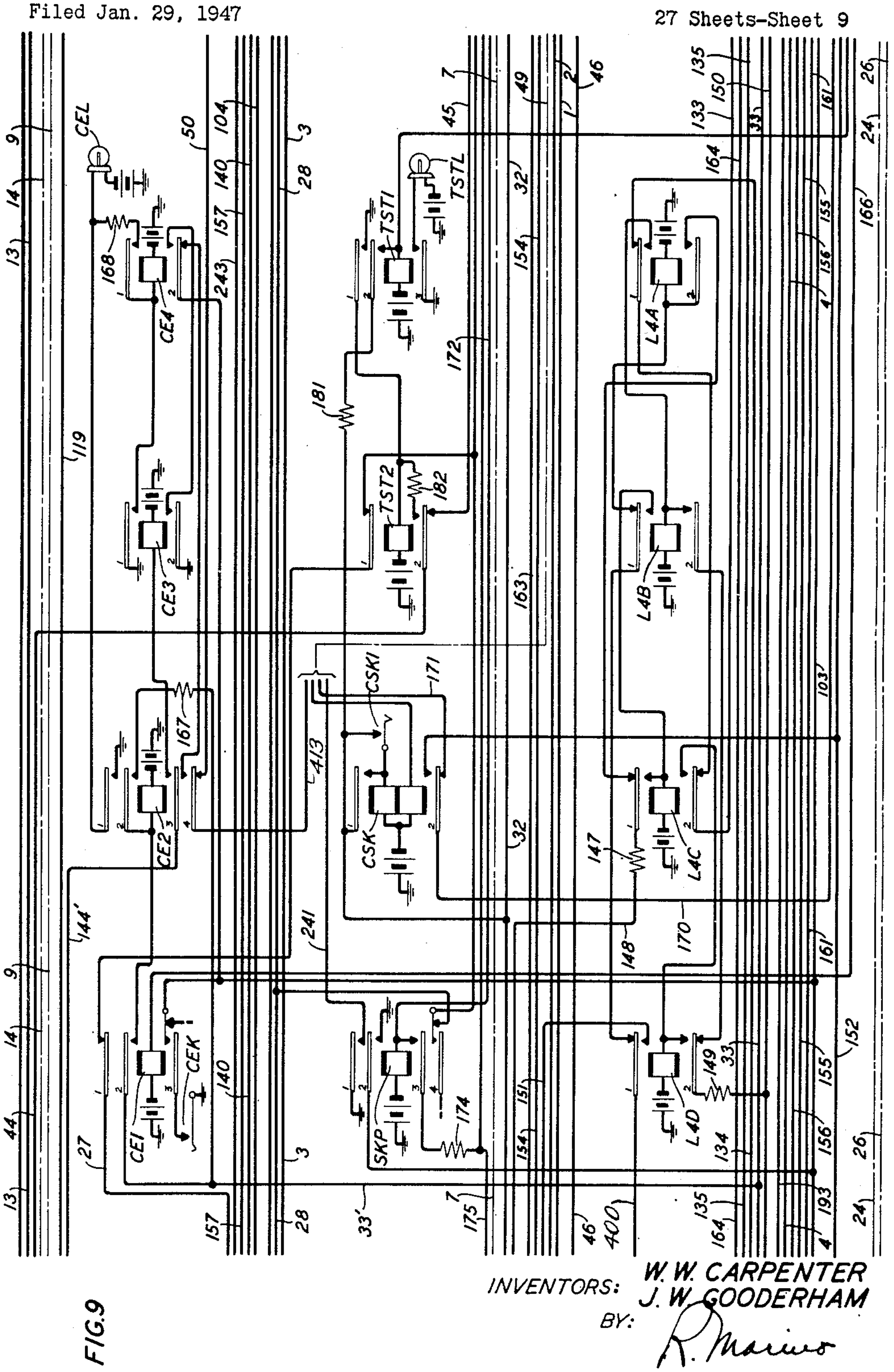

As stated in Section I, the central office apparatus is so arranged that when an initial entry is being perforated in the central office record tape and the apparatus is found to be in trouble in that, for some reason, a complete initial entry is not "perfectly" recorded, the apparatus may permit the call to be completed but will not arrange the district junctor to charge for the call and, therefore, will not cause said junctor to enter answer and disconnect entries for this call on the central office tape record. When the central office equipment is thus permitted to complete the call under the condition stated and no charge is to be made for the call, the central office apparatus will cause the cancel entry "387000" to be recorded on the central office record tape immediately after the mutilated or "imperfect" initial entry (as shown in Fig. 24G) so that, when the assembler reads the cancel entry "387000" an alarm will be given, further reading operations will be suspended and the reader will be caused to be stepped under manual control to skip the lines of the incomplete initial entry without the latter being recorded on any of the record tapes of the ten perforators, or the assembler will be caused to proceed automatically to skip the lines of the entry. It all depends on the condition of key CEK (Fig. 9). If the key is operated, the reader will be stepped automatically to skip the lines of the entry. If the key is not operated, the reader may then be stepped manually under the control of key RSTP (Fig. 13).

Consequently when the reader has advanced the central office record tape to the position in which the perforations of the entry "387000" are underneath the sensing pins AA . . . FE and the latter sense the perforations of the entry, the assembler will operate in the same manner as previously described in response to the sensing of the regular hour entry up to the application of ground to conductor 151. Since the C digit now has the value "7," relays C1B and C1C of the C register will be operated over previously described circuits. Ground on conductor 401 is then extended over the No. 3 contacts of relay C1A, No. 5 contacts of relay C1B, No. 7 contacts of relay C1C, No. 7 contacts of relay C1D, No. 5 contacts of relay C1E, No. 8 contacts of relay C1B, No. 9 contacts of relay C1C, conductor 166, winding of relay CE1, to battery. This relay operates, opens the operating circuit of relay LK1 and completes the circuit of relay CE2, said latter circuit extending from ground on the No. 1 contacts of relay AC9, No. 1 contacts of relay L2, conductor 33, conductor 33', No. 2 contacts of relay CE1, winding of relay CE2 to battery. The latter relay operates, locks over its No. 2 contacts and resistor 167 to the afore-traced ground on conductor 33' and completes an obvious circuit for lamp CEL which lights to indicate that the assembler is sensing the cancel entry code "387000." Further operations are now blocked because the circuit of relays RS1 and RS2 cannot be completed over the previously traced path including the check conductor 101 since no relay PD- has been operated. Under the circumstances and since the reader stepping magnet STP is held (via conductor 117) to ground on the No. 4 back contacts of relay RS1, the central office record tape will be held at the cancel entry with the sensing pins of the reader repeatedly sensing this entry.

Figure 13:
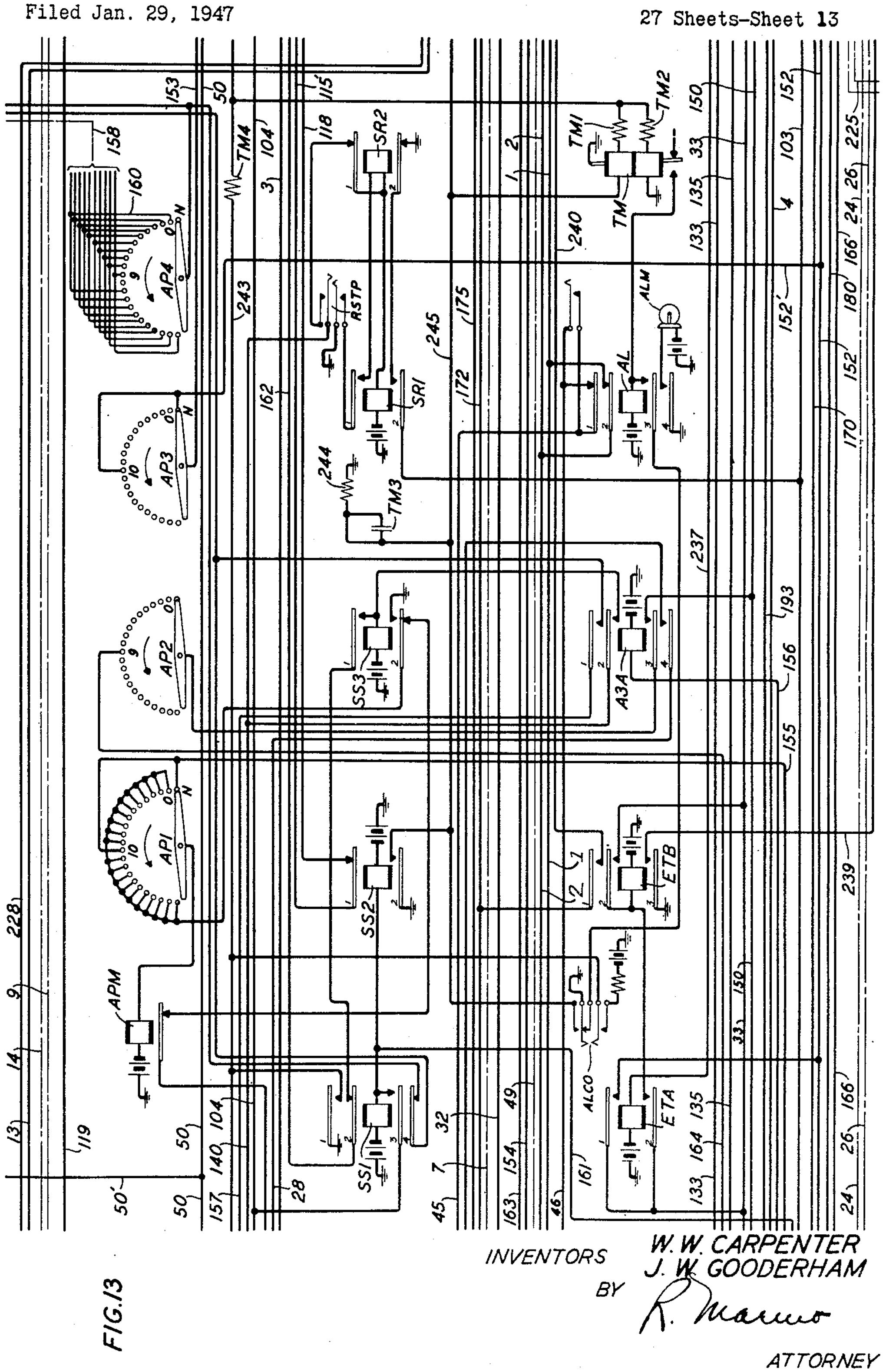

If it is now desired to advance the central office record tape one line at a time, then with key CEK normal an attendant operates the reader step key RSTP (Fig. 13). When the sensing cycle is going through its closed period and contacts C2 are closed, a circuit is completed for relay SR1 which extends from ground on said contacts as traced to conductor 140, upper contacts of key RSTP, No. 1 contacts of relay SR2, winding of relay SR1, to battery. Relay SR1 operates and locks in series with the winding of relay SR2, its own No. 1 contacts, to ground on the lower contacts of key RSTP, relay SR2 remaining shunted the meanwhile by operating ground applied to one side of its winding and ground on the contacts of the key applied to the other. Relay SR1 now completes a circuit for relays RS1 and RS2 extending from ground on the No. 2 contacts of relay SR2, No. 2 contacts of relay SR1, conductor 103 and thence as traced to the windings of relays RS1 and RS2. Both of these relays operate, the former opening its No. 4 contacts to remove ground from conductor 117 which is one of the two grounds that hold the reader stepping magnet STP operated. Said magnet releases at the end of the make period of the sensing cycle when contacts C8 open and remove the other of said two grounds. The central office record tape is thus advanced to the first line of the initial entry to be cancelled. At the end of the make period of the sensing cycle, contacts C2 open and remove the shunting ground from the winding of relay SR2 causing the latter to operate in series with relay SR1 and open the circuit of relays RS1 and RS2. The release of relay RS2 reapplies ground to conductor 117 thereby reoperating the stepping magnet STP to position the reader to advance on the release of the magnet. In the meanwhile relays SR1 and SR2 remain locked under the control of key RSTP which the attendant holds in an operated position. When the key is released, the relays will release. The key RSTP may now be reoperated, and by a repetition of the circuit operations above described the central office record tape will be caused to advance one step to the next line of the entry, the operation being repeated until the reader sensing pins AA . . . FE are brought into coincidence with the perforations of the next entry, whatever it may be.

The attendant may satisfy himself that the lines of the initial entry to be cancelled which follow the entry "387000" are actually being skipped, which is what the cancellation amounts to since the lines are being passed by without reperforation on the record tapes of any of the perforators. He may do this by operating key RLP (Fig. 1) which completes a circuit for relays RCKD, RCKE and RCKF, said circuit extending from ground on the No. 2 front contacts of key FD, upper contacts of key RLP, conductor 493, windings of relays RCKD, RCKE and RCKF, to battery. These relays operate and extend the reader contacts to the lamps LAA . . . LFE which, over obvious circuits selectively completed by the reader contacts of the sensing pins which pass through the perforations of a line of the entry to be cancelled, will light to indicate which pins have penetrated perforations.

If the key CEK is operated the assembler will step by the lines of the initial entry which follow the cancel entry "387000." With relays CE1 and CE2 operated as before described, a circuit is closed for relays RS1 and RS2 extending from ground on the contacts of the key, No. 3 contacts of relay CE1, conductor 103 and thence as traced to the windings of relays RS1 and RS2. The latter relays operate and function as previously described to advance the reader to the next line of perforations.

The next line (of the entry to be cancelled) should be the first line of either an initial two-line entry or an initial four-line entry. Relays A3 and LK will operate in the normal manner, relay CE1 is released after the reader has stepped past the "387000" entry while relay CE2 remains locked. On the first line of the entry to be cancelled, relays B1A . . . B1E of the B register will be set for whatever may be the value of the B digit (other than 8) and the ground previously traced to conductor 48 within bracket 49 now completes the circuit of relays RS1 and RS2 over the No. 4 front contacts of relay CE2, No. 2 back contacts of relay CE4, conductor 103 and thence as traced to the windings of relays RS1 and RS2. The operation of these relays causes the reader to be stepped past the first line of the initial entry. Of course, during the time that the first line of this entry is being read, relay LN2 or LN4 will be operated depending upon whether the first line of the initial entry to be cancelled is an initial two or four-line entry, respectively. Also, relay LK2 will be operated during the open period of the sensing cycle, all as previously described.

When the first supplementary line of the initial entry is read, then since the value of the A digit thereof is "1," relay A1 will be operated over a previously described circuit, and the said relay will then complete a circuit to operate relay CE3, said circuit tracing from ground on contacts C9 as previously traced to the No. 1 contacts of relay A1, No. 1 contacts of relay LK2, No. 5 contacts of relay A3, No. 1 contacts of relay A2, conductor 144′, No. 3 contacts of relay CE2, winding of relay CE3 to battery. The latter relay operates and closes an obvious circuit for relay CE4 which operates and locks over its No. 1 contacts, resistor 168, to ground on the No. 1 contacts of relay CE2. With relay CE4 operated, the circuit path of relays RS1 and RS2 is now closed over conductor 103, No. 2 front contacts of relay CE4, to ground on the No. 2 contact of relay CE3. Relays RS1 and RS2 now function in the manner described to step the reader past the first supplementary line of the initial entry. Also, with relay A1 operated during the sensing of the first supplementary line, a previously described path will be closed for relay LN2 (if the entry is a two-line initial entry) to count the number of lines in the initial entry. If the initial entry is a two-line entry relay L2 will be operated in the manner described when the second line of said entry is being sensed and the circuits will be released at the end of the sensing of the first supplementary line. However, if the initial entry is a four-line entry, relay LN4 will have been operated and relay A1 will cause the operation of relay L4A in the manner described. Relay CE3 will operate as described in the second and third supplementary lines, and in each case relays RS1 and RS2 will be operated to step the reader past the supplementary lines. When the last line of the entry is reached, relay L2 will be operated as described to release the circuits and cause the central office record tape to be advanced to the first line of the next entry.

7. *Cancel charge entry "389000"*

The cancel entry code "387000" above discussed is a code which is entered on the central office record tape when the initial entry previously entered is recognized by the central office equipment as imperfect or, for any other reason, is to be cancelled. It may also happen, however, that while the initial entry is perfect in every respect and is so recognized by the central office apparatus, said entry may subsequently become so blurred or mutilated that it cannot be read by the sensing pins of the reader. Under these circumstances and when the sensing pins of the reader endeavor to sense the first line of an initial entry and the sensing does not result in the operation of the eleven (11) check relays, the assembler is operated to perforate the entry "389000" in each of the perforator tapes as a signal to the accounting equipment to cancel the two answer and disconnect entries previously recorded. In this manner, a call the initial entry for which has become unreadable by the assembler will not be charged to the subscriber who made the call.

When the operation of the assembler has proceeded to the point where the sensing pins AA . . . FE are sensing the first line of an initial entry and the appropriate number of check relays in the digit-checking registers fail to respond, an alarm will be given (as will be described) and the circuit will stop. The attendant then operates key RLP; relays RCKD . . . RCKF are operated in consequence thereof as before described and certain of the lamps LAA . . . LFE are lighted to indicate which of the pins have successfully penetrated the various digit perforations and which have not. If two lamps are not lighted for each of the digits B . . . F, or if a lamp is not lighted for the A digit the attendant knows that one or more of the sensing pins have failed to enter the perforations, that the initial entry is mutilated and that the code "389000" is to be perforated on each of the perforator tapes.

Figure 16:
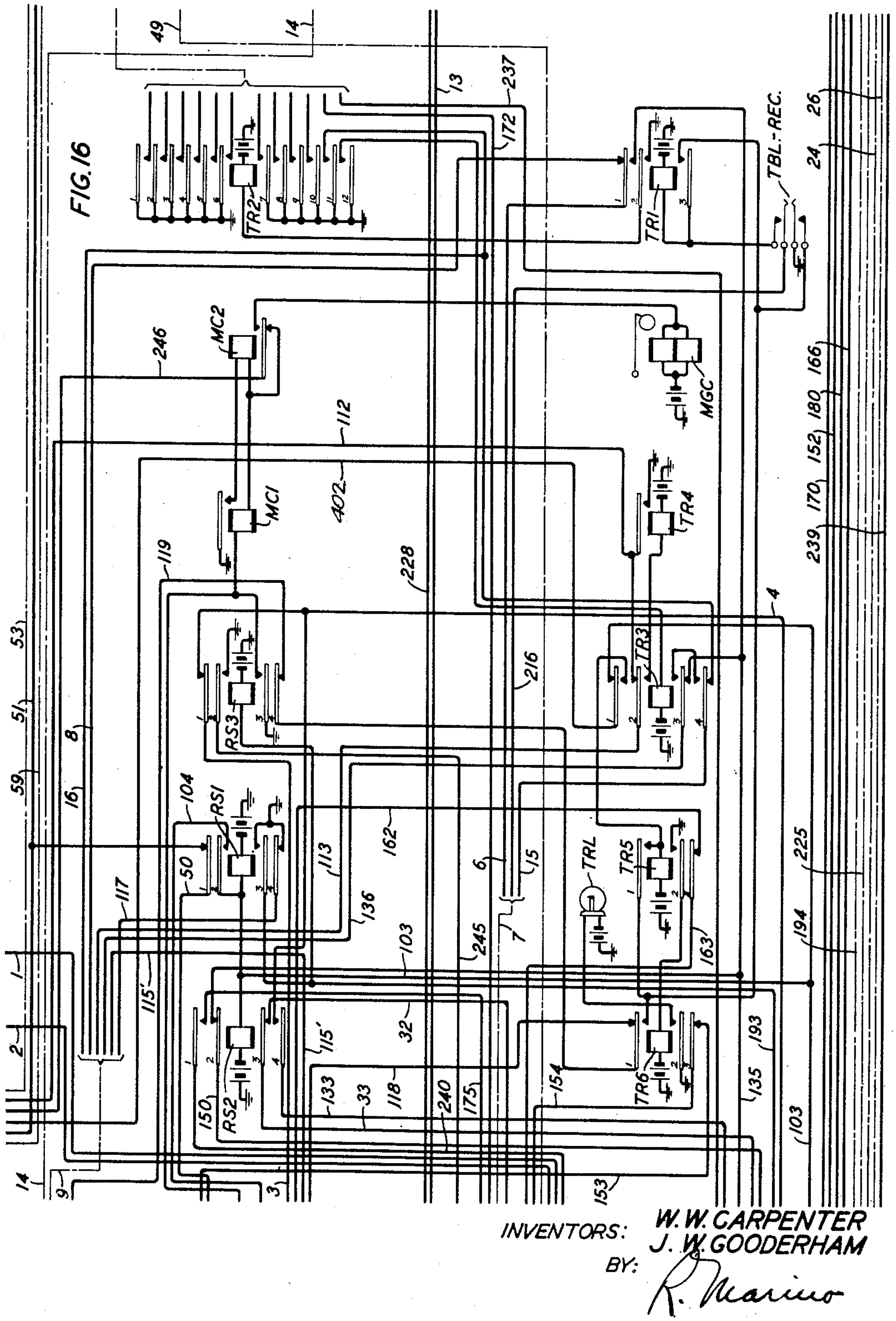

The attendant then operates key RLS (Fig. 6) and key ERLS which restore the circuit to normal by unlocking relays ST1, ST2 and AC0, and releasing relays TA, TB and TC. He then operates the locking key TBL—REC (Fig. 16), whereupon a circuit is closed for relay TR1 extending from ground on the No. 2 back contacts of relay ST2, conductor 216 within bracket 7, upper contacts of key TBL—REC, winding of relay TR1 to battery. The latter relay operates, locks over its No. 3 contacts to ground on the lower contacts of key TBL—REC, and completes an obvious circuit for relay TR2 which, on operating, completes an obvious circuit for relay TR3 which, on operating and over its No. 2 contacts extends ground from contacts C10, No. 30 contacts of relay RFD, conductor 113 within bracket 9 to the winding of relay TR4. The function of relay TR4 is to increase the time between the opening of the circuits to the perforator punch magnets by the release time of relays P– and the opening of the circuit to the perforator step magnet. The object in opening the circuit of relays TA, TB and TC is to prevent the reader contacts from being effective during this operation. The attendant then operates key ST to start the circuit and thereby cause the reoperation of relays ST1, ST2 and AC0 in the described manner. Relays TA, TB and TC remain normal, however, since their circuit is controlled over the contacts of relay TR1.

It will be noted that relay TR2 is provided with twelve (12) pairs of contacts of which the twelfth pair is utilized for the circuit of relay TR3 as above described. The stationary springs of contact pairs 1 to 10, inclusive, are extended by the conductors within bracket 173 to certain of the conductors within bracket 59 which connect to the two checking relays in each of the digit-checking registers B . . . F which indicate, respectively, the digits "89000." Thus the stationary spring of the No. 1 contacts is connected to the winding of check relay BC'; that of the No. 2 contacts to the winding of relay BE'; that of the No. 3 contacts to the winding of relay CA'; that of the No. 4 contacts to the winding of relay CE'; that of the No. 5 contacts to the winding of relay DA'; that of the No. 6 contacts to the winding of relay DB'; that of the No. 7 contacts to the winding of relay EA'; that of the No. 8 contacts to the winding of relay EB'; that of the No. 9 contacts to the winding of relay FA'; and that of the No. 10 contacts to the winding of relay FB'. The stationary spring of the No. 11 contacts extends to the winding of check relay CKAC of the A digit check register which indicates the A digit "3," said latter path extending from the No. 11 contacts of relay TR2, conductor 16 within bracket 9, conductor 16' to the winding of relay CKAC. Inasmuch as each of the digit-checking relays is in series with the winding of a correlated punch magnet in each of the perforators when one of the latter is connected to the assembler by the operation of its own set of cut-in relays PXA . . . PXC, it follows that the operation of relay TR2 completes partial paths over the indicated check relays to operate the corresponding punch magnets of a perforator to punch the code "389000" when said perforator is connected to the assembler.

Also, when relay TR3 is operated a circuit is completed for relay A3, said circuit extending from ground on contacts C1 as previously traced to conductor 136 within bracket 9 (on the first closed period of the sensing cycle after relay AC0 has been reoperated), Nos. 3 and 4 front contacts of relay TR3, conductor 15 within bracket 7, No. 2 contacts of relay ETP, No. 4 contacts of relay AC0, No. 1 contacts of relay APB, winding of relay A3 to battery.

The circuit is now ready to cause the perforation of the entry "389000" on the tapes of each of the perforators. Relay TR2, the stationary spring of whose Nos. 1 and 2 contacts are connected as above described to the winding of the check relays BC' and BE', are also multipled to the windings of relays BC and BE of the B digit register. Also, the stationary springs of the Nos. 3 and 4 contacts of relay TR2 which are connected as described to the windings of check relays CA' and CE' are also connected to the windings of relays C1A and C1E of the C digit register. Consequently when relay TR2 operates, obvious circuits are completed to relays BC, BE, C1A and C1E, the former two, on operating, locally operating relays B2C and B2E. Since relay A3 is operated, the ground on conductor 145 is extended to conductor 401 and thence to conductor 152 via the No. 4 contacts of relay C1A, No. 6 contacts of relay C1B, No. 6 contacts of relay C1C, No. 5 contacts of relay C1D, No. 4 contacts of relay C1E, No. 6 contacts of relay C1E, No. 6 contacts of relay C1A to conductor 152. The latter conductor completes a previously described circuit for relay APA and the latter, in operating, causes the assembler to function as previously described for the perforation of the regular hour entry; meaning thereby that the perforators 0 . . . 9 are successively connected to the assembler. Since relay TR2 is operated, the operation of the cut-in relays P0A, P0B, P0C . . . P9A, P9B, P9C, in succession will complete in succession the previously described partial circuits to the punch magnets of the successively connected perforators, whereby the entry "389000" is caused to be perforated on the tapes of said perforators.

When all the perforators have operated to put the code on their respective tapes and due to the fact that relay TR3 is now operated, the checking ground on conductor 101 and previously traced to conductor 402 will now complete a circuit over the No. 1 front contacts of relay TR3, winding of relay TR5 to battery. This relay operates, locks over its No. 1 contacts to ground on the lower contacts of key TBL—REC, and completes an obvious circuit for relay TR6. The latter on operating closes the circuit of lamp TRL which lights to indicate that the code "389000" has been entered in the tapes of all perforators, and opens the operating path of relay APA to prevent a repetition of the described operation. The reader, however, is still held with the sensing pins repeatedly sensing the perforations of the first line of the initial entry to be cancelled since relay RS1, not having been operated, maintains ground on conductor 117 and holds the step magnet STP operated.

The attendant will now restore the circuit to normal by releasing key TBL—REC which causes the release of all relays locked thereto, and by releasing the keys RLS and ERLS which restore the rest of the circuit, including relay AC0 which, holding to ground on contacts C6, releases after the closed period of a sensing cycle.

The attendant will now operate the reader step key RSC (Fig. 1) which, by opening its contacts, opens the circuit of the step magnet STP and causes the central office record tape to be advanced one line. By successive operations the record can be advanced over each line of the entry to be cancelled, the attendant checking each line by operating key RLP and observing which digit check-lamps LAA . . . LFE are lighted. When the record is advanced to the first line of the next entry, further operations are stopped, the attendant will operate the start key ST and the circuit will then resume its normal sensing operations.

It may be stated that if an imperfect answer or disconnect entry is encountered by the reader, the assembler will stop as above described and the attendant, after checking that the stopping is due to an imperfect answer or disconnect entry, restores the circuit to normal and, by operating key RSC, causes the reader to skip the defective line without the reproduction of the latter upon any perforator tape. The absence of the line from a perforator tape will be a sufficient signal to the computing equipment not to charge for the call.

8. *Splice code "180303"*

We will now describe the operation of the assembler with respect to a group of five entries known as the "end-of-tape entries," with respect to the "splice pattern entries" and with respect to a "skip splice" entry. As noted in Section I, these entries, in a particular pattern, are perforated on the central office record tape whenever a section of it is to be severed from the tape roll and are the groups of entries actually first sensed by the sensing pins of the reader when the section of the record tape is applied to the reader. It will be recalled that the description of the operation of the assembler when sensing these entries was to be postponed until its operation with other entries had first been described.

Fig. 25 illustrates the particular pattern of the five end-of-tape entries and the splice pattern entries as both are perforated in the central office record tape, while Fig. 26 illustrates (between the two words "cut") a section of the central office record tape, the entries within the brackets designated A and B being the three groups of entries which are placed on the tape by the central office equipment whenever a section of the tape is to be severed from the tape roll.

It will also be recalled from Section I that the central office record tape is sensed in reverse order by the assembler. That is, the entries are recorded in one direction by the central office equipment and sensed in the opposite direction by the assembler, as shown in Fig. 26. From which it follows that the first entries encountered by the sensing pins of the assembler will be the slice pattern entries made up of the code "180303" followed by the marker group entry, etc.

In what follows, the operation of the assembler will be described in the order in which its operations take place, assuming that the section of the central office record tape indicated in Fig. 26 between the two words "cut" is applied to the reader sensing pins with a line of the splice pattern below the "cut" across the splice pattern within bracket A coming first under the sensing pins.

Also as previously mentioned in Section I, before beginning the analysis of a central office record tape, it is essential that the assembler be manually adjusted to agree with the number of the marker group, and that this adjustment consists in placing the plugs TNP and UNP in the two jacks of the groups MG tens and MG units which bear, respectively, the numerical indication of the E and F digits of the marker group entry. If it is assumed that these digits together make up the number "07" as indicated in Fig. 25, then plug TNP is inserted in the jack "0" of the MG tens group of jacks and the plug UNP is inserted in the jack "7" of the MG units group of jacks. Assuming these adjustments to have been made by way of example, we may now proceed to the operation of the assembler on encountering a splice code "180303" of the splice pattern.

After the tape is inserted in the reader, locking key ETPK (Fig. 6) and non-locking key ST are operated in the order indicated. The operation of key ETPK closes a circuit for relay ETP extending from ground on the No. 2 back contacts of relay ST2, upper contacts of key ETPK, winding of relay ETP to battery. This relay operates and locks to ground on the lower contacts of the key so long as the latter remains operated. Key ST operated will cause the operation of relays ST1, ST2, AC0, TA, TB and TC as already described. With relay ETP operated, the reader contact lead FE (sensing pin FE sensing the punch position (*aa*) for the A digit "1") is switched to complete the circuit of relay A3 of the A digit register, said circuit tracing from ground on reader contacts FE as traced to conductor 138, No. 4 front contacts of relay ETP, No. 4 contacts of relay AC0, No. 1 contacts of relay APB, winding of relay A3 to battery. Since the B digit has the value "8" relays B1C and B1E of the B register are operated over previously described circuits. Also, since the C digit has the value "0," relays CA and C1B of the C register are also operated over previously described circuits. Hence the ground on conductor 401 previously traced thereto from conductor 145 is now traced over the No. 4 contacts of relay C1A, No. 7 contacts of relay C1B, No. 8 contacts of relay C1C, No. 7 contacts of relay C1D, No. 5 contacts of relay C1E, No. 2 contacts of relay C1A, No. 2 contacts of relay C1B, conductor 404 within bracket 26, No. 1 front contacts of relay ETP, conductor 152, conductor 152′, brush AP3 and normal terminal N engaged thereby, conductor 153, No. 3 contacts of relay TR6, conductor 154, winding of relay APA to battery. With this relay operated, the circuit functions as described in connection with the regular hour entry to perforate the splice code "180303" on the tapes of all the ten perforators, switch AP making as many rounds and causing the different perforators 0 . . . 9 to be as many times connected to the assembler as there are lines of the splice code sensed, the result of which being that the splice pattern appearing on the central office record tape before the marker group entry "384007" is reproduced on the tape of each of the perforators.

When all of the lines of splice pattern have been reproduced on the tapes of the ten perforators and the central office record tape is advanced to the next line of perforations, which will be that of the marker group entry "384007" the circuit will stop inasmuch as the reader contacts FC (which are associated with the sensing pin sensing the punch position (Ac) for the A digit value "3" of the marker group code) are opened at the No. 2 contacts of relay ETP. Key ETPK may now be released to release relay ETP, and key RLS operated to restore the rest of the circuit to normal. Key ST may then be operated and the circuit will thereafter function to sense the marker group entry as described below.

Thus the first operation of the assembler in sensing the lines of the splicing pattern (the first entries encountered) is to cause their reproduction as the first lines of perforation on the tapes of the several perforators.

9. *Marker group entry "3840XX"*

When the marker group entry "384007" is read by the sensing pins AA . . . FE of the reader, the A digit "3" causes the operation of relay A3 of the A register, the B digit "8" causes the operation of relays B1C and B1E of the B register while the C digit "4" causes the operation of relays C1B and C1E of the C register, all over circuit paths previously described. Relay LK1 operates in the manner previously described for the sensing of the regular hour entry. As will be remembered, relays A3, B1C and B1E will cause ground on conductor 145 to be extended to conductor 401. Since relays C1B and C1E are now operated, the ground on conductor 401 is further extended over the No. 3 contacts of relay C1A, No. 5 contacts of relay C1B, No. 6 contacts of relay C1C, No. 5 contacts of relay C1C, No. 4 contacts of relay C1E, No. 2 contacts of relay C1E, No. 1 contacts of relay C1B, conductor 190 within bracket 225, No. 3 back contacts of relay MG2, winding of relay MG1 to battery. Since the ground on conductor 145 is derived from the common contacts C9, relay MG1 operates during the make period of the sensing cycle, locking over its No. 2 front contacts, No. 2 back contacts of relay MG2 to ground on conductor 191 applied thereto from the No. 8 contacts of relay LK1 over the No. 3 contacts of relay APC. Relay MG1 further completes the circuit of relay RS3, said circuit tracing from ground on the No. 2 contacts of relay MG1, conductor 193 within bracket 176, winding of relay RS3 to battery. Among its other functions relay RS3, upon operating, short-circuits by ground on its No. 2 and 3 contacts, the upper winding of the timing relay TM. As will be shown later, relay TM normally times the duration of a cycle of operations by the assembler. However, since the reader stepping magnet STP is not being operated at this time it is necessary to cancel the timing, which is done by short-circuiting the upper winding of relay TM.

During the open period of the sensing cycle, ground on contacts C7 completes the circuit of relay MG2, said circuit extending from ground on said contacts as traced to conductor 4 within bracket 176, No. 3 contacts of relay MG1, winding of relay MG2 to battery. Relay MG2 operates and locks to ground over its No. 2 front contacts, conductor 191 within bracket 175, No. 3 contacts of relay APC to ground on the No. 8 contacts of relay LK1. The operation of relay MG2 releases relay MG1.

With either relay MG1 or MG2 operated, a circuit is closed to operate relay DFMG, said circuit being traced from ground on the No. 4 contacts of relay MG2 or the No. 5 contacts of relay MG1, conductor 192, winding of relay DFMG to battery. With relay DFMG operated the five relays TEA . . . TEE are extended via the lower five conductors within bracket 194 to the lower group of conductors cabled "TEA . . . TEE" which are connected, respectively, to the conductors within bracket 14 which extend to the reader contacts of the sensing pins that sense the E digit perforating positions (Ea) . . . (Ee) of the central office record tape and which, in this instance, have the tens digit of the marker group perforated thereon. Also, the five relays UPA . . . UFE are extended via the upper five conductors within bracket 194 to the upper group of conductors cabled "UFA . . . UFE" which are connected, respectively, to the conductors within bracket 14 which extend to the reader contacts of the pins which sense the F digit perforating positions (Fa) . . . (Fe) of said record tape and which, in this instance, have the units digit of the marker group perforated thereon. Inasmuch as the marker group number is assumed in the example to be "07" (Fig. 25), the sensing of the tens digit "0" of this number will cause relays TEA and TEB to be operated, while the sensing of the units digit "7" will cause relays UFB and UFC to be operated. The circuit paths for these relays are easily traceable from the involved rear contacts to the conductors of cable 14 and thence, via the conductors of cable 194 and the contacts of relay DFMG, to the windings of the above relays. It is understood, of course, that other two-out-of-five relays in each of the two groups of relays TEA . . . TEE and UFA . . . UFE will be operated in accordance with the value of each of the two digits E and F comprising the marker group number. A circuit is now completed for relay APA which may be traced from battery through the winding of said relay, conductor 154, No. 3 contacts of relay TR6, conductor 153, wiper brush AP3 and the normal terminal N, conductor 152′, conductor 152, conductor 195 within bracket 176, No. 1 contacts of relay MG2, conductor 196, sleeves of jacks 9, 8 and 7 of the units jacks "MG units," sleeve and ring of plug UNP, ring of jack 7, conductor 197, No. 9 contacts of relay UFC, No. 8 contacts of relay UFB, No. 5 contacts of relay UFE, No. 7 contacts of relay UFD, No. 7 contacts of relay UFC, No. 5 contacts of relay UFB, No. 3 contacts of relay UFA, conductor 198, No. 4 contacts of relay TEA, No. 7 contacts of relay TEB, No. 8 contacts of relay TEC, No. 7 contacts of relay TED, No. 5 contacts of relay TEE, No. 2 contacts of relay TEA, No. 2 contacts of relay TEB, ring of jack "0" of tens jacks "MG tens," ring and sleeve of plug TNP inserted therein, sleeves of jacks 1 . . . 9 of said "tens" jacks, conductor 199, No. 3 front contacts of relay MG2, conductor 190 within bracket 225, No. 1 contacts of relay C1B, No. 2 contacts of relay C1E, No. 4 contacts of relay C1E, No. 5 contacts of relay C1D, No. 6 contacts of relay C1C, No. 5 contacts of relay C1B, No. 3 contacts of relay C1A, conductor 401 and thence as previously traced (through the relays B1C and B1E of the B register) to ground on conductor 145, as applied thereto by contacts C9 during the make period of the sensing cycle.

With relay APA operated, the circuit will function as described for the regular hour entry to perforate the marker group record "384007" on the tapes of all of the ten perforators 0 . . . 9. The marker group entry, it will be noted, is perforated in the perforator tapes immediately after the last line thereon of the splice pattern, which was sensed before the marker group entry.

If the marker group designation on the central office record tape as read by relays TEA . . . TEE and the relays UFA . . . UFE does not "check" with the number set up on the jacks MG tens and MG units by the plugs TNP and UNP, respectively, the circuit will stop (as will be shown) and an alarm brought in to indicate that the record tape of a wrong marker group is being processed. In this event further processing of the tape will be arrested. Under normal operating conditions, when the marker group record checks properly with the setting of the plugs TNP and UNP, relay MG2 will be unlocked when relay APC operates, thereby releasing relay DFMG which, in turn, will cause the release of relays UFA, UFB, TEA and TEB.

10. *District frame entry "3800XX"*

When, after the marker group record "384007" has been perforated on the tapes of the several perforators the stepping magnet STP releases, the central office record tape is advanced one step to bring the perforations of the district frame entry "3800XX" under the reader sensing pins. It is assumed (according to Fig. 25) that the particular frame entry is "380000."

Ordinarily the record tapes from a particular marker group (or building) are spliced together in the proper numerical order as determined by the district frame entry, beginning with the entry "00" for the E and F digits. If they are not, then the tapes of the marker group will be inserted in the reader one at a time in the above-indicated numerical order. To check that the central office tapes from one given marker group are spliced together, or inserted in the reader in the indicated numerical order and that no tapes are omitted, switch DF and the relays of Fig. 10 are provided. Lamps associated with the switch DF are also provided to indicate the particular district frame number of the tape which is being processed. These lamp indications will, of course, change progressively as the tapes from the successive district frames of the given marker group are successively processed by the assembler.

In case the first tape processed is not that of district frame "00" as assumed, or in case it is desired to process the tapes of a particular district frame only, or to skip a frame, arrangements are provided so that switch DF and the associated relays can be positioned to check any district frame number by the operation of keys DFT0K, DFT1K and DFUK. As already mentioned, the first entry encountered on the central office record tape after the splicing pattern will be the marker group entry, and the second one thereafter will be that of the district frame entry. If the district frame entry is not "00" and, therefore, does not check with the position of switch DF and associated relays, the circuit will stop and further processing of the tape is arrested.

When the district frame entry "330000" is being read, relay A3 of the A register will operate in response to the sensing of the A digit "3," relays B1C and B1E of the B register will operate in response to the sensing of the B digit "8" (in turn locally operating relays B2C and B2E) and relays C1A and C1B of the C register will operate in response to the sensing of the C digit "0." These relays all operate over previously described circuits. Relays LK1 will also operate as previously described. As a consequence, the ground previously traced to conductor 145 as a result of the operation of relay A3 is extended to conductor 401 over a previously traced path through the contacts of relay B1A . . . B1E and thence over the No. 4 contacts of relay C1A, No. 7 contacts of relay C1B, No. 8 contacts of relay C1C, No. 7 contacts of relay C1D, No. 5 contacts of relay C1E, No. 2 contacts of relay C1A, No. 2 contacts of relay C1B, conductor 404 within bracket 26, No. 1 back contacts of relay ETP, conductor 405 within bracket 176, No. 3 back contacts of relay DF2, winding of relay DF1 to battery. Relay DF1 operates, locks over its No. 5 contacts, No. 2 normally made contacts of relay DF2 to previously traced ground on conductor 191, and grounds conductor 193 over its No. 8 contacts to operate relay RS3. The latter relay operates to cancel the timing as previously described in connection with marker group sensing inasmuch as the reader drum is not being stepped during the closure of the reader contacts. With the brushes of switch DF in their respective normal positions (as evidenced by the normal condition of the off-normal contacts DFC) a circuit path is closed for the rotary magnet ROT of this switch, said circuit extending from ground on the No. 3 contacts of relay DF1, No. 3 contacts of relay DF5, conductor 406, upper springs of contacts DFC, winding of rotary magnet ROT to battery. This magnet operates and advances the brushes DF1 and DF2 into engagement with the first terminals (0) of their respective arcs.

During the open period of the sensing cycle, when contacts C7 are closed following the operation of relay DF1, a circuit path is completed for relay DF2, said circuit extending from ground on the contacts C7 as previously traced to conductor 4 within bracket 176, No. 4 contacts of relay DF1, winding of relay DF2 to battery. The latter relay, upon operating, locks to ground on conductor 191 over its No. 2 front contacts and releases relay DF1.

With relay DF1 operated (that is, prior to its release by relay DF2), circuits were closed for operating relays DFMG, DF8, DF3 and DF6. The circuit of relay DFMG is an obvious one over conductor 192 from the No. 1 grounded contacts of relay DF1; that of relay DF8 from the No. 6 contacts of relay DF1; that of relay DF3 from the No. 2 contacts of relay DF1; while that of relay DF6 from the No. 7 contacts of relay DF1. Relay DFMG holds to the No. 3 contacts of relay DF8 after relay DF1 releases, as subsequently shown.

The operation of relay DFMG now connects the relays TEA . . . TEE and UFA . . . UFE to the reader for sensing the E and F digits, respectively, of the district frame number on the central office record tape which number, in this instance, is assumed to be "00" and, therefore, results in the operation of relays TEA, TEB and UFA, UFB. The operation of relay DF6 connects the contacts of the relays UFA . . . UFE to the terminals of the switch DF. The operation of relay DF3 connects the windings of relays DFT0 and DFT1 to the contacts of relays TEA . . . TEE for registering the tens digit (E) of the district number perforated on the central office record tape. Since this digit is either "0" or "1" (the number of frames being limited to twenty (00 . . . 19) by way of example) either relay DFT0 or DFT1 will operate, the former if the tens digit is "0" and the latter if this digit is "1." It has been assumed in the present example that the tens digit is "0," in consequence of which relays TEA and TEB are operated. Therefore, a circuit path is completed for relay DFT0 extending from ground in the No. 4 contacts of relay DF8, conductor 407, No. 4 contacts of relay TEA, No. 7 contacts of relay TEB, No. 8 contacts of relay TEC, No. 7 contacts of relay TED, No. 5 contacts of relay TEE, No. 2 contacts of relay TEA, No. 2 contacts of relay TEB, conductor 203, No. 5 contacts of relay DF3, conductor 204, No. 3 contacts of relay DT2, winding of relay DFT0 to battery. Relay DFT0, upon operating, completes the circuit of relay DF1, said circuit extending from ground on the No. 1 contact of relay DLR, No. 2 contacts of relay DFT0, winding of relay DF1 to battery. The latter relay operates, locks over its No. 2 contacts to ground on the No. 1 contacts of relay DLR, and completes an obvious circuit for lamp DFT0L the lighting of which indicates that the tens digit of the district frame is "0."

Had the tens digit of the frame number been "1" instead of "0" and, therefore, relays TEA, TED had been operated instead of relays TEA and TEB, a path would have been closed for relay DFT1 extending from ground on conductor 407 as aforetraced thereto, No. 4 contacts of relay TEA, No. 6 contacts of relay TEB, No. 6 contacts of relay TEC, No. 6 contacts of relay TED, No. 5 contacts of relay TEE, No. 8 contacts of relay TED, No. 5 contacts of relay TEA, conductor 408, No. 4 contacts of relay DF3, conductor 205, winding of relay DFT1 to battery. The function of relay DFT1 will be described later.

Relays UFA and UFB (operated in response to the sensing of the F or units digit "0") complete a circuit for relay DF4, said circuit extending from ground on the No. 4 contacts of relay DF8, conductor 407, No. 4 contacts of relay UFA, No. 7 contacts of relay UFB, No. 8 contacts of relay UFC, No. 7 contacts of relay UFD, No. 5 contacts of relay UFE, No. 2 contacts of relay UFA, No. 2 contacts of relay UFB, conductor 409, No. 1 contacts of relay DF6, wiper brush DFS1 and "0" terminals engaged thereby, conductor 410, No. 1 front contacts of relay DF3, winding of relay DF4 to battery. The latter relay operates and locks over its No. 2 contacts to ground on the No. 2 contacts of relay DF3. In parallel with the circuit of relay DF4 is that of lamp DFU0 which operates to indicate that the units digit of the district frame number of the record being sensed is "0."

Relay DF4 completes the circuit of relay DF5, said circuit extending from ground on the No. 1 contacts of relay DLR, conductor 43, No. 3 contacts of relay DF4, winding of relay DF5 to battery. The latter relay operates, locks over its No. 2 contacts to ground on conductor 43 and prepares the circuit of relay DF7 when the district frame number changes from "00" to "01" in the processing of the tape from frame 01 which, it is assumed, will follow the processing of that from frame "00." It will be noted that relay DF5 cannot be released except by the operation of relay DLR which, among its other functions, remains normal during the processing of the tape of frame 00. The operation of relay DF4 also closes a path to operate relay APA, the circuit thereof tracing from battery through the winding of said relay as previously traced to conductor 152 and thence to conductor 195 within bracket 176, No. 1 contacts of relay DF4, conductor 59, No. 1 contacts of relay DFT0, conductor 411, No. 3 contacts of relay DF2, conductor 405 within bracket 176, No. 1 back contacts of relay ETP, conductor 404 within bracket 26, and thence as previously traced to ground on conductor 145. With relay APA operated the circuit will proceed to perforate the district frame entry "00" (E and F digits) on the tapes of all of the ten perforators (along with other digits of the entry) in the same manner as described above for perforating the regular hour entry on all ten perforators, except that on the release of the circuit, relays DF5 and DF1 will remain locked to ground on the contacts of relay DLR. The record tape is then advanced in the described manner, to bring the next line of perforations under the sensing pins of the reader. It will also be noted that when relay APA releases, it opens the circuit of relay RS3 which, in releasing, removes the short circuit around the upper winding of relay TM so that the latter may resume timing operations, as will be described.

11. *Hour entry "3811XX"*

The next entry of the end-of-tape entries to be sensed will be the "hour" entry "3811XX," the latter being the hour at which the end-of-tape entries are perforated on the central office record tape and is not to be confused with the regular hour entry "3810XX" which, as previously noted, is perforated on the central office record tape at the beginning of each hour. The two entries, however, differ only in the value of the D digit which, for the regular hour entry, is "0" and which, for the hour entry of the end-of-tape entries, is "1," the E and F digits in both cases designating, of course, the actual hour in which the entry is made. Fig. 25 shows a typical end-of-tape hour entry in which the hour (XX digits) is indicated as "14."

The method of operation for putting this entry on the tapes of all perforators is the same as that already described for the regular hour entry "3810XX."

12. *Day entry "3820XX"*

The next entry of the end-of-tape entries to be sensed will be the "day" entry "3820XX" which, in the E and F digits thereof, records the day in which the end-of-tape entries are made. Since there are a maximum of 31 days, the E digit will either be 1, 2 or 3 while the F digit will be any value from 0 to 9. Fig. 25 shows a typical day entry for the end-of-tape entries in which the day (XX digits) is indicated as "27."

The method of operation for putting this entry on the tapes of all perforators is the same as that already described for the regular hour entry "3810XX."

13. *Month entry "3830XX"*

The next and last of the end-of-tape entries to be sensed will be that of the "day" entry "3830XX" which in the E and F digits thereof, records the month in which the end-of-tape entries are made. Since there are 12 months, the E digit will be either 0 or 1 while the F digit will be any value from 0 to 9. Fig. 25 shows a typical month entry for the end-of-tape entries in which the month (XX digits) is indicated as "06."

The method of operation for putting this entry on the tapes of all perforators is the same as that already described for the regular hour entry "3810XX."

14. *Skip splice entry "386000"*

After the five end-of-tape entries have been disposed of by causing the same to be reproduced on the tapes of the ten perforators, the next entry that will be encountered by the reader will be the first line of a call record entry, probably an answer or disconnect entry or, at all events, the first line of an initial two-line or four-line entry. The assembler then operates in the manner described to dispose of the entries in accordance with the indications furnished by the value of the A digit in the first line of the entries. These operations will continue and the central office record tape (of frame 00) will be advanced until the marker group entry punched at the "trailing" end of the tape as the first of the end-of-tape entries will be underneath the pins of the reader.

The assembler will then operate as above described to cause the second five end-of-tape entries to be reproduced on the tapes of the ten perforators, after which the central office record tape is advanced to the skip splice entry "386000."

It is not desirable ot reproduce the splicing pattern which follows the skip splice entry except on the last tape, and it is the purpose of this entry to so advise the assembler which, in response to the sensing thereof, will automatically cause the lines of the splice pattern following it to be skipped without reproduction on the tapes of the ten perforators.

When the skip splice entry "386000" is sensed by the pins of the reader, relay A3 will be operated in response to the sensing of the A digit "3," relays B1C and B1E will be operated in response to the sensing of the B digit "8" (said relays in turn locally operating relays B2C and B2E) while relays C1A and C1C will be operated in response to the sensing of the C digit "6." All of these relays operate over circuit paths previously traced. Relay LK1 also operates in the manner previously described in connection with the operation of the assembler in sensing the regular hour entry "3810XX."

With relays C1A and C1C operated, the ground previously traced to conductor 401 now completes a circuit for relay SKP, which circuit extends from ground on said conductor, No. 4 contacts of relay C1A, No. 6 contacts of relay C1B, No. 7 contacts of relay C1C, No. 7 contacts of relay C1D, No. 5 contacts of relay C1E, No. 1 contacts of relay C1A, No. 1 contacts of relay C1C, conductor 170, No. 2 back contacts of relay CSK, conductor 171 within bracket 49, No. 1 contacts of relay FDS, conductor 172 within bracket 173, winding of relay SKP to battery. This relay operates and locks over its No. 3 front contacts, resistor 174, conductor 175 within bracket 176, No. 2 contacts of relay DF8, No. 4 contacts of relay MG1, conductor 177 within bracket 176, to ground on the No. 1 contacts of relay AC0. At its No. 4 continuity contacts, relay SKP opens the circuit of relay LK1 causing this relay to release and stay released during the time that the perforations of the splicing pattern are sensed and skipped by the reader. Relay SKP also completes a circuit for relays RS1 and RS2 by grounding conductor 193 through its No. 2 contacts, and since relay RS1, upon operating, removes ground from conductor 117, the reader step magnet STP is released in the described manner to advance the record past one line of splice perforations. Since relay SKP is locked under the control of the No. 4 contacts of relay MG1, relays RS1 and RS2 will remain operated, thereby causing the step magnet STP to operate and release under the sole control of the contacts C8 to advance the reader drum automatically and pass by all the lines of the splice pattern, the operations continuing until the reader pins encounter the marker group entry of (1) either another section of the central office tape belonging to the same district frame (in this case frame "00") or of the central office tape belonging to the next frame "01" of the same marker group. Since the A digit of this latter entry is "3," the operation of relay A3 will cause the operation of relay MG1 as previously described for the marker group operation. Relay MG1 operated, unlocks relays SKP and the release of the latter releases relays RS1 and RS2. Relay RS1 grounds conductor 117 and halts the advance of the central office tape record at the marker group entry.

On first district sort operations it is desirable not to skip the splice pattern on the trailing end of the last tape of a central office. It will be noted from Fig. 26, however, that there is always the skip splice code "386000" preceding the splice pattern at the trailing end of all tapes, and that if the reader senses this code it will cause the assembler to skip the pattern. Hence to avoid this skipping on the trailing end of the last central office tape the attendant will operate locking key CSK1 (cancel skip) (Fig. 9) just before the end of said last central office tape. The closure of this key completes a circuit for relay CSK, extending from ground on the No. 1 contacts of relay AC0, conductor 32, contacts of key CSK1, upper winding of relay CSK to battery. The relay operates and locks over its No. 1 contacts to ground on conductor 32. Now when the reader senses the skip code 386000, ground on conductor 170 previously traced thereto through the relays of the C register in consequence of the digit "6" being registered therein is now switched over the No. 2 front contacts of relay CSK to complete the circuit of relay APA via conductor 152 and thence as previously traced to the winding of relay APA. With this relay operated the assembler proceeds to perforate the skip splice code "386000" on the tapes of all ten perforators, after which the reader will be stepped to the first line of the splice pattern, stop and bring in the alarm. The attendant will then release the circuit in the manner already described, operate key ETP and reoperate key ST. The circuit will then proceed automatically as already described to copy all the splicing patterns on the end of the central office record tape on all ten perforators. Additional splice lines can be copied by operating key RDR (Fig. 1) which will prevent the reader from advancing.

15. *Sensing tapes of different district frames in the same marker group*

It will now be assumed that the next record tape to be sensed by the assembler will be that of the next district frame (01) of the same marker group. This tape the first part of which will be identical with the section of the tape in Fig. 25 which lies below the "cut" within the bracket A, will have its splice pattern superimposed upon the splice pattern of the trailing end of the tape just sensed; that is, it will be superimposed upon the splice pattern above the cut within bracket B. If the two splice patterns are thus joined, the assembler will continue in the manner described to skip the superimposed splice pattern of the two tapes and will stop skipping operations when the record is advanced to the marker group entry "384007" of the tape belonging to district frame 01.

The assembler will then proceed to sense the marker group entry and cause the same to be reproduced on the tapes of all ten perforators. Upon the advance of the record to the district frame entry, which now is "380001," the circuit operates as previously described for the sensing of the district frame entry "380000" to cause the operation of relays DF1, RS3, DF2, DFMG, DF8, DF3 and DF6; relays DF5 and DF1 having remained locked from said previous operation. With the operation of relay DFMG, relays UFA . . . UFE and TEA . . . TEE are connected as described to the reader contacts of the pins which sense the F and E digits, respectively. The operation of relays TEA and TEB in response to the sensing of the E digit 0 will cause the operation of relay DFT0 in the manner described. The units or F digit, however, is "1" instead of "0." Hence relays UFA and UFD will be operated. The circuit of relay UFA has already been traced. That of relay UFD extends from ground on reader contact AB, No. 29 contacts of relay RFD, conductor 41 within brackets 14 and 194, No. 4 contact of relay DFMG, winding of relay UFD to battery. With relays UFA and UFD operated, and with the brushes of switch DF still in their respective "1" terminals, a circuit is completed for relay DF7, said circuit extending from ground on the No. 4 contacts of relay DF8, conductor 407, No. 4 contacts of relay UFA, No. 6 contacts of relay UFB, UFC and UFD, No. 5 contacts of relay UFE, No. 8 contacts of relay UFD, No. 5 contacts of relay UFA, conductor 105, No. 2 contacts of relay DF6, brush DFS2 and terminal 1 engaged thereby, conductor 106, No. 3 contacts of relay DF3, No. 1 contacts of relay DF5, normal contacts of relay DFL, winding of relay DF7 to battery. Relay DF7 operates and locks over its No. 4 contact to ground on the No. 2 contact of relay DF3.

It will be noted that, if by some error, the tape spliced to the tape of district frame "00" had been that of any other district frame but "01," or if the tape processed after that of district frame "00" is that of any other district frame but "01," the path of relay DF7 would not have been completed inasmuch as this path is completed only when relays UFA and UFD (for the units digit "1") are operated. Under these circumstances, the circuit will stop and bring in an alarm, as will be shown.

With relay DF7 operated, a path is completed for the magnet ROT of the switch DF, said path extending from ground in the No. 3 back contacts of relay DF9, No. 5 contacts of relay DF7, conductor 412, winding of magnet ROT to battery. The magnet operates and steps the wipers DFS1 and DFS2 to their respective No. 2 terminals. Further, relay DF7 completes the circuit of relay APA, said circuit extending from battery through the winding of said relay as previously traced to conductor 195, No. 1 contact of relay DF7, conductor 59, No. 1 contact of relay DFT0, and thence as previously traced to ground on conductor 145. Relay APA operates and functions to cause the district frame entry of the frame "01" to be perforated on the tapes of all ten perforators.

With relay DF7 operated, a path is also closed for relay DFL, said path being traced from ground on the No. 2 contact of relay DF3, No. 2 contact of relay DF7, winding of relay DFL to battery. This relay operates and opens the operating path of relay DF7 through the brush DFS2. This is to prevent the momentary lighting of lamp DFU– from the locking contact of relay DF7. When relay APC operates in the manner described, ground is removed rom conductor 191, causing thereby the release of relay DF2 which, in turn, releases all of the relays DF– locked thereto.

Upon the release of relay DF3, a circuit is completed for lamp DFU1 extending from ground on the No. 1 back contact of said relay, conductor 410, brush DFS1 and No. 2 terminal, lamp DFU1 to battery. This lamp lights and indicates that the tape of district frame "01" is being processed.

Switch DF will progress in the manner above described as the assembler operates to process the successive tapes from the different district frames of the same marker group, provided that said tapes are spliced or independently applied to the reader in the indicated numerical order. When the district frame number is repeated or sensed the second time, relay DF4 operates over a circuit completed from previously traced ground on conductor 410, No. 1 front contacts of relay DF3, winding of relay DF4 to battery. This relay operates to check that the record is the same as the one registered in the assembler, and proceeds to control subsequent operations by which the district frame entry is put on the tapes of all ten perforators. However, and as above described, when the district frame number on the tape is one number in advance of the record to the assembler, relay DF7 operates to move the brushes of the switch DF to the next higher position.

When switch DF reaches the tenth position which registers the "09" district frame number, a circuit is closed for relay DF9 after relay DF3 has released when the brushes of the switch are moved from the ninth to the tenth position. This circuit may be traced from ground on the No. 1 back contact of relay DF3, conductor 410, brush DFS1 and the No. 10 terminal engaged thereby, conductor 114, No. 5 back contact of relay DFS, winding of relay DF9 to battery. This relay operates, locks over its No. 2 contacts to ground on the lower set of off-normal springs DFC, and completes an obvious circuit for lamp DFU9 to indicate that the tape of the district frame "09" is being processed.

When the record tape of district frame "10" is sensed (which tape will be next in the order of sensing), relays TA and TD will be operated in response to the sensing of the E digit "1" and relays UFA and UFB will be operated in response to the sensing of the F digit "0." Consequently relay DFT1 is operated over a previously traced path. Since relay DF9 is now locked, a circuit is completed for relay DF7, said circuit extending from ground on conductor 409 as applied thereto through a previously traced path, No. 1 contacts of relay DF6, No. 1 contacts of relay DFT1, No. 10 terminal and brush DFS2, conductor 106, No. 3 contacts of relay DF3, No. 1 contacts of relay DF5, normal contacts of relay DFL, winding of relay DF7 to battery. This relay operates, and instead of completing a circuit for the magnet ROT as previously described, now completes a circuit for release magnet RLS; said circuit extending from ground in the No. 3 front contacts of relay DF9, No. 3 contacts of relay DF7, conductor 116, winding of magnet RLS to battery. This magnet operates, returns the brushes DFS1 and DFS2 to their respective normal terminals and restores the off-normal springs DFC which unlock relay DF9. The latter, upon restoring, reestablishes the circuit of magnet ROT which operates to advance the brushes DFS1 and DFS2 to their respective No. 1 terminals.

When relay DFT1 operated, a circuit was closed for relay DT2, said circuit extending from battery through the winding of said relay, No. 3 contacts of relay DFT1, to ground on the normal contacts of relay DLR. An obvious circuit for lamp DFT1L is therefore established which indicates the tens digit "1" of the district frame number while the lighting of lamp DFU0 over a previously described circuit indicates the units digit "0." The relays of Figs. 7, 10 and 14 and the switch DF will then operate as before described for indicating and checking the processing of tapes from district frame "10" to "19."

In the above description, it should be noted that relays DF5, DF1 and DT2 are locked operated to the No. 1 contacts of relay DLR. This arrangement is provided so that the district frame record stored in the relays and in the position of switch DF will not be released if the release keys RLS and ERLS are operated to restore the assembler for the purpose, say, of investigating some trouble condition arising from the sensing of a tape or for any other reason. To release the above relays and restore switch DF at the end of sorting, non-locking key DFRK is provided which, on being operated, completes an obvious circuit for relay DLR. The latter, on operating, disconnects ground from conductor 43, in turn releasing relays DF5, DT1 and DT2. The operation of relay DLR further completes a circuit for release magnet RLS, said circuit extending from ground in the lower off-normal springs DFC, No. 2 contacts of relay DLR conductor 116, winding of magnet ROT to battery. The operation of the magnet restores switch DF to normal.

16. *Sensing single district frame tapes*

To analyze a single district frame record tape; that is, a tape which is not spliced to the tapes from other district frames in the required numerical order, the plugs TNP and UNP are first inserted in the jacks which indicate the marker group number of the tape. The switch DF is then positioned to the terminals indicated by the district frame entry, the latter being accomplished by means of key DFU', the distinction between the tens digit "0" and "1" of the frame entry being made by means of keys DFT0K and DFTK.

The operation of key DFU' (which is non-locking) completes an obvious circuit for the magnet ROT, and the latter, by operating successively on successive operation of the key, steps the brushes of the switch to the terminals indicated by the units digit of the frame entry. The circuit of the appropriate units lamp DF0–, in accordance with the terminals to which the brushes of the switch are stepped, is then completed over brush DFS1 to ground on the No. 3 contacts of relay DF3, via conductor 410. If the tens digit of the frame entry is "0," key DFT0K is operated and the latter closes an obvious circuit for relay DF1 which, on operating, completes the circuit of lamp DFT0L which lights to indicate that the tens digit of the frame entry is "0." On the other hand, if the tens digit is "1," key DFTK is operated to complete the circuit of relay DT2 which operates to light lamp DFT1L to indicate said digit. The record may then be processed in the manner previously described.

17. *Test call entries "388000"*

The central office circuits are arranged to record certain "test calls" on the central office record tape. These calls are but selective circuit closures for the punch magnets of the central office recorder, to test their operation for all digital values of each of the six digital orders A to F, inclusive.

According to the above-mentioned Carpenter-Collis copending application, when it is desired to test the magnets of a central office recorder, the latter is made busy and placed under the control of a master timer which thereupon proceeds to cause the recorder to perforate on the central office record tape in succession one set of end-of-tape entries, a series of skip splice codes, the skip splice code "386000" followed again by another set of end-of-tape entries (see Fig. 27). This last set is then followed by a series of test calls (usually about eighty in number) which are intended (as said before) to test the magnets of the recorder in the varied combinations they are intended to operate in service. The codes of these test calls may, if desired, be selected to conform to some geometric pattern which will be recognized by the attendant as a "test call pattern." The last test call will be followed by the test call entry "388000," after which the recorder is again placed in service to receive regular call entries from the group of district junctors it serves.

It is the purpose of the assembler, in sensing the test call entries when processing a portion of the central office record tape, to skip such entries inasmuch as they do not pertain to subscriber calls. Remembering that the central office record is sensed in reverse, the assembler will first sense the entry "388000" after sensing and disposing of the call records immediately preceding.

When the sensing pins encounter the test call entry "388000," relay A3 of the A register will be operated in response to the sensing of the A digit "3," relays B1C and B1E of the B register will be operated in response to the sensing of the B digit "8" (in turn locally operating relays B2C and B2E) while relays C1C and C1E of the C register will be operated in response to the sensing of the C digit "8." All these relays are operated over previously described circuits. The operation of relays C1C and C1E of the C register now causes ground on conductor 401 to be further extended over the No. 3 contacts of relay C1A, No. 4 contacts of relay C1B, No. 5 contacts of relay C1C, No. 5 contacts of relay C1D, No. 4, contacts of relay C1E, No. 2 contacts of relay C1C, No. 1 contacts of relay C1E, conductor 180, winding of relay TST1 to battery. This relay operates, completes an obvious circuit for lighting lamp TSTL, completes an obvious circuit for relay TST2 which operates, and closes a locking path for itself over its No. 2 contacts, resistor 181, conductor 32, No. 1 contacts of relay AC0, ground. Relay TST2 also locks via its own No. 2 front contacts, resistor 182, conductor 44 to ground on contacts C9, applied thereto during the closed period of the sensing cycle as previously described. With relay TST2 operated, relay LK1 will be released and the ground from the contacts C9 is disconnected from conductor 45, thus suspending all further circuit operations.

With circuit operations suspended, the timing circuit (the operation of which will be described later) will bring in an alarm. An attendant will then release the circuit by operating keys RLS and ERLS, key RLS opening the locking circuit for relays ST1 and ST2 causing them to release which, in turn, removes one locking ground for relay AC0 while key ERLS opens the other and causes said relay to release, thereby unlocking all relays held thereto. It will be noted that relay RFD remains operated since its circuit is controlled from key FD which remains operated. The attendant then operates non-locking key RSTP (Fig. 13) which, during the make period of the sensing cycle, completes the circuit of relay SR1 from ground on contacts C1 as previously traced to conductor 149, upper contacts of key RSTP, No. 1 contacts of relay SR2, winding of relay SR1 to battery. The latter relay operates and closes a locking circuit through the winding of relay SR2, No. 1 contacts of relay SR1, ground on the lower contacts of key RSTP. Relay SR2 remains shunted until contacts C1 open at the end of the closed period of the sensing cycle. While relay SR1 is operated and relay SR2 is normal, a circuit for relays RS1 and RS2 is completed from ground on the No. 2 contacts of relay SR2, No. 2 contacts of relay SR1, conductor 103 to the windings of relays RS1 and RS2. The operation of the former relay removes ground from conductor 117 to cause the stepper magnet STP to take one step and advance the central office record tape one row of perforations, or one test call. The circuit of relays RS1 and RS2 is opened upon the operation of relay SR2 during the open period of the sensing cycle, causing it to release, while relays SR1 and SR2 remain operated as long as key RSTP is kept depressed. The relays release upon the release of the key, and in order again to advance the tape to the next test call it is necessary to reoperate the key, in consequence of which the above operations are repeated for each operation of the key and the central office caused to skip one test call for each such operation.

Should the attendant desire to skip the test calls rapidly instead of one at a time, he operates key RSC (Fig. 1) which opens the circuit of the stepper magnet STP thus causing the reader drum to advance uninterruptedly through successive revolutions without stopping at the end of each revolution for the magnet to operate. The attendant, by watching the progress of the tape, will cease to operate the key after the tape has been advanced to the next entry after the last test call, which entry will be the marker group entry of the first set of end-of-tape entries. Thereafter the attendant will release keys RLS and ERLS and reoperate the start key ST, at which time relays ST1, ST2, ACO, TA, TB and TC are reoperated in the manner described to make the circuit again responsive to sensing operations of the pins of the reader. Since the next entry will be that of the marker group, the assembler will operate in the manner previously described for the disposal of such entries.

SECTION III.—SECOND DISTRICT SORT

The assembler is arranged to make a second district sorting operation as well as the first sorting operation. The first sorting operation which we have been describing is made by sorting the entries on the central office record tape according to the units digit of the district number, appearing as the F or 6th digit of the record, and the object of the sorting is to collect in chronological order on one tape all the call record entries pertaining to calls made over all districts having identical units digits.

An example of such record made, say, by perforator No. 1 is shown in Fig. 28A in which only the controlling digits of call record entries, the skip splice entry and a regular hour entry are shown (and shown in script). In Fig. 28A, the bottom of the tape record indicates the splice pattern (in blank) and the end-of-tape entries which, it will be remembered, were copied directly from the central office record tape at the beginning of sensing operations by operating the ETPK key after operating the start key ST. These entries are then followed by the regular call entries (which are the only ones shown) and all other entries (such as the regular hour entry, one of which only is shown) which are recorded thereon. As a typical example, the lowest and fifth entries above the first set of end-of-tape entries are the answer and disconnect entries for a call completed over district 71, the next two lines following the entry immediately above said disconnect entry being the initial entry for this call, which is a "bulk-billed" call. This latter entry is then followed on the tape (after omitted entries) by the two answer and disconnect entries for a call completed over district 91 followed, in this case, by the four lines of the initial entry for this call, which is a detailed call. The next entry is the regular hour entry "3810XX," perforated on all of the ten tapes prepared by the ten perforators, followed in succession by entries for calls completed over districts 51, 31, 01, etc. intervening sections of the record being omitted for brevity, ending with the skip splice entry "386000" and the splice pattern.

Thus each tape prepared in response to sorting by the units digit has thereon all the call records pertaining to calls established over districts having the same units digit.

Each of these tapes is now passed through the assembler in the consecutive numerical order indicated by the value of the F or units digit, and the purpose is to sort the records according to the tens or E digit thereon and distribute them over ten other tapes in the same consecutive order as they appear on the tape being processed, but in the numerical order indicated by the different district numbers. That is, the ten tapes to be produced by the ten perforators as a consequence of sorting the previously produced tapes according to the value of the E, or tens, digit, will have all the call records pertaining to calls completed over each of ten districts arranged in numerical order indicated by the district numbers. An illustration of a section of a tape produced as a result of the second district sorting operation is shown in Fig. 28B.

The assembler is arranged to check that the ten tapes resulting from the first district sorting operation are inserted in the reader in the proper numerical order and that no tapes are omitted. This tape number check operation is controlled by means of switch TN (Fig. 19). The assembler is not arranged, however, to check the district frame entry of the end-of-tape entries, though it will check the marker group entry inasmuch as operations for reproducing this entry are contingent upon the plugs TNP and UNP being in the two jacks designating the tens and units digits, respectively, of this entry.

In the second district sorting operation the ten tapes resulting from the first district sorting operation are spliced together in the numerical order 0 to 9 or inserted in the reader in this order. As the entries on first district sort were sorted according to the units digit of the district number, all of the call entries on the first tape encountered ("0" tape) on second district sort will have the digit "0" as the units district number. In the second district sort, the assembler is arranged to sort the entries according to the tens digit of the district number. A check, however, is made to ascertain that the units digit of the district number is "0" for all of the entries found on the "0" tape of the first district sort operation, that the units digit of the district number "1" for all of the entries in the second tape, etc., the same check being made in processing all of the ten tapes.

The operation of the assembler will now be described for the second district sort. And first it will be noted that the tape "00" to be processed, being that produced by perforator 0 as a result of the first district sort, is not inserted in the reader in reverse as was the central office record tape, but direct. Because of the operation of relay RSD instead of RFD as noted below, the reader contact conductors will now extend to the respective winding of the relays or magnets in the assembler directly associated with the contacts.

After tape "00" is inserted in the reader, key SD (Fig. 1) and key ST are operated. The latter key initiates the operation of the circuit by causing the operation of relays ST, ST1, AC0, TA, TB and TC as already described. Key SD completes a circuit for relay RSD, said circuit extending from ground on the No. 1 normal contacts of key FD, No. 1 make contacts of key SD, conductor 227, winding of relay RSD to battery. Relay RSD operates and extends the reader contacts AA . . . FE as well as the common contacts C1 . . . C11 to the circuit. Key SD also completes a circuit for relay SDS, said circuit extending from ground on the No. 2 normal contacts of key FD, No. 2 contacts of key SD, conductor 228, winding of relay SDS to battery. Relay SDS operates and since relay RSD is now operated, the windings of the five relays of the F register are extended, via the conductors within bracket 229, to the reader contacts of the F digit, thereby enabling the value of this digit to be registered on said relays. The individual circuits of these relays, assuming ground on the appropriate reader contact when the associated sensing pins enter perforations on the tape, are as follows:

(1) Ground on contacts FA, No. 1 contacts of relay RSD, conductor 231 within bracket 14, No. 12 contacts of relay SDS, conductor 232 within bracket 229, winding of relay FDA to battery;

(2) Ground on contacts FB, No. 2 contacts of relay RSD, conductor 183 within bracket 14, No. 11 contacts of relay SDS, conductor 233 within bracket 229, winding of relay FDB to battery;

(3) Ground on contacts FC, No. 3 contacts of relay RSD, conductor 186 within bracket 14, No. 10 contacts of relay SDS, conductor 234 within bracket 229, winding of relay FDC to battery;

(4) Ground on contacts FD, No. 4 contacts of relay RSD, conductor 41 within bracket 14, No. 9 contacts of relay SDS, conductor 235 within bracket 229, winding of relay FDD to battery;

(5) Ground on contacts FE, No. 5 contacts of relay RSD, conductor 215 within bracket 14, No. 8 contacts of relay SDS, conductor 236 within bracket 229, winding of relay FDE to battery.

These relays operate over the above-traced circuits in the previously given 2-out-of-5 code combinations for the ten different values of the F digit that may be sensed by the sensing pins of the circuit in response to the sensing of the F digit in all the entries on the tape.

From an inspection of Fig. 28A it will be seen that the first entries to be encountered by the reader are those of the splice pattern and that these are followed by the five end-of-tape entries. Both the splice pattern and the end-of-tape entries are caused to be reproduced on the ten tapes of the perforators. Following the pattern of description adapted for the first district sort, the operations by which these reproductions are made will follow those by which the regular call entries are disposed of; that is, reproduced on the tapes of the perforators respectively indicated by the value of the E digit of such call entries.

Assuming, then, that the record has been advanced to the first call entry, such an entry may be either an answer or disconnect entry the A digit of which is "2," or the first line of an initial entry the A digit of which is "3." Let it be assumed that the entry is an answer or disconnect entry as indicated in Fig. 28A. The A digit for such an entry being "2," a hole will be punched in the punch position (Ab), and when the pin AB enters the perforation, its associated reader contact will complete the circuit of relay A2, said circuit extending from ground on reader contacts AB, No. 27 contacts of relay RSD, conductor 121, No. 2 contacts of relay AC0, winding of relay A2 to battery.

Simultaneously with the sensing of the A digit the other five digits B . . . F are also sensed, including the E or the tens digit of the district number recorded on the tape as part of the entry. This digit may, of course, have any value from 0 to 9, and depending upon its value, two out of the five pins EA . . . EE inclusive will enter perforations during the closed period of the sensing cycle and cause the associated reader contacts to be closed to ground. Since relay SDS is operated, the corresponding 2-out-of-5 relays SA . . . SE of the selection register S will be operated over previously traced circuits (but now extending over contacts of relay SDS instead of relay FDS as in first district sort) to register therein the value of the E digit which, for this example, may be assumed to be "7" (as indicated in Fig. 28A) and resulting in the operation of relays SB and SC.

When processing the "0" perforator tape, which should be the first tape processed, the F digit of the district number of the answer or disconnect entry being sensed should be "0." Consequently, relays FDA and FDB will operate over previously traced circuits. Since relay A2 has been operated in response to the sensing of the A digit "2," the ground on contacts C9 previously traced to conductor 47 during the make period of a sensing cycle is now extended to the No. 1 terminal of the arc accessible to brush TN1 of switch TN, the extension of said path from conductor 47 then further extending over the No. 4 contacts of relay FDA, No. 7 contacts of relay FDB, No. 8 contacts of relay FDC, No. 7 contacts of relay FDD, No. 5 contacts of relay FDE, No. 2 contacts of relay FDA, No. 2 contacts of relay FDB, No. 1 terminal of the above-mentioned switch arc. With the brushes TN1 and TN2 of the switch in position 1 (they should be placed in this position by operating key TNS before sorting operations are started) and relays SB and SC of the selection register operated in response to the sensing of the E digit 7, the ground on conductor 47 is further extended over brush of arc TN2, conductor 413, conductor 51 as previously traced thereto, No. 3 contacts of relay SA, No. 5 contacts of relay SB, No. 7 contacts of relay SC, No. 7 contacts of relay SD, No. 5 contacts of relay SE, No. 8 contacts of relay SB, No. 9 contacts of relay SC, to the No. 7 conductor within bracket 53, which is connected to the windings of the cut-in relays P7A, P7B and P7C (not shown), of perforator No. 7 (not shown). These relays now operate in the manner described for the first district sort to cause the connection of perforator No. 7 to the assembler whereby the answer or disconnect entry having the digit 7 for the district number of the entry is caused to be perforated in the manner described on the tape of perforator No. 7.

Had the entry being sense been the first line of an initial entry and, therefore, having "3" for the A digit, relay A3 would have operated instead of relay A2, but the above operations would be the same. However, since relay A3 causes the operation of relay LK1, the operation of the latter would cause, for perforator No. 7, the operation of the "memory" relay PE7 (not shown) in order to cause the seizure of the same perforator for the perforation of supplementary lines of the entry on the same tape.

It should be noted that each entry is checked, in the second district sort, to insure that the tape inserted in the reader was the "0" tape, and that the same checking path arrangement through the No. 1 terminal of arc TN1 is used in processing all the calls for the "0" tape. When the tapes of the first district sort are incorrectly spliced together or incorrectly inserted in the reader, or if one of the tapes is omitted, the check circuit through switch TN will stop on the first call entry and ring an alarm as will be shown. The lamps TN0 . . . TN9 the circuit of each of which is obvious, indicate the tens digit of the district number on the entries of the tape being processed.

When all of the entries on the perforator tape of the first district sort have been processed, the skip splice entry "386000" will be found before the splicing pattern which occurs at the end of the tape. As previously described in connection with the first district sorting operations, when the pins of the reader sense the entry "386000," relay A3 will be operated and the latter will complete a path from ground on conductor 401 through relays B1C and B1E (operated for the B digit 8) and relays C1A and C1C (operated for the C digit 6) to operate relay SKP. However, since in the second district sort operation relay SDS is operated instead of relay FDS, the ground on conductor 170 (traced thereto from conductor 401) completes a circuit for relay ETA, the circuit thereof being traced from ground on said conductor 170, No. 2 back contacts of relay CSK, conductor 171 within bracket 49, No. 1 contacts of relay SDS, conductor 237 within bracket 173, winding of relay ETA to battery. With relay ETA operated, a circuit is completed for relay APA extending from ground on contacts C5, No. 36 contacts of relay RSD, conductor 29, No. 4 contact of relay LK1, conductor 33, No. 1 contacts of relay ETA, conductors 152 and 152' and thence as previously traced to the winding of relay APA. With this relay operated the circuit will proceed to perforate the entry "386000" on the tapes of all ten perforators. Also, with relay ETA operated, an obvious circuit is completed for relay ETB, which operates and then locks over its No. 2 contacts to ground on conductor 33. Relay ETB completes an obvious circuit over conductor 239 for magnet ROT of switch TN to advance the wipers thereof to their respective terminals 2, at which terminals the switch will be in the position to check the units digit of the district number of the entries processed in the next tape, which should be that of district "01."

When relays RS1 and RS2 operate in the manner described to advance the record beyond the "386000" entry after said entry has been perforated on the tape of perforator No. 9, relay ETB completes the circuit of relay SKP, said circuit extending from ground on the No. 1 contacts of relay AC0, conductor 177 within bracket 176, No. 4 contacts of relay MG1, No. 2 contacts of relay DF8, conductor 175 within bracket 176, No. 1 contacts of relay RS2, conductor 240, No. 1 contacts of relay ETB, conductor 172, winding of relay SKP to battery. This relay operates, locks and causes the circuit to skip past the splicing pattern in the manner described. With relay SKP operated, relays RS1 and RS2 will be held operated over conductor 103 to enable the reader to skip past the splice pattern entries. Also, with relay SKP operated a circuit is completed for relay DLR, said circuit extending from ground on the No. 1 contacts of relay SKP, conductor 241 within bracket 49, No. 2 contacts of relay SDS, conductor 242 within bracket 225, winding of relay DLR to battery. With relay DLR operated the district frame number record in the assembler will be released and relays DF– locked to the No. 1 contacts of relay DLR will release and switch DF will return to normal by a circuit completed for the release magnet RLS from ground on the lower springs of the off-normal contacts DFC and No. 2 contacts of relay DLR.

SECTION IV.—ALARMS

The assembler is provided with suitable alarms if, within a predetermined time, the reader step magnet STP is not operated to advance the record being sensed unless the predetermined interval is cancelled by operating requirements contingent upon the record remaining stationary.

When key ST is operated and relay AC0 is operated in consequence thereof as previously described, battery is connected over its No. 6 contacts to conductor 243 which extends to the resistor TM4 and the latter in parallel to resistors TM1 and TM2 which are connected, respectively, to the upper and lower winding of polarized relay TM. It will be observed that the network comprising resistor 244 and the condenser TM3 is in series with the upper winding of relay TM. The current through the lower winding of this relay opposes the current through the upper winding so that when battery is applied to conductor 243 and the circuit is thereby completed to both windings, the currents through both windings neutralize each other for the time it will take to charge condenser TM3. Thereafter the current through the lower winding, being greater than that through the upper, will cause relay TM to operate and complete an obvious circuit to operate relay AL, which locks over its No. 3 contacts to ground on the upper normal springs of key ALC0, lights the lamp ALM, and opens ground from the common contacts C9 supplied to the contacts of the A digit register. The value of condenser TM3 and that of the resistor 244, TM4, TM1 and TM2 may be so chosen as to cause relay TM to operate in any period of time after the operation of relay AC0. In the present embodiment of the invention, the values are such as to cause the operation of the relay in approximately .35 second after the closure of the circuit therefor; that is, .35 second is allowed for a cycle of operation resulting in the perforation of the line sensed and the advance of the record being sensed consequent to the operation of the stepping magnet STP. In other words, if this cycle of operation takes longer than approximately .35 second (or any other desired period) relay TM operates to bring in the alarm.

If the cycle of operation takes less; that is, if the circuit of magnet STP is opened by the operation of relay RS1 and the consequent removal of ground from conductor 117 in less than the indicated time, the operation of relay RS3 from the No. 3 contacts of relay RS1 will cause relay RS3 to apply ground over its No. 3 contacts to the common terminal resistor TM4 and the two windings of relay TM, releasing the latter, condenser TM3 being discharged in the meanwhile to ground from the No. 2 contacts of relay RS3 being applied to conductor 245. Thus relay TM is recycled for each cycle of operation of the assembler. If relay TM does operate, in turn to cause the operation and locking of relay AL, the latter may be released by operating the key ALC0.

As there are several conditions in the circuit whereby operations occur and the reader is not stepped, the circuit is arranged so that on each of these conditions the circuit of relay TM is short-circuited and condenser TM3 discharged. For example, during the period when an entry is being perforated on all ten tapes the reader is not stepped. Relays SS1, SS2 and SS3 are operated as previously described each time a record is perforated on a tape of any one of the ten perforators. At its No. 2 contacts, relay SS2 grounds condenser 245, thereby discharging condenser TM3 and causing relay TM to be recycled.

A similar operation occurs when checking the marker group and district frame conditions. The operation of relay MG1 or DF1 as previously described when these two checks are respectively made will complete the circuit of relay RS3 over conductor 193 and the operation of this relay discharges condenser TM3.

Again, the same operation occurs when relay APA operates, which, over its No. 5 contacts, applies ground to conductor 193 to operate relay RS3, causing the latter to discharge condenser TM3 and cause the recycling of the operating period of relay TM.

SECTION V.—COUNTER

A counter MGC (Fig. 16) is provided to indicate the number of additional times the assembler attempts to perforate a record on a perforator when the digit-check relays do not operate to step the reader. This condition may occur, for example, in case of a contact failure when one of the punch magnets of a perforator is not operated and, therefore, the checking relay circuit will not be closed to operate relays RS1 and RS2 and step the reader. When these two relays do not operate during the closed period of the sensing cycle the reader will make another attempt, each of which attempts will be duly registered by the magnetic counter MGC.

When relay AC0 operates as previously described battery is applied to conductor 243 and, through resistor TM4, to the winding of relay MC1. When, as a result of the operation of the proper group of cut-in relays PXA . . . PXC is operated and, in consequence thereof the associated relay PDX operates, ground on the No. 4 contacts of said relay PDX completes the circuit of relay MC1 via conductor 246, back contacts of relay MC2, winding of relay MC1 to battery. The latter relay operates and locks in series with relay MC2, the latter being short-circuited by ground on conductor 246. When, however, relay PDX releases, relay MC2 operates in series with relay MC1. Now under normal conditions relays RS1, RS2 and RS3 will operate to step the reader if the check relays operate. When relay RS3 operates, ground on its No. 3 contacts short circuits relays MC1 and MC2 and they will release. This operation is normal and occurs in every case when a record is properly read and perforated on one of the perforators.

However, in case the check relays fail to operate and the reader is not stepped in consequence thereof, relays MC1 and MC2 would be held operated, and on the next attempt to perforate the record on the perforator, that is the next time relay PDX is operated, a circuit is closed to the counter MGC, said circuit extending from ground on conductor 246, front contacts of relay MC2, both windings of counter MGC to battery. The counter operates to register the failure to perforate the record by the same perforator, and the same operation will occur on each such attempt.

If the record is not successfully perforated and the reader is not stepped in a period of approximately .25 second, for example, the alarm relay TM will function and stop the circuit operation. With this arrangement the counter MGC will give an approximate count of the number of unsuccessful attempts made to perforate records on the tapes.

While we have illustrated our invention in its application to a particular type of record-controlled apparatus, it should be understood that it is not limited to such application or to the specific arrangements herein disclosed. It will be apparent to one skilled in the art that various applications, modifications and arrangements other than those disclosed herein are within the scope of the invention. Moreover, the terms and expressions employed with reference to the invention and its elements have been used as terms of descriptions and not of limitation and therefore, we have no intention in the use of such terms and expressions of excluding thereby equivalents of the features shown and described in portions thereof, but, on the contrary, intend to include therein any and all equivalents and modifications which may be employed without departing from the spirit of the invention.

What is claimed is:

1. A device for transferring record data represented by perforations in a sheet, comprising a sensing mechanism for simultaneously sensing a plurality of positions in a line in the sheet for perforations, a plurality of receiving devices, and control means responsive to the sensing of perforations in different positions in a line of the sheet for selectively connecting two or more of said receiving devices to said sensing mechanism, and means controlled by said sensing mechanism for operating each of the connected receiving devices to reproduce the perforations sensed.

2. A record-controlled apparatus comprising in combination with a record to be sensed, said record containing a plurality of entries one of which includes two digits, a sensing mechanism for sensing said entries, a plurality of reperforators, means for connecting any one of said reperforators to said sensing mechanism whereby the connected perforator is operated by said sensing mechanism to reperforate an entry sensed, and means for selecting one of said perforators for connection to said sensing mechanism in accordance with the one or the other of the two digits in an entry which includes said two digits.

3. A record-controlled apparatus comprising in combination with a record to be sensed, a sensing mechanism for sensing said record including a plurality of sensing devices which are adapted to repetitively sense said record, receiving devices, and means responsive to the operation of said sensing mechanism for connecting said receiving means with said sensing devices at the beginning of a repetitive operation only.

4. A record-controlled apparatus comprising in combination with a perforated record to be sensed, a sensing mechanism for sensing said record and including a sensing pin for each punch position in said record, a plurality of reperforators, means responsive to said sensing mechanism sensing said record for selecting one of said reperforators and for connecting the magnets thereof with the sensing pins of said sensing mechanism, whereby said magnets are selectively operated by the sensing pins entering the perforations of said record, and means for rendering ineffective two or more of said reperforators in the event that the magnets thereof become connected to the sensing pins of said sensing mechanism.

5. A record-controlled apparatus comprising in combination with a perforated record to be sensed, a sensing mechanism for sensing said record and including a sensing pin for each punch position in said record, a plurality of reperforators including a stepping magnet and a punch magnet for each sensing pin in said sensing mechanism, a connecting means for each one of said perforators, means responsive to said sensing mechanism sensing said record for operating one of said connecting means whereby the punch magnets of the associated perforator are connected to the correlated sensing pins of said sensing mechanism, whereby said punch magnets are selectively operated by the sensing pins entering the perforations of said record, and a circuit for the stepping magnet of each of said perforators controlled over said perforator connecting means, thereby to operate the stepping magnet of the perforator connected to said sensing pins over said operated perforator connecting means.

6. A record-controlled apparatus comprising in combination with a perforated record to be sensed, a sensing mechanism for sensing said record including a sensing pin for each punch position in said record, a plurality of perforators each including a punch magnet for each sensing pin in said sensing mechanism, means responsive to the sensing of said record by said sensing mechanism for connecting the punch magnets of one of said perforators to corresponding sensing pins of said sensing mechanism, means for completing circuit paths between those sensing pins which enter perforations and the associated punch magnets in the connected perforator, and means included in said circuit paths effective upon the closures thereof for severally advancing the record being sensed by said sensing mechanism and the record being produced by said connected perforator.

7. A record-controlled apparatus comprising in combination with a record to be sensed, said record including a plurality of entries each recorded by a selective combination of a definite number of perforations in a row, a sensing mechanism for sensing said perforations including a sensing pin for each punch position in the row of punch positions in the record, a plurality of perforators including a punch magnet for each sensing pin in said sensing mechanism, means responsive to the sensing of an entry by the sensing pin of said sensing mechanism for connecting the punch magnets of one of said perforators to said sensing pins, means for completing circuit paths between sensing pins which enter perforations and the associated punch magnets whereby said magnets are operated to reproduce the perforations of the entry, a checking device included in each of said paths, and means responsive to the operation of a predetermined number of said checking devices and only a predetermined number, for advancing said record to the next entry.

8. A record-controlled apparatus comprising in combination with a record to be sensed, said record having a plurality of entries each comprising one or more lines, a sensing mechanism for sensing each line of said record, a plurality of perforators, means responsive to the sensing of the first line of an entry for connecting one of said perforators to said sensing mechanism, whereby the said perforator is operated in response to said sensing mechanism to perforate on a tape the line of the entry being sensed, control means responsive to the sensing of the first line of the entry for registering the total number of lines in the entry, means responsive to the perforation of the line of the entry on the tape of the connected perforator for disconnecting said perforator from said sensing mechanism, and means responsive to said control means for reconnecting the said perforator to the sensing mechanism for each line of the entry, whereby said prforator reproduces in the associated tape each of the lines of the entry as sensed by said sensing mechanism.

9. A record-controlled apparatus comprising in combination with a record to be sensed, said record having a plurality of entries thereon with each entry containing one or more lines with the first line thereof indicating the number of lines in the entry, a sensing mechanism for sensing each line of an entry, a plurality of reproducing devices, a register responsive to the sensing of the first line of an entry for registering the indication of the number of lines in the entry, means also responsive to the sensing of the first line of an entry for selectively connecting one of said reproducing devices to said sensing mechanism, whereby said first line sensed by said sensing mechanism is reproduced by said connected receiving device, and counting means controlled by said register for counting each succeeding line of said entry when sensed by said sensing mechanism and for connecting the same receiving device to said sensing mechanism for the reproduction by the latter of each of said succeeding lines of said entry.

10. A record-controlled apparatus comprising in combination with a perforated record to be sensed, said record having a plurality of entries each consisting of a first line and one or more supplementary lines, a sensing mechanism for sensing the perforations in the lines of said entries, a plurality of perforators, means responsive to the sensing of the first line of an entry for selectively connecting one of said perforators to said sensing mechanism whereby said connected perforator operates to reproduce the perforations in the line sensed, a counting device responsive to the sensing of each line of the entry, and means controlled by said counting device for connecting the same perforator to said sensing mechanism for the reproduction of the perforation of the supplementary lines of the entry.

11. A record-controlled apparatus comprising in combination with a record to be sensed, said record having a plurality of entries, a sensing mechanism for sensing the entries on said record, a plurality of perforators, means responsive to the sensing of an entry for connecting one of said perforators to said sensing mechanism for the reproduction of said entry by said perforator, and control means responsive to the sensing of another entry for causing all of said perforators to be connected in succession to said sensing mechanism, whereby said other entry is reproduced by each of said perforators.

12. A record-controlled apparatus according to claim 11, wherein said control means responsive to said sensing mechanism sensing an entry renders ineffective all of said perforators.

13. A record reproducing system comprising in combination with a record to be sensed, said record having a plurality of entries of different character thereon, a sensing mechanism for sensing said entries, a plurality of reproducing devices, and means responsive to said sensing mechanism sensing an entry for selectively connecting one of said reproducing devices to said sensing mechanism if the entry sensed is of one character, for connecting all of said reproducing devices in succession to said sensing mechanism if the entry is of another character, for rendering all of said reproducing devices inoperative if the entry sensed is still of another character, and circuits completed between said sensing mechanism and said reproducing devices as connected to said sensing mechanism for causing said reproducing devices to reproduce the entry sensed, and whereby the connected reproducing device or devices are then operated to reproduce the entry.

14. A record reproducing system comprising in combination with a record to be sensed, said record having a plurality of entries of different character thereon, a sensing mechanism for sensing said entries, a plurality of reproducing devices, means responsive to said sensing mechanism sensing an entry for selectively connecting one of said reproducing devices to said sensing mechanism whereby the entry sensed is reproduced by said reproducing device, means responsive to said sensing mechanism sensing an entry of a particular character for rendering ineffective said selective connecting means, and means thereafter effective for rendering ineffective the sensing of the following entry.

15. A record reproducing system comprising in combination with a record to be sensed, said record having a plurality of entries of different character thereon, a sensing mechanism for sensing said entries, a plurality of reproducing devices, means responsive to said sensing mechanism sensing an entry for selectively connecting one of said reproducing devices to said sensing mechanism whereby the entry sensed is reproduced by said reproducing device, means responsive to said sensing mechanism sensing an entry of a particular character for rendering ineffective said selective connecting means, and manually operable means thereafter effective for operating said sensing mechanism to sense ineffectively the entry which immediately follows.

16. A record reproducing system comprising in combination with a record to be sensed, said record having a plurality of entries thereon, a sensing mechanism for sensing said entries, a plurality of reproducing devices, means responsive to said sensing mechanism sensing an entry for selectively connecting one of said reproducing devices to said sensing mechanism whereby the entry sensed is reproduced by said reproducing device, means responsive to said sensing mechanism sensing an imperfect entry for operating each of said reproducing devices to record a special entry, and means thereafter effective to cause said sensing mechanism to ineffectively sense said imperfect entry.

17. A record reproducing system comprising in combination with a record to be sensed, said record having a plurality of regular entries and a plurality of special entries, a sensing mechanism for sensing all of said entries, a plurality of reproducing devices, means responsive to said sensing mechanism sensing a regular entry for selectively connecting one of said reproducing devices to said sensing mechanism whereby the regular entry sensed is reproduced by said reproducing device, means responsive to said sensing mechanism sensing a special entry for connecting each of said reproducing devices in succession to said sensing mechanism for reproducing said special entry, and means adjustable to conform to the character of said special entry for controlling the connection of said reproducing devices to said sensing mechanisms, whereby said connections are not completed if the adjusting means are not adjusted to conform with the character of said special entry.

18. A record reproducing system according to claim 17 in which a special entry on the record is disposed ahead of regular entries, and wherein said selective connecting means are rendered ineffective if said adjusting means are not adjusted to conform with the character of the special entry.

19. A record reproducing system comprising in combination with a plurality of records to be sensed in succession, each of said records having a plurality of entries including a digital character specific to the record, a sensing mechanism for sensing the entries on said records, a plurality of reproducing devices, means responsive to said sensing mechanism sensing an entry for selectively connecting one of said reproducing devices to said sensing mechanism whereby the entry sensed is reproduced by said reproducing device, and means responsive to the sensing of the digital character in each of the entries for rendering ineffective said selective connecting means if the digital characters on the separate records do not follow each other in a predetermined digital order.

20. A record reproducing system comprising in combination with a record to be sensed, said record having a plurality of entries thereon, a sensing mechanism for repetitively sensing said entries, a plurality of reproducing devices, means responsive to said sensing mechanism sensing an entry for selectively connecting one of said reproducing devices to said sensing mechanism whereby the entry sensed is reproduced by said reproducing device, and means for measuring a predetermined time interval during which said sensing mechanism senses said entry a plurality of times to effect a reproduction of the entry by said reproducing device.

WARREN W. CARPENTER.
JOHN W. GOODERHAM.

REFERENCES CITED

The following references are of record in the file of this patent:

UNITED STATES PATENTS

| Number | Name | Date |
|---|---|---|
| 2,112,951 | Carpenter et al. | Apr. 5, 1938 |
| 2,386,763 | Williams | Oct. 16, 1945 |
| 2,473,437 | Mallina | June 14, 1949 |